US010955936B2

(12) United States Patent
Send et al.

(10) Patent No.: US 10,955,936 B2
(45) Date of Patent: Mar. 23, 2021

(54) DETECTOR FOR OPTICALLY DETECTING AT LEAST ONE OBJECT

(71) Applicant: trinamiX GmbH, Ludwigshafen am Rhein (DE)

(72) Inventors: Robert Send, Karlsruhe (DE); Ingmar Bruder, Neuleiningen (DE); Sebastian Valouch, Lampertheim (DE)

(73) Assignee: trinamiX GmbH, Ludwigshafen am Rhein (DE)

( * ) Notice: Subject to any disclaimer, the term of this patent is extended or adjusted under 35 U.S.C. 154(b) by 62 days.

(21) Appl. No.: 15/744,334

(22) PCT Filed: Jul. 14, 2016

(86) PCT No.: PCT/EP2016/066783
§ 371 (c)(1),
(2) Date: Jan. 12, 2018

(87) PCT Pub. No.: WO2017/012986
PCT Pub. Date: Jan. 26, 2017

(65) Prior Publication Data
US 2018/0210064 A1 Jul. 26, 2018

(30) Foreign Application Priority Data
Jul. 17, 2015 (EP) .................................... 15177275

(51) Int. Cl.
*G06F 3/03* (2006.01)
*G01S 3/784* (2006.01)
(Continued)

(52) U.S. Cl.
CPC ............. *G06F 3/0325* (2013.01); *G01C 3/08* (2013.01); *G01C 3/32* (2013.01); *G01S 3/784* (2013.01);
(Continued)

(58) Field of Classification Search
CPC ... H01L 27/307; G06F 3/0325; G06F 3/0425; G06F 3/011; G06F 3/013;
(Continued)

(56) References Cited

U.S. PATENT DOCUMENTS 3,035,176 A 5/1962 Kis et al.
3,112,197 A 11/1963 Neugebauer et al.
(Continued)

FOREIGN PATENT DOCUMENTS

CA 1065054 10/1979
CN 1270706 10/2000
(Continued)

OTHER PUBLICATIONS

Office Action dated Mar. 5, 2018, in corresponding Chinese Patent Application No. 201450056299.0.
(Continued)

*Primary Examiner* — Sanjiv D. Patel
(74) *Attorney, Agent, or Firm* — Armstrong Teasdale LLP

(57) ABSTRACT

A detector (110) for determining a position of at least one object (118) is proposed. The detector (110) comprises: —at least one optical sensor (112), the optical sensor (112) being configured to detect at least one light spot (156) generated by at least one light beam (150) propagating from the object (118) towards the detector (110), the optical sensor (112) having at least one matrix (152) of pixels (154), each pixel (154) being adapted to generate at least one pixel signal $s_{i,j}$ in response to an illumination of the pixel (154) by the light beam (150); —at least one non-linearization device (123) configured to transform the pixel signals $s_{i,j}$ of all pixels (154) i, j or of at least one group of pixels (154) into nonlinear pixel signals $s'_{i,j}$, the nonlinear pixel signals $s'_{i,j}$ each being a nonlinear function of the power of the illumination $p_{i,j}$ of the respective pixel (154); —at least one
(Continued)

summing device (125) configured to add up the nonlinear pixel signals $s'_{i,j}$ of all pixels (154) i, j or of the at least one group of pixels (154) and to generate at least one nonlinear sum signal $S'=\Sigma_{ij}s'_{ij}$; and —at least one evaluation device (126), the evaluation device (126) being configured to determine at least one longitudinal coordinate z of the object (118) by evaluating the nonlinear sum signal S'.

22 Claims, 3 Drawing Sheets

(51) Int. Cl.

| | | |
|---|---|---|
| *G01S 7/481* | (2006.01) | |
| *G01S 11/12* | (2006.01) | |
| *G01C 3/32* | (2006.01) | |
| *G01S 17/46* | (2006.01) | |
| *G01S 5/16* | (2006.01) | |
| *G01C 3/08* | (2006.01) | |
| *G01S 17/66* | (2006.01) | |

(52) U.S. Cl.
CPC ............ *G01S 5/16* (2013.01); *G01S 7/4816* (2013.01); *G01S 11/12* (2013.01); *G01S 17/46* (2013.01); *G01S 17/66* (2013.01); *G06T 2207/30204* (2013.01)

(58) Field of Classification Search
CPC ............ G06F 2209/502; G06F 3/0304; G06F 3/04815; G06F 3/041; H04N 13/366; H04N 13/275; H04N 2013/0081; H04N 13/302; H04N 5/335; H04N 7/183; H04N 9/045; H04N 5/33; H04N 19/60; G06T 15/20; G06T 7/269; G06T 7/33; G06T 17/00; G06T 2200/04; G06T 2207/10004; G06T 2207/10028; G06T 2207/30204; G06K 9/58; G01S 19/14; G01S 19/35; G01S 7/003
See application file for complete search history.

(56) References Cited

U.S. PATENT DOCUMENTS

| | | | |
|---|---|---|---|
| 3,384,752 A | 5/1968 | Odone | |
| 3,562,785 A | 2/1971 | Craig | |
| 3,564,263 A | 2/1971 | Bayne et al. | |
| 3,873,823 A | 3/1975 | Northrup et al. | |
| 3,937,950 A | 2/1976 | Hosoe et al. | |
| 3,954,340 A | 5/1976 | Blomqvist et al. | |
| 4,023,033 A | 5/1977 | Bricot et al. | |
| 4,053,240 A | 10/1977 | Aizawa et al. | |
| 4,079,247 A | 3/1978 | Bricot et al. | |
| 4,256,513 A | 3/1981 | Yoshida | |
| 4,286,035 A | 8/1981 | Nishizima et al. | |
| 4,346,293 A | 8/1982 | Fetzer | |
| 4,469,945 A | 9/1984 | Hoeberechts et al. | |
| 4,524,276 A | 6/1985 | Ohtombe | |
| 4,565,761 A | 1/1986 | Katagiri et al. | |
| 4,584,704 A | 4/1986 | Ferren | |
| 4,593,187 A * | 6/1986 | Grotts | G01S 3/784 250/208.1 |
| 4,602,158 A | 7/1986 | Barrett | |
| 4,603,258 A | 7/1986 | Sher et al. | |
| 4,647,193 A | 3/1987 | Rosenfeld | |
| 4,675,535 A | 6/1987 | Tsunekawa et al. | |
| 4,694,172 A * | 9/1987 | Powell | G01S 5/16 250/339.15 |
| 4,760,004 A | 7/1988 | Rochat et al. | |
| 4,760,151 A | 7/1988 | Rochat et al. | |
| 4,767,211 A | 8/1988 | Munakata et al. | |
| 4,773,751 A * | 9/1988 | Matsuda | G01S 17/46 356/3.08 |
| 4,927,721 A | 5/1990 | Gratzel et al. | |
| 4,952,472 A | 8/1990 | Baranyi et al. | |
| 5,082,363 A | 1/1992 | Nakanishi et al. | |
| 5,216,476 A | 6/1993 | Lanckton | |
| 5,227,985 A | 7/1993 | Dementhon et al. | |
| 5,235,377 A | 8/1993 | Ide et al. | |
| 5,291,066 A | 3/1994 | Neugebauer et al. | |
| 5,343,291 A | 8/1994 | Ohwada et al. | |
| 5,350,644 A | 9/1994 | Graetzel et al. | |
| 5,355,241 A | 10/1994 | Kelley | |
| 5,375,008 A | 12/1994 | Guerreri | |
| 5,512,997 A | 4/1996 | Ogawa | |
| 5,576,975 A | 11/1996 | Sasaki et al. | |
| 5,581,094 A | 12/1996 | Hara et al. | |
| 5,589,928 A | 12/1996 | Babbitt et al. | |
| 5,617,234 A * | 4/1997 | Koga | G02B 6/12011 385/37 |
| 5,856,844 A | 1/1999 | Batterman et al. | |
| 6,061,122 A | 5/2000 | Hoshino et al. | |
| 6,163,371 A | 12/2000 | Kato et al. | |
| 6,191,881 B1 | 2/2001 | Tajima | |
| 6,229,913 B1 | 5/2001 | Nayar et al. | |
| 6,266,142 B1 | 7/2001 | Junkins et al. | |
| 6,359,211 B1 | 3/2002 | Spitler et al. | |
| 6,417,836 B1 | 7/2002 | Kumar et al. | |
| 6,512,233 B1 | 1/2003 | Sato et al. | |
| 6,785,028 B1 | 8/2004 | Atsuumi et al. | |
| 6,930,297 B1 | 8/2005 | Nakamura | |
| 6,947,459 B2 | 9/2005 | Kurtz et al. | |
| 6,995,445 B2 | 2/2006 | Forrest et al. | |
| 7,022,966 B2 | 4/2006 | Gonzo et al. | |
| 7,049,601 B2 | 5/2006 | Agano | |
| 7,196,317 B1 | 3/2007 | Meissner et al. | |
| 7,247,851 B2 | 7/2007 | Okada et al. | |
| 7,301,608 B1 | 11/2007 | Mendenhall et al. | |
| 7,417,716 B2 | 8/2008 | Nagasaka et al. | |
| 7,626,569 B2 | 12/2009 | Lanier | |
| 7,677,742 B2 | 3/2010 | Hillmer et al. | |
| 7,768,498 B2 | 8/2010 | Wey | |
| 7,773,070 B2 | 8/2010 | Trisnadi et al. | |
| 7,939,932 B2 | 5/2011 | Martin | |
| 8,013,901 B2 | 9/2011 | Fukuhara et al. | |
| 8,019,166 B2 | 9/2011 | Cheng et al. | |
| 8,107,056 B1 | 1/2012 | Riza | |
| 8,144,173 B2 | 3/2012 | Baba | |
| 8,228,299 B1 | 7/2012 | Maloney et al. | |
| 8,231,809 B2 | 7/2012 | Pschirer et al. | |
| 8,345,003 B1 | 1/2013 | Trisnadi et al. | |
| 8,363,526 B2 | 1/2013 | Hotta et al. | |
| 8,390,793 B2 | 3/2013 | Yamaguchi et al. | |
| 8,411,289 B2 | 4/2013 | Takahashi | |
| 8,477,580 B2 | 7/2013 | Yamamoto et al. | |
| 8,563,855 B2 | 10/2013 | Pschirer et al. | |
| 8,593,565 B2 | 11/2013 | Shuster | |
| 8,902,354 B2 | 12/2014 | Shuster | |
| 8,908,157 B2 | 12/2014 | Eisele et al. | |
| 9,001,029 B2 | 4/2015 | Bruder et al. | |
| 9,104,910 B2 | 8/2015 | Huang | |
| 9,385,326 B2 | 7/2016 | Wonneberger et al. | |
| 9,389,315 B2 | 7/2016 | Bruder et al. | |
| 9,428,518 B2 | 8/2016 | Wonneberger et al. | |
| 9,557,856 B2 | 1/2017 | Send et al. | |
| 9,646,365 B1 | 5/2017 | Hinkel et al. | |
| 9,665,182 B2 | 5/2017 | Send et al. | |
| 9,741,954 B2 | 8/2017 | Bruder et al. | |
| 9,787,899 B1 | 10/2017 | Hinkel et al. | |
| 9,829,564 B2 | 11/2017 | Bruder et al. | |
| 9,919,999 B2 | 3/2018 | Koenemann et al. | |
| 9,958,535 B2 | 5/2018 | Send et al. | |
| 9,989,623 B2 | 6/2018 | Send et al. | |
| 10,012,532 B2 | 7/2018 | Send et al. | |
| 10,094,927 B2 | 10/2018 | Send et al. | |
| 10,120,078 B2 | 11/2018 | Bruder et al. | |
| 10,290,817 B2 | 5/2019 | Battagliarin et al. | |
| 10,412,283 B2 | 9/2019 | Send et al. | |
| 2001/0025938 A1 | 10/2001 | Imai | |
| 2002/0011576 A1 | 1/2002 | Cho et al. | |

(56) References Cited

U.S. PATENT DOCUMENTS

| | | |
|---|---|---|
| 2003/0017360 A1 | 1/2003 | Tai et al. |
| 2003/0094607 A1 | 5/2003 | Guenther et al. |
| 2003/0128351 A1 | 7/2003 | Schmidt |
| 2003/0132391 A1 | 7/2003 | Agano |
| 2003/0227635 A1 | 12/2003 | Muller |
| 2004/0178325 A1 | 9/2004 | Forrest et al. |
| 2004/0190117 A1 | 9/2004 | Kubaink |
| 2004/0216625 A1 | 11/2004 | Birnstock et al. |
| 2005/0052120 A1 | 3/2005 | Gupta et al. |
| 2005/0061957 A1 | 3/2005 | Kase |
| 2005/0122308 A1 | 6/2005 | Bell et al. |
| 2005/0184301 A1 | 8/2005 | Nagasaka et al. |
| 2005/0217720 A1 | 10/2005 | Rey-Mermet et al. |
| 2005/0227390 A1 | 10/2005 | Shtein et al. |
| 2005/0227406 A1 | 10/2005 | Shtein et al. |
| 2005/0268957 A1 | 12/2005 | Enomoto et al. |
| 2005/0269616 A1 | 12/2005 | Andriessen |
| 2006/0044546 A1 | 3/2006 | Lewin et al. |
| 2006/0049397 A1 | 3/2006 | Pfeiffer et al. |
| 2006/0065833 A1 | 3/2006 | Craig et al. |
| 2006/0075585 A1 | 4/2006 | Krieger et al. |
| 2006/0082546 A1 | 4/2006 | Wey |
| 2007/0008515 A1 | 1/2007 | Otani et al. |
| 2007/0010924 A1 | 1/2007 | Otani et al. |
| 2007/0046625 A1 | 3/2007 | Yee |
| 2007/0080925 A1 | 4/2007 | Radivojevic et al. |
| 2007/0109558 A1 | 5/2007 | Harding |
| 2007/0122927 A1 | 5/2007 | Li et al. |
| 2007/0176165 A1 | 8/2007 | Forrest et al. |
| 2007/0183047 A1 | 8/2007 | Phillips et al. |
| 2007/0206181 A1 | 9/2007 | Arenberg et al. |
| 2008/0013005 A1 | 1/2008 | Deane |
| 2008/0080789 A1 | 4/2008 | Marks |
| 2008/0157965 A1 | 7/2008 | Shahar |
| 2008/0170750 A1 | 7/2008 | Gordon |
| 2008/0259310 A1 | 10/2008 | Wada |
| 2008/0269482 A1 | 10/2008 | Pschirer et al. |
| 2008/0284925 A1 | 11/2008 | Han |
| 2008/0297487 A1 | 12/2008 | Hotelling et al. |
| 2009/0009747 A1 | 1/2009 | Wolf |
| 2009/0046543 A1 | 2/2009 | De Hoog et al. |
| 2009/0097010 A1 | 4/2009 | Yamaguchi |
| 2009/0153841 A1 | 6/2009 | Ophey et al. |
| 2009/0185158 A1 | 7/2009 | Wolf |
| 2009/0188547 A1 | 7/2009 | Hayashi et al. |
| 2009/0225319 A1 | 9/2009 | Lee |
| 2009/0231582 A1 | 9/2009 | Aebischer |
| 2009/0322677 A1 | 12/2009 | Lee et al. |
| 2010/0073462 A1* | 3/2010 | Lee .................. H04N 5/347 348/46 |
| 2010/0091263 A1 | 4/2010 | Kumagai et al. |
| 2010/0141927 A1 | 6/2010 | Hashimoto et al. |
| 2010/0141964 A1 | 6/2010 | Horsch |
| 2010/0194942 A1 | 8/2010 | Wada |
| 2010/0231513 A1 | 9/2010 | Deliwala |
| 2010/0258179 A1 | 10/2010 | Wieting |
| 2010/0279458 A1 | 11/2010 | Yeh |
| 2010/0282309 A1 | 11/2010 | Pschirer et al. |
| 2010/0283868 A1 | 11/2010 | Clark et al. |
| 2010/0297405 A1 | 11/2010 | Flores et al. |
| 2011/0032365 A1 | 2/2011 | Yett |
| 2011/0055846 A1 | 3/2011 | Perez et al. |
| 2011/0096319 A1 | 4/2011 | Otani et al. |
| 2011/0099105 A1 | 4/2011 | Mennie et al. |
| 2011/0103215 A1 | 5/2011 | Hotta et al. |
| 2011/0122287 A1 | 5/2011 | Kunishige et al. |
| 2011/0123188 A1 | 5/2011 | Cardwell et al. |
| 2011/0127788 A1 | 6/2011 | Nakanishi |
| 2011/0181553 A1 | 7/2011 | Brown et al. |
| 2011/0194097 A1 | 8/2011 | Yamaguchi et al. |
| 2011/0284756 A1 | 11/2011 | Miko et al. |
| 2011/0286661 A1 | 11/2011 | Lee et al. |
| 2011/0297235 A1 | 12/2011 | Bergmann |
| 2011/0306413 A1 | 12/2011 | Bickerstaff et al. |
| 2011/0317146 A1 | 12/2011 | Gu et al. |
| 2012/0013885 A1 | 1/2012 | Yang et al. |
| 2012/0061587 A1 | 3/2012 | Wu |
| 2012/0062517 A1 | 3/2012 | Lai et al. |
| 2012/0063287 A1 | 3/2012 | Yamamoto et al. |
| 2012/0105690 A1 | 5/2012 | Waqas et al. |
| 2012/0160298 A1 | 6/2012 | Kanamoto et al. |
| 2012/0162410 A1 | 6/2012 | Vaillant |
| 2012/0206336 A1* | 8/2012 | Bruder .................. G01S 7/4808 345/156 |
| 2012/0242867 A1 | 9/2012 | Shuster |
| 2012/0249998 A1 | 10/2012 | Eisele et al. |
| 2012/0250137 A1 | 10/2012 | Maxik et al. |
| 2012/0262365 A1 | 10/2012 | Mallinson |
| 2012/0289672 A1 | 11/2012 | Kastler et al. |
| 2012/0293651 A1 | 11/2012 | Kawamata et al. |
| 2012/0320160 A1 | 12/2012 | Drazic |
| 2012/0328906 A1 | 12/2012 | Kwon et al. |
| 2013/0033579 A1 | 2/2013 | Wajs |
| 2013/0076695 A1 | 3/2013 | Gomez et al. |
| 2013/0135604 A1 | 5/2013 | Gogolla et al. |
| 2013/0201492 A1 | 8/2013 | Takahashi |
| 2013/0222551 A1 | 8/2013 | Shamir et al. |
| 2013/0235390 A1 | 9/2013 | Holzapfel et al. |
| 2013/0242283 A1 | 9/2013 | Bailey et al. |
| 2013/0266210 A1 | 10/2013 | Morgan-Mar et al. |
| 2013/0271818 A1 | 10/2013 | Maxik et al. |
| 2013/0320302 A1 | 12/2013 | Park et al. |
| 2014/0015242 A1 | 1/2014 | Forrest |
| 2014/0043610 A1 | 2/2014 | Engel et al. |
| 2014/0066656 A1 | 3/2014 | Bruder et al. |
| 2014/0078376 A1 | 3/2014 | Shuster |
| 2014/0124782 A1 | 5/2014 | Jung et al. |
| 2014/0132724 A1 | 5/2014 | Choi et al. |
| 2014/0209789 A1 | 7/2014 | Hu |
| 2014/0211295 A1 | 7/2014 | Maxik et al. |
| 2014/0217329 A1 | 8/2014 | Hayoz et al. |
| 2014/0233028 A1 | 8/2014 | Englund |
| 2014/0291480 A1 | 10/2014 | Bruder et al. |
| 2014/0347442 A1* | 11/2014 | Wang .................. H04N 9/04557 348/46 |
| 2014/0368726 A1 | 12/2014 | Gladnick |
| 2015/0029326 A1 | 1/2015 | Backman et al. |
| 2015/0085166 A1 | 3/2015 | Shuster |
| 2015/0111337 A1 | 4/2015 | Welker et al. |
| 2015/0124241 A1 | 5/2015 | Eisele et al. |
| 2015/0124268 A1 | 5/2015 | Bruder et al. |
| 2015/0132887 A1 | 5/2015 | Welker et al. |
| 2015/0170400 A1 | 6/2015 | Seitz et al. |
| 2015/0286340 A1 | 10/2015 | Send et al. |
| 2015/0346911 A1 | 12/2015 | Christiansson |
| 2015/0372046 A1 | 12/2015 | Kim et al. |
| 2016/0099429 A1 | 4/2016 | Bruder et al. |
| 2016/0124074 A1 | 5/2016 | Wonneberger et al. |
| 2016/0127664 A1 | 5/2016 | Bruder et al. |
| 2016/0139243 A1 | 5/2016 | Send et al. |
| 2016/0140786 A1 | 5/2016 | Wang |
| 2016/0155575 A1 | 6/2016 | Yamato et al. |
| 2016/0177177 A1 | 6/2016 | Koenemann et al. |
| 2016/0211464 A1 | 7/2016 | Tanabe et al. |
| 2016/0218302 A1 | 7/2016 | Hermes et al. |
| 2016/0224110 A1* | 8/2016 | Massonneau ............ G06F 3/013 |
| 2016/0248021 A1 | 8/2016 | Sundarraj et al. |
| 2016/0255323 A1 | 9/2016 | Wajs |
| 2016/0266257 A1 | 9/2016 | Bruder et al. |
| 2016/0286199 A1 | 9/2016 | Wajs et al. |
| 2016/0320489 A1 | 11/2016 | Send et al. |
| 2016/0364015 A1 | 12/2016 | Send et al. |
| 2017/0039793 A1 | 2/2017 | Send et al. |
| 2017/0074652 A1 | 3/2017 | Send et al. |
| 2017/0082426 A1 | 3/2017 | Bruder et al. |
| 2017/0082486 A1 | 3/2017 | Send et al. |
| 2017/0123593 A1 | 5/2017 | Send et al. |
| 2017/0140786 A1 | 5/2017 | Send et al. |
| 2017/0183295 A1 | 6/2017 | Koenemann et al. |
| 2017/0205230 A1 | 7/2017 | Send et al. |
| 2017/0219694 A1 | 8/2017 | Send et al. |
| 2017/0219709 A1 | 8/2017 | Send et al. |
| 2017/0237926 A1 | 8/2017 | Bruder et al. |
| 2017/0250334 A1 | 8/2017 | Hermes et al. |

(56) References Cited

U.S. PATENT DOCUMENTS

| | | |
|---|---|---|
| 2017/0263868 A1 | 9/2017 | Tanabe et al. |
| 2017/0309828 A1 | 10/2017 | Tanabe et al. |
| 2017/0363465 A1 | 12/2017 | Send et al. |
| 2017/0363741 A1 | 12/2017 | Send et al. |
| 2018/0003993 A1 | 1/2018 | Send et al. |
| 2018/0007343 A1 | 1/2018 | Send et al. |
| 2018/0017679 A1 | 1/2018 | Valouch et al. |
| 2018/0031672 A1 | 2/2018 | Bruder et al. |
| 2018/0044357 A1 | 2/2018 | Spielmann et al. |
| 2018/0067213 A1 | 3/2018 | Send et al. |
| 2018/0136319 A1 | 5/2018 | Send et al. |
| 2018/0182980 A1 | 6/2018 | Lennartz et al. |
| 2018/0210064 A1 | 7/2018 | Send et al. |
| 2018/0231376 A1 | 8/2018 | Send et al. |
| 2018/0238993 A1 | 8/2018 | Send et al. |
| 2018/0243045 A1 | 8/2018 | Franjic et al. |
| 2018/0249051 A1 | 8/2018 | Send et al. |
| 2018/0276843 A1 | 9/2018 | Send et al. |
| 2018/0329024 A1 | 11/2018 | Send et al. |
| 2018/0356501 A1 | 12/2018 | Send et al. |
| 2019/0129035 A1 | 5/2019 | Valouch et al. |
| 2019/0129036 A1 | 5/2019 | Valouch et al. |
| 2019/0140129 A1 | 5/2019 | Valouch et al. |
| 2019/0157470 A1 | 5/2019 | Send et al. |
| 2019/0170849 A1 | 6/2019 | Hermes et al. |
| 2019/0172964 A1 | 6/2019 | Hermes et al. |
| 2019/0198206 A1 | 6/2019 | Ter Maat et al. |
| 2019/0277703 A1 | 9/2019 | Valouch et al. |

FOREIGN PATENT DOCUMENTS

| | | |
|---|---|---|
| CN | 1677053 A | 10/2005 |
| CN | 1723564 A | 1/2006 |
| CN | 1777859 | 5/2006 |
| CN | 1809801 A | 7/2006 |
| CN | 1894976 | 1/2007 |
| CN | 1896686 A | 1/2007 |
| CN | 101129074 | 2/2008 |
| CN | 101290348 A | 10/2008 |
| CN | 101449181 | 6/2009 |
| CN | 101650173 A | 2/2010 |
| CN | 101655350 | 2/2010 |
| CN | 101859439 A | 10/2010 |
| CN | 102096962 | 6/2011 |
| CN | 201897828 | 7/2011 |
| CN | 102435136 | 5/2012 |
| CN | 102506754 A | 6/2012 |
| CN | 102549381 A | 7/2012 |
| CN | 102737435 | 10/2012 |
| CN | 102833569 | 12/2012 |
| CN | 103106411 A | 5/2013 |
| CN | 103322910 A | 9/2013 |
| CN | 103403494 | 11/2013 |
| CN | 103492835 | 1/2014 |
| CN | 103649677 | 3/2014 |
| CN | 103650478 | 3/2014 |
| CN | 10 405 2944 A | 9/2014 |
| DE | 2 417 854 | 10/1974 |
| DE | 25 01 124 A1 | 8/1975 |
| DE | 32 25 372 A1 | 2/1983 |
| DE | 42 11 875 | 10/1993 |
| DE | 196 04 856 | 8/1997 |
| DE | 10146752 | 4/2002 |
| DE | 10 2005 043 627 A1 | 3/2007 |
| DE | 10 2005 053 995 | 5/2007 |
| DE | 10 2007 037 875 A1 | 2/2009 |
| DE | 10 2010 042 278 | 4/2012 |
| DE | 20 2012 009 070 | 1/2013 |
| DE | 10 2014 108 353 A1 | 12/2014 |
| EP | 0 112 169 A2 | 6/1984 |
| EP | 0 185 450 A2 | 6/1986 |
| EP | 0 309 631 | 4/1989 |
| EP | 2196563 | 12/1996 |
| EP | 0 754 930 A2 | 1/1997 |
| EP | 1 176 646 A1 | 1/2002 |
| EP | 1 191 819 | 3/2002 |
| EP | 1 330 117 | 7/2003 |
| EP | 1 373 272 | 1/2004 |
| EP | 1 667 246 A1 | 6/2006 |
| EP | 1 832 910 | 9/2007 |
| EP | 1 947 477 | 7/2008 |
| EP | 2 205 657 A1 | 7/2010 |
| EP | 2 220 141 A1 | 8/2010 |
| EP | 2 507 286 A2 | 10/2012 |
| EP | 2 527 866 A1 | 11/2012 |
| EP | 2 725 617 A1 | 4/2014 |
| EP | 2 735 542 | 5/2014 |
| EP | 2 813 324 | 12/2014 |
| EP | 2 818 493 A1 | 12/2014 |
| EP | 15 153 215 | 1/2015 |
| EP | 2 831 160 | 2/2015 |
| EP | 15 157 363 | 3/2015 |
| EP | 15 164 653 | 4/2015 |
| EP | 2 884 303 A1 | 6/2015 |
| EP | 15 177 275 | 7/2015 |
| EP | 15 180 353 | 8/2015 |
| EP | 15 180 354 | 8/2015 |
| EP | 15 185 005 | 9/2015 |
| EP | 15 191 960 | 10/2015 |
| EP | 15 196 238 | 11/2015 |
| EP | 15 196 239 | 11/2015 |
| EP | 15 197 744 | 12/2015 |
| EP | 15 155 835 | 2/2016 |
| EP | 16 155 834 | 2/2016 |
| EP | 16 155 845 | 2/2016 |
| EP | 3 008 421 | 4/2016 |
| EP | 3 008 757 | 4/2016 |
| EP | 3 036 503 | 6/2016 |
| GB | 2 432 723 | 5/2007 |
| JP | S59-50579 | 3/1984 |
| JP | 59-79805 | 5/1984 |
| JP | 61-89501 | 5/1986 |
| JP | S61-135280 | 6/1986 |
| JP | 64-17485 | 1/1989 |
| JP | H02-170004 | 6/1990 |
| JP | 04-240817 | 8/1992 |
| JP | 5-48833 A | 2/1993 |
| JP | 05-240640 | 9/1993 |
| JP | 6-133321 | 5/1994 |
| JP | 7-146113 | 6/1995 |
| JP | 7-318630 | 12/1995 |
| JP | 8-159714 | 6/1996 |
| JP | 8-292586 A | 11/1996 |
| JP | 10-26513 A | 1/1998 |
| JP | 10-221064 | 8/1998 |
| JP | H11-201718 | 7/1999 |
| JP | H11-230860 | 8/1999 |
| JP | 11-325825 | 11/1999 |
| JP | 2000-121352 | 4/2000 |
| JP | 3110095 | 11/2000 |
| JP | 2001-516150 | 9/2001 |
| JP | 2002-176191 | 6/2002 |
| JP | 2003-307407 | 10/2003 |
| JP | 2004-508691 | 3/2004 |
| JP | 2005-509909 | 4/2005 |
| JP | 2005-189087 | 7/2005 |
| JP | 2005-241340 A | 9/2005 |
| JP | 2005-296268 | 10/2005 |
| JP | 2006-514366 | 4/2006 |
| JP | 2006-337254 | 12/2006 |
| JP | 2007-521559 | 8/2007 |
| JP | 2007-530978 | 11/2007 |
| JP | 2008-522418 | 6/2008 |
| JP | 2008-164538 | 7/2008 |
| JP | 2009-257890 | 11/2009 |
| JP | 2010-081002 | 4/2010 |
| JP | 2010-531520 | 9/2010 |
| JP | 2011-503673 | 1/2011 |
| JP | 2011-027707 | 2/2011 |
| JP | 2012-522248 | 9/2012 |
| JP | 2012-229964 | 11/2012 |
| JP | 2012-231154 | 11/2012 |
| JP | 2013-051674 | 3/2013 |
| JP | 2014-232005 | 12/2014 |

(56) References Cited

FOREIGN PATENT DOCUMENTS

| | | |
|---|---|---|
| TW | 2011-40111 A | 11/2011 |
| WO | 99-09603 | 2/1999 |
| WO | WO 01/29576 A1 | 4/2001 |
| WO | WO 02/076988 | 10/2002 |
| WO | WO 02/101838 A1 | 12/2002 |
| WO | 03/012371 A1 | 2/2003 |
| WO | WO 03/098617 | 11/2003 |
| WO | WO 2004/072909 | 8/2004 |
| WO | WO 2004/114112 A1 | 12/2004 |
| WO | WO 2005/106965 A1 | 11/2005 |
| WO | WO 2007/006717 | 1/2007 |
| WO | WO 2007/054470 A1 | 5/2007 |
| WO | WO 2008/122531 | 10/2008 |
| WO | WO 2008/145172 | 12/2008 |
| WO | WO 2009/013282 A1 | 1/2009 |
| WO | WO 2009/021859 | 2/2009 |
| WO | WO 2009/053291 A1 | 4/2009 |
| WO | WO 2009/058115 A1 | 5/2009 |
| WO | WO 2009/105801 | 9/2009 |
| WO | WO 2010/088032 A2 | 8/2010 |
| WO | WO 2010/094636 A1 | 8/2010 |
| WO | WO 2010/118409 | 10/2010 |
| WO | WO 2010/118450 | 10/2010 |
| WO | WO 2011/067192 A2 | 6/2011 |
| WO | WO 2011/083722 | 7/2011 |
| WO | WO 2011/091967 A2 | 8/2011 |
| WO | WO 2012/001628 A1 | 1/2012 |
| WO | WO 2012/046181 A1 | 4/2012 |
| WO | WO 2012/049038 A1 | 4/2012 |
| WO | WO 2012/070208 | 5/2012 |
| WO | WO 2012/085803 A1 | 6/2012 |
| WO | WO 2012/091814 | 7/2012 |
| WO | WO 2012/110924 A1 | 8/2012 |
| WO | WO 2012/115593 | 8/2012 |
| WO | WO 2012/139354 | 10/2012 |
| WO | 2012/152812 A1 | 11/2012 |
| WO | 2012/168395 A1 | 12/2012 |
| WO | WO 2006/134370 | 12/2012 |
| WO | WO 2013/009676 | 1/2013 |
| WO | WO 2013/090960 | 6/2013 |
| WO | WO 2013/091016 A1 | 6/2013 |
| WO | 2013/118037 A1 | 8/2013 |
| WO | WO 2013/116883 | 8/2013 |
| WO | WO 2013/144177 A1 | 10/2013 |
| WO | WO 2013/156101 A1 | 10/2013 |
| WO | 2013/170982 A1 | 11/2013 |
| WO | 2014/086722 A1 | 6/2014 |
| WO | 2014/097489 A1 | 6/2014 |
| WO | WO 2014/097181 A1 | 6/2014 |
| WO | WO 2014/123522 | 8/2014 |
| WO | 2014/178923 A2 | 11/2014 |
| WO | 2014/198623 A1 | 12/2014 |
| WO | 2014/198625 A1 | 12/2014 |
| WO | 2014/198626 A1 | 12/2014 |
| WO | 2014/198629 A1 | 12/2014 |
| WO | 2015/024871 A1 | 2/2015 |
| WO | WO 2015/081362 | 6/2015 |
| WO | WO 2015/091607 | 6/2015 |
| WO | WO 2015/150989 | 10/2015 |
| WO | WO 2015/159192 | 10/2015 |
| WO | WO 2015/161989 | 10/2015 |
| WO | WO 2015/162528 | 10/2015 |
| WO | WO 2015/176981 | 11/2015 |
| WO | WO 2015/177784 A2 | 11/2015 |
| WO | 2015/193804 A2 | 12/2015 |
| WO | 2016/005893 A1 | 1/2016 |
| WO | WO 2016/012274 | 1/2016 |
| WO | 2016/051323 A1 | 4/2016 |
| WO | WO 2016/066494 | 5/2016 |
| WO | 2016/092449 A1 | 6/2016 |
| WO | 2016/092454 A1 | 6/2016 |
| WO | WO 2016/083914 | 6/2016 |
| WO | WO 2016/120392 | 8/2016 |
| WO | WO 2016/146725 | 9/2016 |
| WO | WO 2017/089553 | 6/2017 |
| WO | WO 2017/144401 | 8/2017 |
| WO | WO 2018/096083 | 5/2018 |
| WO | WO 20181115073 | 6/2018 |
| WO | WO 2018/146138 | 8/2018 |
| WO | WO 2018/146146 | 8/2018 |
| WO | WO 2018/167215 | 9/2018 |
| WO | WO 2018/193045 | 10/2018 |
| WO | WO 2019/002199 | 1/2019 |
| WO | WO 2019/011803 | 1/2019 |
| WO | WO 2019/038354 | 2/2019 |
| WO | WO 2019/042956 | 3/2019 |
| WO | WO 2019/042959 | 3/2019 |

OTHER PUBLICATIONS

Internationai Preliminary Report on Patentability and Written Opinion dated Feb. 22, 2018 in PCT/EP2016/069049).
A.G. Pattantyus-Abraham, I.J. Kramer, A.R. Barkhouse, X. Wang, G. Konstantatos, R. Debnath, L. Levina, I. Raabe, M.K. Nazeeruddin, M. Grätzel, and E.H. Sargent, *Depleted-Heterojunction Colloidal Quantum Dot Solar Cells*, ACS NANO 4 (6), May 24, 2010.
R. Martins and E. Fortunato, *Thin Film Position Sensitive Detectors: from 1D to 3D Applications*, Chap. 8 in R. A. Street (Ed.). *Technology and Applications of Amorphous Silicon*, Springer, 2010.
International Search Report dated Oct. 20, 2017 in PCT/EP2017/068956 filed on Jul. 27, 2017.
Leskela, M. et al., "Preparation of lead sulfide thin films by the atomic layer epitaxy process," Pergamon Press plc, Vacuum/vol. 41/Nos. 4-6, pp. 1457-1459 (1990).
Dasgupta, N. et al., "Fabrication and Characterization of Lead Sulfide Thin Films by Atomic Layer Deposition," The Electrochemical Society, ECS Transactions, 16 (4) 29-36 (2008), Total 8 pages.
Dasgupta, N. et al., "Design of an atomic layer deposition reactor for hydrogen sulfide compatibility," Review of Scientific Instruments 81, 044102 (2010). Total 6 pages.
Xu, J. et al., "Atomic layer deposition of absorbing thin films on nanostructured electrodes for short-wavelength infrared photosensing," AIP Publishing, Applied Physics Letters 107, 153105 (2015), Total 5 pages.
Blount, G., et al., "Photoconductive properties of chemically deposited PbS with dielectric overcoatings," AIP Publishing, Journal of Applied Physics 46, 3489 (1975), Total 12 pages.
Groner, M. et al., "Low-Temperature Al2O3 Atomic Layer Deposition," American Chemical Society, Chem. Mater., vol. 16. No. 4, 2004, pp. 639-645.
Yoon, W. et al., "Electrical Measurement Under Atmospheric Conditions of PbSe Nanocrystal Thin Films Passivated by Remote Plasma Atomic Layer Deposition of Al2O3," IEEE Transactions on Nanotechnology. vol. 12, No. 2. Mar. 2013, pp. 146-151.
Hu, C., et al., "Air-stable short-wave infrared PbS colloidal quantum dot photoconductors passivated with Al2O3 atomic layer deposition," AIP Publishing, Applied Physics Letters 105, 171110 (2014), Total 5 pages.
Liu, Y., et al., "Robust, Functional Nanocrystal Solids by Infilling with Atomic Layer Deposition," ACS Publications, American Chemical Society, Nano Letters 2011, 11, pp. 5349-5355.
Liu, Y., et al., "PbSe Quantum Dot Field-Effect Transistors with Air-Stable Electron Mobilities above 7 cm$^2$ V$^{-1}$ s$^{-1}$," ACS Publications, American Chemical Society, Nano Letters 2013, 13, pp. 1578-1587.
George, S., "Atomic Layer Deposition: An Overview," American Chemical Society, Chem. Rev. 2010. 110, pp. 111-131.
Konstantatos, G., et al., "Engineering the Temporal Response of Photoconductive Photodetectors via Selective Introduction of Surface Trap States," American Chemical Society, Nano Letters 2008. vol. 8, No. 5, pp. 1446-1450.
Soci, C., et al., "ZnO Nanowire UV Photodetectors with High Internal Gain," American Chemical Society, Nano Letters 2007, vol. 7, No. 4, pp. 1003-1009.
List of integrated circuit packaging types (Wikipedia article, downloaded Jan. 15, 2019 from http://en.wikipedia.org/wiki/List_of_integrated_circuit_packaging_types).

(56) References Cited

OTHER PUBLICATIONS

List of integrated circuit packaging types, Dimension Reference (Wikipedia article, downloaded Jan. 15, 2019 from https://en.wikipedia.org/wiki/List_of_integrated_circuit_packaging_types#PIN-PITCH).
Office Action dated Jul. 9, 2018, in Japanese Patent Application No. 2017-007544.
Xing Lin, et al., "Coded focal stack photography", Computational Photography (ICCP), 2013 IEEE International Conference On, Apr. 19, 2013, XP032424246, pp. 1-9.
Nabeel A. Riza, et al., "Noncontact distance sensor using spatial signal processing", Optics Letters, Optical Society of America, vol. 34, No. 4, Feb. 15, 2009. XP001522006, pp. 434-436.
Nabeel A. Riza, et al., "Smart agile lens remote optical sensor for three-dimensional object shape measurements", Applied Optics, Optical Society of America, vol. 49, No. 7, Mar. 1, 2010, XP001552714, pp. 1139-1150.
Extended Search Report dated Aug. 23, 2011 in Europe Application No. 11154531.5 (With English Translation of Category of Cited Documents).
Erwin Bacher, et al., "Synthesis and Characterization of Photo-Cross-Linkable Hole-Conducting Polymers", Macromolecules, vol. 38, 2005, pp. 1640-1647.
H. Bruce Goodbrand, et al., "Ligand-Accelerated Catalysis of the Ullmann Condensation: Application to Hole Conducting Triarylamines", J. Org. Chem., vol. 64, 1999, pp. 670-674.
Felix E. Goodson, et al., "Palladium-Catalyzed Synthesis of Pure, Regiodefined Polymeric Triarylamines", J. Am. Chem. Soc., vol. 121, 1999, pp. 7527-7539.
John F. Hartwig, "Transition Metal Catalyzed Synthesis of Arylamines and Aryl Ethers from Aryl Halides and Triflates: Scope and Mechanism", Angew. Chem. Int. Ed., vol. 37, 1998, pp. 2046-2067.
Sheila I. Hauck, et al., "Tetraazacyclophanes by Palladium-Catalyzed Aromatic Amination. Geometrically Defined, Stable, High-Spin Diradicals", Organic Letters, vol. 1, No. 13, 1999, pp. 2057-2060.
Ping-Hsin Huang, et al., "Synthesis and Characterization of new fluorescent two-photon absorption chromophores", J. Mater. Chem., vol. 16, 2006, pp. 850-857.
Qinglan Huang, et al., "Molecularly 'Engineered' Anode Adsorbates for Probing OLED Interfacial Structure—Charge Injection/Luminance Relationships: Large, Structure-Dependent Effects", J. Am. Chem. Soc., vol. 125, 2003, pp. 14704-14705.
A. Balionyte, et al., "Carbazolyl-substituted triphenyldiamine derivatives as novel photoconductive amorphous molecular materials", Journal of Photochemistry and Photobiology A: Chemistry, vol. 162, 2004, pp. 249-252.
G. R. A. Kumara, et al., "Fabrication of Dye-Sensitized Solar Cells Using Triethylamine Hydrothiocyanate as a CuI Crystal Growth Inhibitor", Langmuir, vol. 18, 2002, pp. 10493-10495.
Lukas Schmidt-Mende, et al., "Organic Dye for Highly Efficient Solid-State Dye-Sensitized Solar Cells", Adv. Mater., vol. 17, No. 7, 2005, pp. 813-815.
James Lindley, "Copper Assisted Nucleophilic Substitution of Aryl Halogen", Tetrahedron, vol. 40, No. 9, 1984, pp. 1433-1456.
Yunqi Liu, et al., "Synthesis and characterization of a novel bipolar polymer for light-emitting diodes", Chem. Commun., vol. 24, 1998, pp. 2747-2748.
Narukuni Hirata, et al., "Interface engineering for solid-state dye-sensitised nanocrystalline solar cells: the use of an organic redox cascade", Chem. Commun., vol. 5, 2006, pp. 535-537.
Qingjiang Yu, et al., "High-Efficiency Dye-Sensitized Solar Cells: The Influence of Lithium Ions on Exciton Dissociation, Charge Recombination, and Surface States", ACS Nano, vol. 4, No. 10, 2010, pp. 6032-6038.
Bin Peng, et al., "Systematic investigation of the role of compact $TiO_2$ solar cells", Coordination Chemistry Reviews, vol. 248, 2004, pp. 1479-1489.
Jiun Yi Shen, et al., "High $T_g$ blue emitting materials for electroluminescent devices", J. Mater. Chem., vol. 15, 2005, pp. 2455-2463.
Tobat P. I. Saragi, et al., "Comparison of Charge-Carrier Transport in Thin Films of Spiro-Linked Compounds and Their Corresponding Parent Compounds", Adv. Funct. Mater., vol. 16, 2006, pp. 966-974.
V. P. S. Perera, et al., "Dye-Sensitized Solid-State Photovoltaic Cells Based on Dye Multilayer-Semiconductor Nanostructures", J. Phys. Chem. B, vol. 107, 2003, pp. 13758-13761.
U. Bach, et al., "Solid-state dye-sensitized mesoporous $TiO_2$ solar cells with high photon-to-electron conversion efficiencies", Nature, vol. 395, 1998, pp. 583-585.
John P. Wolfe, et al., "Rational Development of Practical Catalysts for Aromatic Carbon-Nitrogen Bond Formation", Acc. Chem. Res. vol. 31, 1998, pp. 805-818.
Bryant H. Yang, et al., "Palladium-Catalyzed amination of aryl halides and sulfonates", Journal of Organometallic Chemistry, vol. 576, 1999, pp. 125-146.
Zhong Hui Li, et al., "Synthesis and Functional Properties of Strongly Luminescent Diphenylamino End-Capped Oligophenylenes", J. Org. Chem., vol. 69, 2004, pp. 921-927.
Brian O'Regan, et al., "A low-cost, high-efficiency solar cell based on dye-sensitized colloidal $TiO_2$ films", Letters to Nature, vol. 353, 1991, pp. 737-740.
International Search Report dated Sep. 24, 2014 in PCT/EP2014/061682.
International Preliminary Report on Patentability and Written Opinion dated Dec. 15, 2015 in PCT/EP2014/061682.
International Preliminary Report on Patentability and Written Opinion dated Dec. 23, 2015 in PCT/EP2014/061695.
International Search Report and Written Opinion dated May 31, 2012 in PCT/IB2012/050592 filed on Feb. 9, 2012.
Supplementary European Search Report dated Nov. 19, 2014, issued in corresponding European Patent Application No. EP 12 74 6808.
Volker Viereck, et al., Large-area applications of optical MEMS: micromirror arrays guide daylight, optimize indoor illumination, Optical Components, Photonik International 2, 2009, pp. 48-49.
C.U. Murade, et al., "High speed adaptive liquid microlens array", Optics Express, vol. 20, No. 16, Jul. 30, 2012, pp. 18180-18187.
Jason Heikenfeld, et al., "Recent Progress in Arrayed Electrowetting Optics", Optics & Photonics News, vol. 20, No. 1, Jan. 1, 2009, pp. 20-26.
Tao Peng, "Algorithms and models for 3-D shape measurement using digital fringe projections", Dissertation, University of Maryland (College Park, Md.), Jan. 16, 2007, 268 pages (http://drum.lib.umd.edu//handle/1903/6654; http://en.wikipedia.org/wiki/Gray_code; http://en.wikipedia.org/wiki/Structured-light_3D_scanner).
Jie-Ci Yang et al., "An Intelligent Automated Door Control System Based on a Smart", Sensors, 2013, 13(5), pp. 5923-5936; doi: 10.3390/s130505923 www.mdpi.com/journal/sensors.
Tomas Leijtens, et al., "Hole Transport Materials with Low Glass Transition Temperatures and High Solubility for Application in Solid-State Dye-Sensitized Solar Cells", ACS Nano, vol. 6, No. 2, 2012, pp. 1455-1462 www.acsnano.org.
International Search Report and Written Opinion dated Oct. 31, 2014 in PCT/EP2014/067466 filed Aug. 15, 2014.
Paul Pargas, "Phenomena of Image Sharpness Recognition of CdS and CdSe Photoconductors" Journal of the Optical Society of America, vol. 54, No. 4, Apr. 1964, pp. 516-519.
Paul Pargas, "A Lens Measuring Method Using Photoconductive Cells" Journal of the SMPTE, vol. 74, Jun. 1965, pp. 501-504.
Jack T. Billings, "An Improved Method for Critical Focus of Motion-Picture Optical Printers" Journal of the SMPTE, vol. 80, Aug. 1971, pp. 624-628.
International Search Report dated Sep. 9, 2014 in PCT/EP2014/061688 filed Jun. 5, 2014.
Written Opinion of the International Searching Authority dated Sep. 9, 2014 in PCT/EP2014/061688 filed Jun. 5, 2014.
International Search Report and Written Opinion of the International Searching Authority dated Mar. 12, 2015 in PCT/EP2014/078155 Filed Dec. 17, 2014.
International Search Report and Written Opinion of the International Searching Authority dated May 16, 2014 in PCT/IB2013/061095.

(56) References Cited

OTHER PUBLICATIONS

Seigo Ito, et al., "High-Efficiency Organic-Dye-Sensitized Solar Cells Controlled by Nanocrystalline-TiO$_2$ Electrode Thickness", Adv. Mater., vol. 18, 2006, pp. 1202-1205.
Atte Haapalinna, et al., "Measurement of the Absolute Linearity of Photodetectors with a Diode Laser," Meas. Sci. Technol., 10, (1999) 1075-1078.
M. R. Andersen, et al., "Kinect Depth Sensor Evaluation for Computer Vision Applications",Electrical and Computer Engineering, Technical Report ECE-TR-6, Aarhus University, 2012, 39 pages.
Takumi Kinoshita, et al., "Wideband dye-sensitized solar cells employing a phosphine-coordinated ruthenium sensitizer", Nature Photonics, vol. 7, 2013, pp. 535-239.
Office Action dated Apr. 22, 2015 in Chinese Patent Application No. 201280018328.5 (submitting English translation only).
International Search Report and Written Opinion dated Sep. 3, 2014 in PCT/EP2014/061691.
International Preliminary Report on Patentability dated Sep. 25, 2015 in PCT/EP2014/061691.
Kuthirumal, S., et al., "Flexible Depth of Field Photography," IEEE Transactions on Pattern Analysis and Machine Intelligence, vol. 33, No. 1 (2011), pp. 58-71.
Hiura Shinsaku et al., "Depth Measurement by the Multi-Focus Camera," Computer Vision and Pattern Recognition, 1998. Proceedings. 1998 IEEE Computer Society Conference on Santa Barbara, CA, USA, Jun. 23-25, 1998, pp. 953-959.
International Preliminary Report on Patentability and Written Opinion dated Dec. 23, 2015 in PCT/EP2014/061688.
Denis Klimentjew, et al., "Multi Sensor Fusion of Camera and 3D Laser Range Finder for Object Recognition" 2010 IEEE International Conference on Multisensor Fusion and Integration for Intelligent Systems, 2010, pp. 236-241.
International Search Report and Written Opinion dated Nov. 21, 2014 in PCT/EP2014/067465.
"So funktioniert die DLP-Technologie" DLP-Technologie—www.dlp.com/de/technology/how-dlp-works, 2014, 2 Pages.
"New- Ultra-Compact Pockels Cells with Brewster Polarizer and Waveplate for Laser Q-Switching" Leysop Ltd, Manfacturers and Suppliers of Electro-Optic Components—http://www.leysop.com/integrated_pockels_cell.htm, Aug. 4, 2013, 2 Pages.
D. Scaramuzza, et al., "Extrinsic Self Calibration of a Camera and a 3D Laser Range Finder from Natural Scenes" 2007 IEEE/RSJ International Conference on Intelligent Robots and Systems, 2007, 8 pages.
International Search Report dated Aug. 28, 2015, in PCT/IB2015/052769, filed Apr. 16, 2015.
International Search Report and Written Opinion dated Jun. 30, 2015 in PCT/IB15/052233 Filed Mar. 26, 2015.
International Search Report dated Sep. 22, 2015, in Application No. PCT/IB2015/052785, filed on Apr. 16, 2015.
International Search Report dated Nov. 27, 2015, in PCT/IB2015/055121, filed Jul. 7, 2015.
International Search Report and Written Opinion dated Mar. 29, 2016, in PCT/IB2015/054536, filed Jun. 16, 2015.
International Search Report and Written Opinion dated Jan. 18, 2016 in PCT/IB2015/057412 filed Sep. 28, 2015.
Wang, Feng-Peng et al., "Distance Measurement using Digital Cameras Based on Laser Spot Detection", published on Jun. 30, 2011, School of Physics and Electronic information, Gannan Normal University, Ganzhou 341000, China (with English Abstract).
Bahaa E. A. Saleh, et al., "Fundamentals of Photonics" John Wiley & Sons, Inc., Chapter 3, 1991, pp. 80-107 (with Cover Page).
International Search Report dated Mar. 21, 2016, in PCT/IB2015/059406.
International Search Report and Written Opinion in PCT/IB2015/059411 dated Mar. 16, 2016 filed Dec. 7, 2015.
Nam-Trung Nguyen, "Micro-optofluidic Lenses: A review", Biomicrofluidics, 2010, vol. 4, 031501-15.
Uriel Levy et al., "Tunable optofluidic devices", Microfluid Nanofluid, 2008, vol. 4, pp. 97-105.
International Search Report dated Mar. 15, 2016 in PCT/IB2015/059404 filed Dec. 7, 2015.
International Search Report and Written Opinion dated Mar. 21, 2016, in PCT/IB2015/059403, filed Dec. 7, 2015.
International Preliminary Report and Written Opinion dated Mar. 10, 2016, in PCT/IB2015/059404.
International Search Report dated Mar. 22, 2016 in PCT/IB2015/059408 filed Dec. 7, 2015.
International Search Report and Written Opinion dated May 27, 2016, in PCT/EP2016/051817, filed Jan. 28, 2016.
International Search Report dated May 20, 2016, in PCT/EP2016/054532.
International Preliminary Report on Patentability dated Aug. 1, 2017, in PCT/EP2016/051817.
Linyi Bian, et al., "Recent Progress in the Design of Narrow Bandgap Conjugated Polymers for High-Efficiency Organic Solar Cells", Progress in Polymer Science, vol. 37, 2012, pp. 1292-1331.
Antonio Facchetti, "Polymer donor-polymer acceptor (all-polymer) solar Cells", Materials Today, vol. 16 No. 4, Apr. 2013, pp. 123-132.
Graham H. Carey, et al., "Colloidal Quantum Dot Solar Cells", Chemical Reviews, vol. 115 No. 23, 2015, pp. 12732-12763.
Jason P. Clifford, et al., "Fast, Sensitive and Spectrally Tunable Colloidal Quantum-Dot Photodetectors", Nature Nanotechnology, Jan. 2009, pp. 1-5.
Kotaro Fukushima, et al., "Crystal Structures and Photocarrier Generation of Thioindigo Derivatives", Journal of Physical Chemistry B, vol. 102 No. 31, 1998, pp. 5985-5990.
Serap Günes, et al., "Hybrid Solar Cells", Inorganica Chimica Acta, vol. 361, 2008, pp. 581-588.
R. S. Mane, et al., "Chemical Deposition Method for Metal Chalcogenide Thin Films", Materials Chemistry and Physics, vol. 65, 2000, pp. 1-31.
Wilfried Hermes, "Emerging Thin-Film Photovoltaic Technologies", Chemie Ingenieur Technik, 2015, vol. 87 No. 4, pp. 376-389.
Paul H. Keck, "Photoconductivity in Vacuum Coated Selenium Films", Journal Optical Society of America, vol. 42 No. 4, Apr. 1952, pp. 221-225, with cover page.
Frank H. Moser, et al., "Phthalocyanine Compounds", Reinhold Publishing Corporation, 1963, p. 69-76 with cover pages.
M. Popescu, "Disordered Chalcogenide Optoelectronic Materials: Phenomena and Applications", Journal of Optoelectronics and Advanced Materials, vol. 7 No. 4, Aug. 2005, pp. 2189-2210.
Friedrich Andreas Sperlich, "Electron Paramagnetic Resonance Spectroscopy of Conjugated Polymers and Fullerenes for Organic Photovoltaics", Julius-Maximilians-Universität Würzburg, 2013, pp. 1-127.
F. Stöckmann, "Superlinear Photoconductivity", Physica Status Solidi, vol. 34, 1969, pp. 751-757.
Evangelos Theocharous, "Absolute Linearity Measurements on a PbS Detector in the Infrared", Applied Optics, vol. 45 No. 11, Apr. 10, 2006, pp. 2381-2386.
Evangelos Theocharous, et al., "Absolute Linearity Measurements on HgCdTe Detectors in the Infrared Region", Applied Optics, vol. 43 No. 21, Jul. 20, 2004, pp. 4182-4188.
Arthur L.Thomas, "Phthalocyanine Research and Applications", CRC Press, 1990, pp. 253-271 with cover pages.
International Search Report and Written Opinion dated Jul. 19, 2016 in PCT/EP2016/058487 filed Apr. 18, 2016.
International Preliminary Report on Patentability and Written Opinion dated Feb. 1, 2018, in PCT/EP2016/066783.
http://www.plenoptic.info/pages/refocusing.html.
C. Hahne, A. Aggoun, S. Haxha, V. Velisavljevic, and J. Fernández, "Light field geometry of a standard plenoptic camera," Opt. Express 22, 26659-26673 (2014).
C. Hahne, A. Aggoun, S. Haxha, V. Velisavljevic, and J. Fernández, "Baseline of virtual cameras acquired by a standard plenoptic camera setup," in 3D-TV-Conference: The True Vision—Capture, Transmission and Display of 3D Video (3DTV-CON), Jul. 2-4, 2014.

(56) References Cited

OTHER PUBLICATIONS

C. Hahne, A. Aggoun, and V. Velisavljevic, "The refocusing distance of a standard plenoptic photograph," in 3D-TV-Conference: The True Vision—Capture, Transmission and Display of 3D Video (3DTV-CON), Jul. 8-10, 2015.
C. Hahne and A. Aggoun, "Embedded FIR filter design for real-time refocusing using a standard plenoptic video camera," Proc. SPIE 9023, in Digital Photography X, 902305 (Mar. 7, 2014).
International Search Report and Written Opinion dated Nov. 17, 2016, in PCT/EP2016/071628, filed Sep. 14, 2016.
"Telezentrisches Objektiv" Retrieved from the Internet: https://de.wikipedia.org/wiki/Telezentrisches_Objektiv. Date of retrieval: Sep. 11, 2015, 3 Pages.
Benjamin F. Grewe. et al., "Fast Two-Layer Two-Photon Imaging of Neuronal Cell Populations Using an Electrically Tunable Lens," *Biomedical Optics Express*, vol. 2, No. 7, Jul. 1, 2011 (pp. 2035-2046).
Petr Bartu et al, "Conformable Large-AreaPposition-Sensitive Photodetectors Based on Luminescence-Collecting Silicone Waveguides," *Journal of Applied Physics*, 107, 123101 (2010).
Roland Stolarski, "Fluorescent Naphthalimide Dyes for Polyester Fibres," *Fibres & Textiies* in Eastern Europe, vol. 17, No. 2 (73) pp. 91-95 (2009).
Ayse Aktas et al., "Synthesis, Characterization, Electrochemical and Spectroelectrochemical Properties of Peripherally Tetra-Substituted Metal-Free and Metallophthalocyanines," *Dyes and Pigments*, 99, (2013) 613-619.
Hairong Li, et al., "Syntheses and Properties of Octa-, Tetra-, and Di-Hydroxy-Substituted Phthalocyanines," *Tetrahedron*, 65 (2009) 3357-3363.
"Methine Dyes and Pigments," *Ullmann's Encyclopedia of Industrial Chemistry*, vol. 23 (2012).
Jing Liu, et al., "Sulfone-Rhodarnines: A New Class of Near-Infrared Fluorescent Dyes for Bioimagin," *ACS Applied Materials& Interfaces*, 8, 22953-22962 (2016).
E. Noelting et al., "Berichte der deutschen chemischen Gesellschaft", *Band*, 38, S. 3516-3527 (1905).
T. Nedelcev et al., "Preparation and Characterization of a New Derivative of Rhodamine B with an Alkoxysilane Moiety," *Dyes and Pigments*, 76 (2008), 550-556.
Aurore Loudet et al., "BODIPY Dyes and Their Derivatives: Syntheses and Spectroscopic Properties," *Chem.Rev.*, 107 (2007) 4981-4932.
Weill Zhao, et al., "Conformationally Restricted Aza-Bodipy: A Highly fluorescent, Stable, Near-Infrared-Absorbing Dye", *Angew. Chem. Int. Ed.*, 44 (2005) 1677-1679.
Georg M. Fischer, et al., "Near-Infrared Dyes and Fluorophores Based on Diketopyrrolopyrroles," *Angew. Chem. Int. Ed.* 46 (2007) 3750-3753.
Amaresh Mishra et al., "Small Molecule Organic Semiconductors on the Move: Promises for Future Solar Energy Technology," *Angew. Chem. Int. Ed.*, 51, (2012), 2020-2067.
G. Seybold et al., "New Perylene and Violanthrone Dyestuffs for Fluorescent Collectors," *Dyes and Pigments*, 11 (1989) 303-317.
Nam-Trung Nguyen, "Micro-Optofluidic Lenses: A Review", *Biomicrofluidics*, 4, (2010) 031501.
Uriel Levy et al., "Tunable Optofluidic Devices," *Microfluid Nanofluid* (2008) 4: 97-105.
Robert Koeppe et al., "Video-Speed Detection of the Absolute Position of a Light Point on a Large-Area Photodetector Based on Luminescent Waveguides," *Optics Express*, vol. 18, No. 3, (Feb. 1, 2010), 2209.
International Search Report dated Nov. 7, 2017, in corresponding PCT/EP2017/057867.
International Search Report dated Jul. 7, 2017, in corresponding PCT/EP2017/057825.
Pekkola et al., "Focus-Induced Photoresponse: a novel way to measure distances with photodetectors", *Scientific Reports* (2018) 8:9208, 8 pages.
L. Pintilie, et al., "Field-effect-assisted photoconductivity in PbS films deposited on silicon dioxide", *J. Appl. Phys.* 91, p. 5782, 2002.
*Wikipedia*, Article denoted, "Thermocouple", retrieved Jul. 20, 2016.
Chinese Office Action dated Jan. 29, 2019, in Chinese Patent Application No. 201580036919.9.
R. M. Schaffert, "A New High-Sensitivity Organic Photoconductor for Electrophotography", *IBM J. Res. Develop.*, 1971, p. 75-89.
P. Gregory, Ed., *Chemistry and Technology of printing and imaging systems*, Chapman & Hall, 1996, Chap. 4, R.S. Gaims, Electrophotography, p. 76-112.
U.S. Appl. No. 15/775,424, filed May 11, 2018, Send, et al.
U.S. Appl. No. 15/778,454, filed May 23, 2018, Send, et al.
U.S. Appl. No. 15/960,581, filed Apr. 24, 2018, Send, et al.
Kurt Konolige et al., "A Low-Cost Laser Distance Sensor", 2008 *IEEE International Conference on Robotics and Automation*, Pasadena, CA, May 19-23, 2008.
X. Jiang et al., Dreidimensionales Computersehen, Chapter 2, Springer, Berlin Heidelberg (1997).
Street (Ed.): Technology and Applications of Amorphous Silicon, Springer-Verlag Heidelberg, 2010. pp. 346-349.
International Search Report dated Aug. 17, 2017, in corresponding PCT/EP2017/060057.
International Search Report dated Aug. 1, 2017, in corresponding PCT/EP2017/060058.
Walter Fuhs. "Hydrogenated Amorphous Silicon—Material Properties and Device Applications", in S. Baranovski, Charge Transport in Disordered Solids, Wiley, p. 97-147. 2006.
Internationai Preiiminary Report on Patentability and Written Opinion dated Aug. 22, 2019 in PCT/EP2018/053057.
U.S. Appl. No. 16/090,990, filed Oct. 3, 2018, Valouch, et al.
U.S. Appl. No. 16/091,409, filed Oct. 4, 2018, Send, et al.
U.S. Appl. No. 15/534,294, filed Jun. 8, 2017, Send, et al.
U.S. Appl. No. 15/554,496, filed Aug. 30, 2017, Send, et al.
U.S. Appl. No. 15/567,885, filed Oct. 19, 2017, Send, et al.
U.S. Appl. No. 15/751,283, filed Feb. 8, 2018, Send, et al.
U.S. Appl. No. 16/094,402, filed Oct. 17, 2018, Valouch, et al.
U.S. Appl. No. 16/095,846, filed Oct. 23, 2018, Valouch, et al.
U.S. Appl. No. 16/096,361, filed Oct. 25, 2018, Valouch, et al.
Ikeoka, et al., "Real-Time Depth Estimation with Wide Detectable Range Using Horizontal Planes of Sharp Focus Proceedings"; ACIVS 2011: Advanced Concepts for Intelligent Vision Systems, pp. 669-680 (with English Abstract) (https://link.springer.com/chapter/10.1007/978-3-642-23687-7_60).
J. Robertson, "High Dielectric Constant Oxides", *European Physical Journal Applied Physics*, vol. 28, No. 3, pp. 265-291, 2004.
J.A. Kittl et al., "High-k Dielectrics for Future Generation Memory Devices", *Microelectronic Engineering*, Vo. 86 (2009) 1789-1795.
Serap Günes, et al., "Hybrid Solar Cells", *Inorganica Chimica Acta* 361, (2008), p. 581-583.
John E. Anthony, et al., "n-Type Organic Semiconductors in Organic Electronics", *Adv. Mater.* 2010, 22, pp. 3876-3892.
Tian-yi Li, et al., "Small Molecule Near-Infrared Boron Dipyrromethene Donors for Organic Tandem Solar Cells", *J. Am. Chem. Soc.* 2017, 139, 13636-13639.
Christian Ulrich et al., "Organic Thin-Film Photovoltaic Cells Based on Oligothiophenes with Reduced Bandgap", *Adv. Funct. Mater.* 2007, 17, pp. 2991-2999.
Ronald Gresser, et al., "Synthesis and Characterization of Near-Infrared Absorbing Benzannulated Aza-BODIPY Dyes", *Chem. Eur. J.* 2011, 17, pp. 2939-2947.
Amaresh Mishra, et al., "Small Molecule Organic Semiconductors on the Move: Promises for Future Solar Energy Technology", *Angew. Chem. Int. Ed.* 2012, 51, 2020-2067.
Huifeng Yao, et al., "Molecular Design of Benzodithiophene-Based Organic Photovoltaic Materials", *Chem. Rev.* 2016, 116, 7397-7457.
Moritz Riede, et al., "Efficient Organic Tandem Solar Cells based on Small Molecules", *Adv. Funct. Mater.* 2011, 21, pp. 3019-3028.
Rico Schueppel, et al., "Controlled Current Matching in Small Molecule Organic Tandem Solar Cells Using Doped Spacer Layers", *J. Appl. Phys.* 107, 044503, 2010.

(56) References Cited

OTHER PUBLICATIONS

Jan Meiss et al., "Fluorinated Zinc Phthalocyanine as Donor for Efficient Vacuum-Deposited Organic Solar Cells," *Adv. Funct. Mater.* 2012, 22, pp. 405-414.
Office Action dated Dec. 18, 2018, in Japanese Patent Application No. 2016-518930.
U.S. Appl. No. 16/484,369, filed Aug. 7, 2019, Lungenschmied, et al.
U.S. Appl. No. 16/478,907, filed Jul. 18, 2019, Valouch, et al.
U.S. Appl. No. 16/483,231, filed Aug. 2, 2019, Send, et al.
Japan Office Action dated Jun. 9, 2020, in parallel Japanese Patent Application 2016-518930.
U.S. Appl. No. 16/461,654, filed May 16, 2019, Schildknecht, et al.
U.S. Appl. No. 16/461,670, filed May 16, 2019, Eberspach, et al.

\* cited by examiner

DETECTOR FOR OPTICALLY DETECTING AT LEAST ONE OBJECT

FIELD OF THE INVENTION

The invention relates to a detector, a detector system and a method for determining a position of at least one object. The invention further relates to a human-machine interface for exchanging at least one item of information between a user and a machine, an entertainment device, a tracking system, a camera, a scanning system and various uses of the detector device. The devices, systems, methods and uses according to the present invention specifically may be employed for example in various areas of daily life, gaming, traffic technology, production technology, security technology, photography such as digital photography or video photography for arts, documentation or technical purposes, medical technology or in the sciences. However, other applications are also possible.

PRIOR ART

A large number of optical sensors and photovoltaic devices are known from the prior art. While photovoltaic devices are generally used to convert electromagnetic radiation, for example, ultraviolet, visible or infrared light, into electrical signals or electrical energy, optical detectors are generally used for picking up image information and/or for detecting at least one optical parameter, for example, a brightness.

A large number of optical sensors which can be based generally on the use of inorganic and/or organic sensor materials are known from the prior art. Examples of such sensors are disclosed in US 2007/0176165 A1, U.S. Pat. No. 6,995,445 B2, DE 2501124 A1, DE 3225372 A1 or else in numerous other prior art documents. To an increasing extent, in particular for cost reasons and for reasons of large-area processing, sensors comprising at least one organic sensor material are being used, as described for example in US 2007/0176165 A1. In particular, so-called dye solar cells are increasingly of importance here, which are described generally, for example in WO 2009/013282 A1. The present invention, however, is not restricted to the use of organic devices. Thus, specifically, also inorganic devices such as CCD sensors and/or CMOS sensors, specifically pixelated sensors, may be employed.

A large number of detectors for detecting at least one object are known on the basis of such optical sensors. Such detectors can be embodied in diverse ways, depending on the respective purpose of use. Examples of such detectors are imaging devices, for example, cameras and/or microscopes. High-resolution confocal microscopes are known, for example, which can be used in particular in the field of medical technology and biology in order to examine biological samples with high optical resolution. Further examples of detectors for optically detecting at least one object are distance measuring devices based, for example, on propagation time methods of corresponding optical signals, for example laser pulses. Further examples of detectors for optically detecting objects are triangulation systems, by means of which distance measurements can likewise be carried out.

In WO 2012/110924 A1, the content of which is herewith included by reference, a detector for optically detecting at least one object is proposed. The detector comprises at least one optical sensor. The optical sensor has at least one sensor region. The optical sensor is designed to generate at least one sensor signal in a manner dependent on an illumination of the sensor region. The sensor signal, given the same total power of the illumination, is dependent on a geometry of the illumination, in particular on a beam cross section of the illumination on the sensor area. The detector furthermore has at least one evaluation device. The evaluation device is designed to generate at least one item of geometrical information from the sensor signal, in particular at least one item of geometrical information about the illumination and/or the object.

WO 2014/097181 A1, the full content of which is herewith included by reference, discloses a method and a detector for determining a position of at least one object, by using at least one transversal optical sensor and at least one optical sensor. Specifically, the use of sensor stacks is disclosed, in order to determine a longitudinal position of the object with a high degree of accuracy and without ambiguity.

WO 2015/024871 A1, the full content of which is herewith included by reference, discloses an optical detector, comprising:
- at least one spatial light modulator being adapted to modify at least one property of a light beam in a spatially resolved fashion, having a matrix of pixels, each pixel being controllable to individually modify the at least one optical property of a portion of the light beam passing the pixel;
- at least one optical sensor adapted to detect the light beam after passing the matrix of pixels of the spatial light modulator and to generate at least one sensor signal;
- at least one modulator device adapted for periodically controlling at least two of the pixels with different modulation frequencies; and
- at least one evaluation device adapted for performing a frequency analysis in order to determine signal components of the sensor signal for the modulation frequencies.

WO 2014/198629 A1, the full content of which is herewith included by reference, discloses a detector for determining a position of at least one object, comprising:
- at least one optical sensor, the optical sensor being adapted to detect a light beam propagating from the object towards the detector, the optical sensor having at least one matrix (152) of pixels; and
- at least one evaluation device, the evaluation device being adapted to determine a number N of pixels of the optical sensor which are illuminated by the light beam, the evaluation device further being adapted to determine at least one longitudinal coordinate of the object by using the number N of pixels which are illuminated by the light beam.

Further, generally, for various other detector concepts, reference may be made to WO 2014/198626 A1, WO 2014/198629 A1 and WO 2014/198625 A1, the full content of which is herewith included by reference. Further, referring to potential materials and optical sensors which may also employed in the context of the present invention, reference may be made to European patent applications No. EP 15 153 215.7, filed on Jan. 30, 2015, EP 15 157 363.1, filed on Mar. 3, 2015, and EP 15 164 653.6, filed on Apr. 22, 2015, the full content of which is herewith also included by reference.

Despite the advantages implied by the above-mentioned devices and detectors, several technical challenges remain. Thus, generally, a need exists for detectors for detecting a position of an object in space which is both reliable and may be manufactured at low cost. Specifically, a need exists for 3D-sensing concepts. Various known concepts are at least partially based on using so-called FiP sensors, such as several of the above-mentioned concepts. Therein, as an example, large area sensors may be used, in which the individual sensor pixels are significantly larger than the light spot and which are fixed to a specific size. Still, large area sensors in many cases are inherently limited in the use of the FiP measurement principle, specifically in case more than one light spot is to be investigated simultaneously. Alternatively, pixelated optical sensors may be used, such as in the pixel counting concepts disclosed in WO 2014/198629 A1. Even though these concepts allow for an efficient determination of 3D coordinates and even though these concepts are significantly superior to known 3D sensing concepts such as triangulation, some challenges remain, specifically regarding the need for calculating power and resources, as well as increasing the efficiency. Generally, it might also be desirable to employ commonly available optical sensors, such as CCD and/or CMOS sensors.

Problem Addressed by the Invention

It is therefore an object of the present invention to provide devices and methods facing the above-mentioned technical challenges of known devices and methods. Specifically, it is an object of the present invention to provide devices and methods which reliably may determine a position of an object in space, preferably with a low technical effort and with low requirements in terms of technical resources and cost.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a detector for determining a position of at least one object is disclosed. As used herein, the term "position" refers to at least one item of information regarding a location and/or orientation of the object and/or at least one part of the object in space. Thus, the at least one item of information may imply at least one distance between at least one point of the object and the at least one detector. As will be outlined in further detail below, the distance may be a longitudinal coordinate or may contribute to determining a longitudinal coordinate of the point of the object. Additionally or alternatively, one or more other items of information regarding the location and/or orientation of the object and/or at least one part of the object may be determined. As an example, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space.

The detector comprises:
- at least one optical sensor, the optical sensor being configured to detect at least one light spot generated by at least one light beam propagating from the object towards the detector, the optical sensor having at least one matrix of pixels, each pixel being adapted to generate at least one pixel signal $s_{i,j}$ in response to an illumination of the pixel by the light beam;
- at least one non-linearization device configured to transform the pixel signals $s_{i,j}$ of all pixels i, j or of at least one group of pixels into nonlinear pixel signals $s'_{i,j}$, the nonlinear pixel signals $s'_{i,j}$ each being a nonlinear function of the power of the illumination $p_{i,j}$ of the respective pixel;
- at least one summing device configured to add up the nonlinear pixel signals $s'_{i,j}$ of all pixels i, j or of the at least one group of pixels and to generate at least one nonlinear sum signal $S' = \Sigma_{i,j} s'_{i,j}$; and
- at least one evaluation device, the evaluation device being configured to determine at least one longitudinal coordinate z of the object by evaluating the nonlinear sum signal S'.

As used herein, an optical sensor generally refers to a light-sensitive device for detecting a light beam, such as for detecting an illumination and/or a light spot generated by a light beam. The optical sensor may be adapted, as outlined in further detail below, to determine at least one longitudinal coordinate of the object and/or of at least one part of the object, such as at least one part of the object from which the at least one light beam travels towards the detector.

As further used herein, a pixel generally refers to a light-sensitive element of the optical sensor, such as a minimum unit of the optical sensor adapted to generate a light signal. As an example, each pixel may have a light-sensitive area of 1 μm² to 5 000 000 μm², preferably 1 μm² to 4 000 000 µm², preferably 1 µm² to 1 000 000 µm² and more preferably 1 µm² to 5 000 µm². Still, other embodiments are feasible. The expression matrix generally refers to an arrangement of a plurality of the pixels in space, which may be a linear arrangement or an areal arrangement. Thus, generally, the matrix preferably may be selected from the group consisting of a one-dimensional matrix and a two-dimensional matrix. As an example, the matrix may comprise 100 to 100 000 000 pixels, preferably 1 000 to 10 000 000 pixels and, more preferably, 100 000 to 5 000 000 pixels. Most preferably, the matrix is a rectangular matrix having pixels arranged in rows and columns. Still, other matrix arrangements are feasible, such as circular or hexagonal arrangements.

As used herein, a pixel signal generally refers to an arbitrary memorable and transferable signal which is generated by the pixels, in response to the illumination. Thus, as an example, the pixel signal may be or may comprise at least one electronic signal, which may be or may comprise a digital electronic signal and/or an analogue electronic signal. The pixel signal may be or may comprise at least one voltage signal and/or at least one current signal. Further, either raw pixel signals may be used, or the detector, the optical sensor or any other element may be adapted to process or preprocess the pixel signals, thereby generating secondary pixel signals, which may also be used as pixel signals, such as preprocessing by filtering or the like.

The pixel signals symbolically are denoted by $s_{i,j}$. Therein, the indices i and j denote integers which indicate coordinates of the respective pixel, such that each pixel uniquely may be identified by its coordinates i, j. As an example, the matrix may be a rectangular n×m matrix, with n, m being integers, such that i, j may denote Cartesian coordinates of the pixels with $i \in \{1, \ldots, n\}$ and $j \in \{1, \ldots, m\}$. As an alternative example, the matrix may be a circular matrix, having a plurality of concentric rings of pixels, with i denoting a number of the ring and j denoting a specific pixel within the ring, or vice versa. Other coordinate systems are feasible. The same nomenclature codes hold true for the nonlinear pixel signals $s'_{i,j}$, since each of the nonlinear pixel signals corresponds to a specific pixel signal. Further, the same nomenclature with indices i, j holds true for the power of the illumination $p_{i,j}$ of the pixels.

As will be outlined in further detail below, the pixel signals specifically may be proportional to the intensity of the illumination of the respective pixels, at least within a range of measurement, such as up to a predetermined or determinable maximum intensity. Thus, generally, the formula $s_{i,j} = a \cdot p_{i,j} + b$ may be applicable, for all i, j, at least within the range of measurement, with a and b being real numbers and with $p_{i,j}$ being the power of the illumination of the respective pixel, such as the intensity of illumination of the respective pixel and/or any other photometric or radiometric value indicating the power of the illumination of the respective pixel.

In order to avoid exceeding the maximum intensity and, thus, in order to avoid exceeding the range of measurement, the detector may comprise one or more attenuating elements, such as one or more filter elements.

As further used herein, the term non-linearization device generally refers to an arbitrary device, which transforms at least one input signal into at least one output signal, wherein the output signal is non-proportional to the input signal. In other words, the output signal is not a linear function of the input signal. In this case, the detector may be adapted to feed the pixel signals $s_{i,j}$ of all pixels i, j or of at least one group of pixels into the at least one non-linearization device as input signals, and the non-linearization device renders corresponding nonlinear pixel signals $s'_{i,j}$ as output signals.

As will be outlined in further detail below, the non-linearization device may fully or partially be implemented by hardware or may fully or partially be implemented by an appropriate software running on a computer, such as a processor and/or an application-specific integrated circuit. Further, the non-linearization device may fully or partially be integrated into one or more other components of the detector, such as into the optical sensor and/or into the summing device and/or into the evaluation device. Alternatively, however, the non-linearization device may also be embodied as a separate, independent component. Further, one or more dedicated non-linearization devices may be provided for each pixel. Alternatively, however, two or more or even all of the pixels may share one or more common non-linearization devices.

In the art, many ways of generating nonlinear output signals in response to an input signal are known and may be implemented in the present invention. As will be outlined in further detail below, specifically, one or more Gamma correction devices may be used as non-linearization devices, which are generally known in the art of display technology and/or camera technology.

As outlined above, the transformation of the pixel signals into the nonlinear pixel signals may be performed for all of the pixels or for one or more groups of pixels. In the latter case, as an example, the detector, such as one or more of the non-linearization device, the summing device, the evaluation device or any other component of the detector, may be adapted to define at least one region of interest, wherein the pixels within the region of interest are defined as pixels belonging to the at least one group. In order to select specific pixels, such as for assigning these pixels to one or more groups and/or regions of interest, one or more switches, fully or partially embodied in hardware and/or fully or partially embodied in software running on a computer, may be used. Thus, as an example, the transformation of the pixel signals into the nonlinear pixel signals and/or the adding up of the nonlinear pixel signals may be performed for the selected pixels belonging to the at least one group, only, such as by switching on these pixels and/or by switching a connection between these pixels and the non-linearization device and/or the summing device. Other embodiments are feasible.

As further used herein, a summing device generally refers to an arbitrary device which is configured to add to one or more signals, specifically electrical signals, such as digital signals and/or analogue signals. In case a very high number of pixels of pixel density is given, the adding up of the pixels may correspond to an integration over the matrix and/or at least one part of the matrix. Again, the summing device may fully or partially be embodied by hardware and/or may fully or partially be embodied by software running on a computer. In the art of electronics, summing devices are generally known to the skilled person.

As further used herein, the term evaluation device generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands.

Specifically, as will be outlined in further detail below, the evaluation device may be configured to determine the at least one longitudinal coordinate z of the object by using at least one known, determinable or predetermined relationship between the nonlinear sum signal and the longitudinal coordinate.

The present invention specifically may make use of the following facts and findings, without wishing to be bound by this theory. Thus, for linear pixel signals, as outlined above, the following equation may apply:

$$s_{i,j} = a \cdot p + b \qquad (1)$$

When adding up the pixel signals, the following sum signal will result:

$$S = \Sigma_{i,j} s_{i,j} = \Sigma_{i,j}(a \cdot p_{i,j} + b) = a \cdot P + b \cdot N, \qquad (2)$$

with $P = \Sigma_{i,j} p_{i,j}$ denoting the overall power of illumination of the optical sensor or the at least one group of pixels by the light beam, and with N being an integer denoting the number of pixels over which the summation takes place, i.e. the number of pixels of the matrix or the number of pixels within the at least one group of pixels. In other words, in the linear case, the sum signal, also referred to as the linear sum signal, is a linear function of the overall power of illumination P, i.e. is independent from the size d of the light spot generated by the light beam on the optical sensor.

Contrarily, in the nonlinear case:

$$s'_{i,j} = g(p_{i,j}), \qquad (1')$$

with g being a nonlinear function, such as a polynomial function with a degree >1, an exponential function, a logarithmic function, a root function, such as a square root function, a trigonometric function, a hyperbolic function, a Gaussian function, an error function, or a further special function. The nonlinear function may further be a piecewise-defined function defined by multiple sub-functions. The nonlinear function is preferably monotonically increasing in the intensity range of interest. Consequently, the nonlinear sum signal $$S' = \Sigma_{i,j} s'_{i,j} = \Sigma_{i,j} g(p_{i,j}) \neq a \cdot P + b \cdot N, \qquad (2')$$

is a nonlinear function f(P, d) of the total power of the illumination and of the size d of the light spot.

As an example which is rather simple to implement, again, a linear optical sensor may be used, in which equation (1) holds true, at least within a predetermined measurement range. In this case, the non-linearization device may simply multiply the pixel signals of all pixels or of the at least one group of pixels with a nonlinear function of itself, such as a function $c(s_{i,j})$:

$$s'_{i,j} = c(s_{i,j}) \cdot s_{i,j}. \qquad (3)$$

As will be outlined in further detail below, again, non-linear functions c such as exponential functions, logarithmic functions, root functions, such as a square root function, trigonometric functions, hyperbolic functions, Gaussian functions, error functions, or further special functions, polynomial functions or a Gamma function such as used for Gamma correction in display technology and/or camera technology may be used. The nonlinear functions may further be piecewise-defined functions, defined by multiple sub-functions, or may be a sum, product, convolution or the like, of linear and nonlinear functions. The nonlinear functions are preferably monotonically increasing or decreasing in the intensity range of interest. By implementing equation (1), similar to equation (2'), it is evident that the nonlinear Sum signal S is a function of the size of the light spot. A spreading of a constant energy or power of radiation over a larger or smaller number of pixels, i.e. over a larger or smaller light spot, will modify the nonlinear sum signal S'.

These findings, however, may be used to derive the size d of the light spot from the nonlinear sum signal S' and/or, since the size d of the light spot changes with the distance between the optical sensor and the object from which the light beam travels towards the detector, to derive at least one longitudinal coordinate z of the object.

In case the total power P of the illumination is known, determinable or predetermined, such as by using one or more well-defined illumination sources or beacon devices being one or more of attached to the object, integrated into the object or held by the object, such as by using one or more well-defined LEDs connected to the object, a predetermined or determinable relationship between S' and d and/or S' and z may be used. This relationship, in the most simple case, may be derived empirically, such as by monitoring the nonlinear sum signals S' for a plurality of experiments in which the longitudinal coordinate z is varied. Thereby, as an example, a list or lookup table may be generated, in which spot sizes d and/or longitudinal coordinates z are listed for a plurality of nonlinear sum signals S'. Additionally or alternatively, analytical or semi-analytical approaches may be used for determining the relationship between S' and d and/or S' and z, such as by using theoretical Gaussian wave optical considerations and/or by using simulations such as FEM simulations.

The method, however, also may be used in case the total power P of the illumination is unknown or even non-constant. Thus, as an example, a plurality of optical sensors may be used, and the results may be normalized for the total power P. Additionally or alternatively, in addition to the nonlinear sum signal S', the sum signal S may be determined, according to equation (2) above, and the total power P may be derived thereof, or, additionally or alternatively, the sum signal S may be used for normalizing the results of the nonlinear sum signal S'. Thereby, the same case as above with known total power P of illumination may be generated.

As outlined above, the longitudinal coordinate z may be derived, or, which shall also be comprised by the term "longitudinal coordinate", any other raw measurement value or secondary measurement value which corresponds to the longitudinal coordinate or from which the longitudinal coordinate may be derived. As one example, as discussed above, the size d of the light spot may be used, which corresponds to the longitudinal coordinate and/or from which the longitudinal coordinate may be derived. Thus, specifically for Gaussian light beams, the following relationships between the size d of the light spot and the longitudinal coordinate z may be used:

$$d(z) \sim w(z) = w_0 \cdot \sqrt{1 + \left(\frac{z}{z_0}\right)^2}, \qquad (4)$$

wherein z is the longitudinal coordinate, wherein $w_0$ is a minimum beam radius of the light beam when propagating in space, wherein $z_0$ is a Rayleigh-length of the light beam with $z_0 = \pi \cdot w_0^2 / \lambda$, $\lambda$ being the wavelength of the light beam.

The beam radius w of the transversal profile of the Gaussian light beam generally representing a Gaussian curve is defined, for a specific z-value, as a specific distance from the z-axis at which the amplitude E has dropped to a value of 1/e (approx. 36%) and at which the intensity I has dropped to $1/e^2$. The minimum beam radius, which, in the Gaussian equation given above (which may also occur at other z-values, such as when performing a z-coordinate transformation), occurs at coordinate z=0, is denoted by $w_0$. Depending on the z-coordinate, the beam radius generally follows equation (4) as given above, when the light beam propagates along the z-axis.

Consequently, determining the longitudinal coordinate may imply directly determining the longitudinal coordinate z, may imply determining one or more parameters defining the size of the light spot or may imply both, simultaneously or in a stepwise fashion.

The above-mentioned operations, including determining the at least one longitudinal coordinate of the object, are performed by the at least one evaluation device. Thus, as an example, one or more of the above-mentioned relationships may be implemented in software and/or hardware, such as by implementing one or more lookup tables. Thus, as an example, the evaluation device may comprise one or more programmable devices such as one or more computers, application-specific integrated circuits (ASICs) or Field Programmable Gate Arrays (FPGAs) which are configured to perform the above-mentioned evaluation, in order to determine the at least one longitudinal coordinate of the object by evaluating the nonlinear sum signal. Additionally or alternatively, however, the evaluation device may also fully or partially be embodied by hardware.

It shall further be noted that two or more of the above-mentioned devices, including the optical sensor, the non-linearization device, the summing device and the evaluation device, may fully or partially be integrated into one or more devices. Specifically, the non-linearization device may fully or partially be integrated into the optical sensor, as is the case e.g. in many non-linearization devices integrated into CCD or CMOS camera chips for the purpose of Gamma correction. Further, additionally or alternatively, the summing device and/or the evaluation device may fully or partially be integrated into the optical sensor. Additionally or alternatively, the non-linearization device and the summing device may fully or partially be integrated into a common device which performs both functions and which, as an example, may comprise one or more hardware components such as one or more ASICs and/or one or more FPGAs. Additionally or alternatively, the non-linearization device and/or the summing device may also fully or partially be integrated into the evaluation device, such as by implementing one or more of their functions by using software components.

The degree of integration may also have an impact on the speed of evaluation and the maximum frequency. Thus, as outlined above, the detector may also fully or partially be embodied as a camera and/or may be used in a camera, suited for acquiring standstill images or suited for acquiring video clips. In order to achieve a high image frequency, a hardware integration may be preferable, such as by fully or partially implementing the summing device by using hardware components such as one or more operational amplifiers for summing analogue signals and/or by using one or more digital summing devices such as one or more electronic adders such as Carry-Ripple adders, full adders or the like. Further, as outlined above, one or more ASIC components and/or FPGAs may be used.

The detector according to one or more of the above-mentioned embodiments may be modified and improved or even optimized in various ways, which will be briefly discussed in the following and which may also be implemented in various arbitrary combinations, as the skilled person will recognize.

Thus, as outlined above, the evaluation device may be configured to determine the at least one longitudinal coordinate z of the object by using at least one predetermined relationship between the sum signal S' and the longitudinal coordinate z. The predetermined relationship specifically may be selected from the group consisting of an empiric relationship determined by recording sum signals for objects positioned at a plurality of longitudinal coordinates or an analytical relationship. Various examples are given above. Specifically, mainly in case an analytical or semi analytical approach is used, the predetermined relationship may be based on the assumption of the light beam being a Gaussian light beam.

The non-linearization device specifically may be configured to apply at least one nonlinear function $g(s_{i,j})$ to the nonlinear pixel signal, wherein $s'_{i,j}=g(s_{i,j})$, for i, j denoting all pixels or the at least one group of pixels. The nonlinear function specifically may be selected from the group consisting of: a convex function; a concave function; a polynomial function; an exponential function, such as an exp(x)-function; a logarithmic function; a root function, such as a square root function sqrt(x); a further nonlinear function such as a special function; a Gamma correction function. The nonlinear function may further be a piecewise-defined function defined by multiple sub-functions. The nonlinear function may be monotonically increasing or decreasing in the intensity range of interest. Other examples are given above.

Further, the detector may be configured such that the nonlinear sum signal S' is a function S'(P, d) of the overall power of illumination of the optical sensor or the at least one group of pixels by the light beam $P=\Sigma_{i,j}p_{i,j}$ and the size d of a light spot generated by the light beam on the optical sensor. Therein, generally, an arbitrary parameter or combination of parameters may be used for denoting the size d of the light spot, as discussed above. As an example, a beam waist, a radius, a diameter, or any other parameter of this kind may be used, as explained above in the context of equation (4). As an example, the size d may be selected from the group consisting of: a diameter of the light spot; an equivalent diameter of the light spot, a beam waist of the light spot; a double beam waist of the light spot; a full width at half maximum of the intensity of the light spot.

The detector, specifically one or more of the optical sensor, the non-linearization device, the summing device or the evaluation device, further may be configured to select at least one region of interest within the matrix of the pixels, wherein the pixels within the region of interest form the at least one group of pixels. Thus, instead of evaluating the sum signal and/or the nonlinear sum signal of all pixels of the matrix, for the purpose of deriving the longitudinal coordinate, only one or more groups of pixels may be evaluated. Thus, as an example, the region of interest may be a portion or a combination of portions of the matrix which contain an image of the object. Thus, in a first step, which may be performed once, specifically initially, or repeatedly, an evaluation of the image on the matrix of pixels may take place, in order to detect the at least one object, such as by using pattern recognition algorithms. Subsequently, a region of interest may be chosen in accordance with the results of the evaluation of the image, such as by choosing an area of the matrix which contains the image of the object, as a region of interest. For exemplary embodiments of choosing a region of interest within an image and for tracking certain objects within the image, reference may be made, e.g., to WO 2015/024871 A1, the full content of which is herewith included by reference.

The choosing of the at least one group of pixels and/or the selection of these pixels may fully or partially be embodied in hardware, may fully or partially be embodied in software or both. Thus, as an example, the detector may comprise a plurality of switches and may be configured to perform the selection by using the switches. As an example, as outlined above, the detector may comprise one or more summing devices, specifically fully or partially embodied in hardware, and a plurality of switches for selecting pixels for summing, wherein, by actuating the switches, specific pixels may be connected to the at least one summing device. The switches, as an example, may be controlled by software, such as in response to the result of the image evaluation as discussed above.

The optical sensor, as outlined above, specifically may be configured such that, at least within a predetermined range of measurement, specifically within a predetermined range of intensity of the illumination of the optical sensor and/or of each pixel, the pixel $s_{i,j}$ signals of the pixels are a linear function of the power of the illumination $p_{i,j}$ of the respective pixel. Therein, a precise linearity may be given, wherein, possibly, also certain tolerances in linearity may be acceptable, such as a deviation from a precisely linear function of no more than 20%, preferably of no more than 10% and most preferably of no more than 5%. In case a linearity is given, with or without the above-mentioned tolerances, the detector specifically may be configured such that a sum signal of the pixel signals $s_{i,j}$ of all pixels i, j or of the at least one group of pixels $S=\Sigma_{i,j} s_{i,j}$ is a function S(P) of the overall power P of illumination and is, at least widely and/or within a predetermined or determinable tolerance and/or within a predetermined or determinable range of measurement, independent from the size d of the light spot generated by the light beam on the optical sensor. The advantage of this configuration clearly resides in the fact that the sum signal S may be used as a standard and/or as a reference and/or for calibration purposes. Therefore, specifically, the detector may be configured to additionally record the sum signal S. The evaluation device may be further configured to determine the at least one longitudinal coordinate z of the object by using the sum signal S. Thus, as an example, e.g. in case a lookup table is used and/or in case a plurality of calibration curves or relationships are used, the sum signal S may be used for selecting an appropriate relationship, such as an appropriate value of the lookup table for the specific sum signal S and/or an appropriate calibration curve for the specific sum signal S and, thus, for the given total power P. Additionally or alternatively, the sum signal S may also be used for normalizing the nonlinear sum signal, such as by using the normalized sum signal S'/S for further evaluation and determination of the longitudinal coordinate. Thus, specifically, the evaluation device may be configured to use the sum signal S for normalizing the nonlinear sum signal for the overall power P of the illumination.

The non-linearization device, as outlined above, may comprise at least one hardware component, preferably at least one of a processor, an FPGA or an ASIC. Other embodiments or combinations of the named options are feasible.

The non-linearization device, as discussed above, may fully or partially be embodied in hardware and/or may fully or partially be embodied in software. Thus, the non-linearization device may be embodied as a software program running on a processor, specifically a processor of the evaluation device. Other embodiments are feasible, as discussed above.

The summing device specifically may comprise at least one hardware component, selected from the group consisting of: an adder; a summer; a summing amplifier; an adder for analogue quantities; an adder for digital quantities. Other embodiments of summing devices are given above. Again, the summing device may fully or partially be embodied by using hardware and/or may fully or partially be embodied by using software, as discussed above. The summing device, thus, may also at least partially be embodied as a software program running on a processor, specifically a processor of the evaluation device. Other embodiments are feasible.

The detector may comprise a single optical sensor or a plurality of optical sensors. Thus, as discussed in various of the above-mentioned applications which are included by reference, specifically as discussed e.g. in WO 2014/097181 A1 and/or as is evident in view of equation (4) above, an ambiguity exists in the size of the light spot at equal distances before and after the focal point. Thus, specifically for resolving this ambiguity, more than one optical sensor may be used, wherein the optical sensors are positioned at different positions along one or more beam paths of the light beam. Thus, by comparing the signals and/or the results retrieved by the two or more optical sensors, it may be determined whether the focal point is located before the optical sensors (beam is typically widening), behind the optical sensors (beam is typically narrowing) or in between, wherein the latter often requires the use of three or more optical sensors. Thus, specifically, the evaluation device may be configured to determine the at least one longitudinal coordinate z of the object by evaluating the nonlinear sum signals S' of at least two of the optical sensors. At least two of the optical sensors may be positioned at different positions along at least one beam path of the light beam, such that an optical path length between the object and the at least two optical sensors is non-identical. The evaluation device specifically may be configured to use the nonlinear sum signals S' of at least two of the optical sensors for resolving ambiguities in a relationship between the sum signal S' and the longitudinal coordinate z.

In case a plurality of optical sensors is used, the optical sensors may be located in one and the same beam path, specifically in case one or more of the optical sensors are transparent or semi-transparent, or at least two of the optical sensors may be positioned in different partial beam paths of the detector. Thus, the beam path of the detector may be split into two or more partial beam paths, such as by using one or more beam splitting elements, specifically one or more semi-transparent mirrors and/or beam splitting cubes. Other embodiments are feasible.

Further, the optical sensors may have identical spectral sensitivities. Alternatively, at least two of the optical sensors may have differing spectral sensitivities, wherein the evaluation device, in the latter case, may be adapted to determine a color of the light beam by comparing sensor signals of the optical sensors having differing spectral sensitivities.

Other options refer to the various types of optical sensors which may be used in the context of the present invention. Thus, generally, the at least one optical sensor may be or may comprise at least one of an organic optical sensor, an inorganic optical sensor such as an inorganic semiconductor optical sensor, or a hybrid optical sensor comprising one or more organic materials and one or more inorganic materials. Thus, for pixelated optical sensors, reference may be made to the various prior art documents, such as one or more of the prior art documents listed above. Specifically, however, commercially available components may be used, such as commercially available camera chips having a one-dimensional or two-dimensional matrix of pixels. As an example, the at least one optical sensor may comprise one or more of a CCD device, a CMOS device, a photodetector array, a focal plane array or a bolometer array. As used therein, the term "array" generally refers to a plurality of the named elements, arranged in a pattern, such as in a 1-dimensional or 2-dimensional matrix. The array specifically may be or may comprise a rectangular, circular, hexagonal or star-shaped pattern, specifically in a plane perpendicular to an optical axis of the detector. The term "photodetector" generally refers to an element capable of detecting electromagnetic radiation, specifically light in one or more of the ultraviolet, the visible or the infrared spectral range. As further used therein, the term "focal-plane array" generally refers to an image sensing device comprising an array of light-sensing elements such as pixels, arranged at the focal plane of a lens, such as a lens of an optional transfer device of the detector. As further used therein, the term "bolometer" refers to a device for measuring the power of incident electromagnetic radiation by using a temperature-dependent electrical resistance or resistor which is heated up by the electromagnetic radiation.

The matrix of pixels specifically may be a rectangular matrix having at least one row and a plurality of columns of pixels or having a plurality of rows and at least one column of pixels. The matrix specifically may comprise at least 10 columns, preferably at least 100 columns, and wherein the matrix comprises at least 10 rows, preferably at least 100 rows.

As outlined above, by evaluating the nonlinear sum signal S', the detector is enabled to determine the at least one longitudinal coordinate of the object, including the option of determining the longitudinal coordinate of the whole object or of one or more parts thereof. In addition, however, other coordinates of the object, including transversal coordinates and/or rotational coordinates, may be determined by the detector, specifically by the evaluation device. Thus, as an example, a transversal position of the light spot generated by the light beam may be evaluated, such as by determining coordinates of a center of the light spot and/or coordinates of a maximum intensity of the light spot, within the matrix of pixels. Since, typically, the properties of the optical setup of the detector are known, such as by knowing positions and/or properties of one or more lenses or other refractive elements positioned in one or more beam paths of the detector, at least one transversal coordinate of the object may be determined by the evaluation device. Thus, generally, the evaluation device may further be adapted to determine at least one transversal coordinate x, y of the object by determining a position of the light beam on the matrix of pixels.

The detector according to the present invention as well as the other devices and the method proposed in the context of the present invention, specifically, may be considered as a software version of the so-called "FiP" effect which is explained in further detail in WO 2012/110924 A1 and/or in WO 2014/097181 A1. Therein, "FiP" alludes to the effect that a signal i may be generated which, given the same total power P of the illumination, depends on the photon density, the photon flux and, thus, on the cross-section $\phi(F)$ of the incident beam. In the context of the present invention, the signal i may be replaced by the at least one nonlinear sum signal S', and, thus, linear optical sensors may be used, and the FiP effect may be generated by simply summing the nonlinear pixel signals. Thus, despite the fact that, as outlined above, hardware and/or software components may be used, and without intending the scope of the present invention, the technique which is used in the context of the present invention may also be referred to as an "artificial FiP effect" or as a "software FiP effect", since the at least one optical sensor used herein may be a linear optical sensor, in conjunction with an artificial subsequent non-linearization by hardware and/or software. Thus, without intending any narrowing of the scope, specifically without intending to narrow potential solutions to software solutions, the detector according to the present invention will also be referred to as a "software FiP detector".

As outlined above, the detector may further comprise one or more optical elements, such as one or more lenses and/or one or more refractive elements, one or more mirrors, one or more diaphragms or the like. These optical elements which are adapted to modify the light beam, such as by modifying one or more of a beam parameter of the light beam, a width of the light beam or a direction of the light beam, in the following, will also be referred to as a transfer element. Thus, the detector may further comprise at least one transfer device, wherein the transfer device may be adapted to guide the light beam onto the optical sensor, such as by one or more of deflecting, focusing or defocusing the light beam. Specifically, the transfer device may comprise one or more lenses and/or one or more curved mirrors and/or one or more other types of refractive elements.

In case the detector comprises one or more transfer devices, the at least one transfer device specifically may have at least one focal length. Therein, the focal length may be fixed or variable. In the latter case, specifically, one or more focused tunable lenses may be comprised in the at least one transfer device. In this context, as an example, reference may be made to European patent application number 14 196 944.4, filed on Dec. 9, 2014, the full content of which is herewith included by reference. The focus-tunable lenses disclosed therein may also be used in the at least one optional transfer device of the detector according to the present invention.

As used herein, the term "focus-tunable lens" generally refers to an optical element being adapted to modify a focal position of a light beam passing the focus-tunable lens in a controlled fashion. The focus-tunable lens may be or may comprise one or more lens elements such as one or more lenses and/or one or more curved mirrors, with an adjustable or tunable focal length. The one or more lenses, as an example, may comprise one or more of a biconvex lens, a biconcave lens, a plano-convex lens, a plano-concave lens, a convex-concave lens, or a concave-convex lens. The one or more curved mirrors may be or may comprise one or more of a concave mirror, a convex mirror, or any other type of mirror having one or more curved reflective surfaces. Any arbitrary combination thereof is generally feasible, as the skilled person will recognize. Therein, a "focal position" generally refers to a position at which the light beam has the narrowest width. Still, the term "focal position" generally may refer to other beam parameters, such as a divergence, a Raleigh length or the like, as will be obvious to the person skilled in the art of optical design. Thus, as an example, the focus-tunable lens may be or may comprise at least one lens, the focal length of which may be changed or modified in a controlled fashion, such as by an external influence light, a control signal, a voltage or a current. The change in focal position may also be achieved by an optical element with switchable refractive index, which by itself may not be a focusing device, but which may change the focal point of a fixed focus lens when placed into the light beam. As further used in this context, the term "in a controlled fashion" generally refers to the fact that the modification takes place due to an influence which may be exerted onto the focus-tunable lens, such that the actual focal position of the light beam passing the focus-tunable lens and/or the focal length of the focus-tunable lens may be adjusted to one or more desired values by exerting an external influence on to the focus-tunable lens, such as by applying a control signal to the focus-tunable lens, such as one or more of a digital control signal, an analog control signal, a control voltage or a control current. Specifically, the focus-tunable lens may be or may comprise a lens element such as a lens or a curved mirror, the focal length of which may be adjusted by applying an appropriate control signal, such as an electrical control signal.

Examples of focus-tunable lenses are known in the literature and are commercially available. As an example, reference may be made to the tunable lenses, preferably the electrically tunable lenses, as available by Optotune AG, CH-8953 Dietikon, Switzerland, which may be employed in the context of the present invention. Further, focus tunable lenses as commercially available from Varioptic, 69007 Lyon, France, may be used. For a review on focus-tunable lenses, specifically based on fluidic effects, reference may be made, e.g., to N. Nguyen: "Micro-optofluidic Lenses: A review", Biomicrofluidics, 4, 031501 (2010) and/or to Uriel Levy, Romi Shamai: "Tunable optofluidic devices", Microfluid Nanofluid, 4, 97 (2008). It shall be noted, however, that other principles of focus-tunable lenses may be used in addition or alternatively.

Various principles of focus-tunable lenses are known in the art and may be used within the present invention. Thus, firstly, the focus-tunable lens may comprise at least one transparent shapeable material, preferably a shapeable material which may change its shape and, thus, may change its optical properties and/or optical interfaces due to an external influence, such as a mechanical influence and/or an electrical influence. An actuator exerting the influence may specifically be part of the focus-tunable lens. Additionally or alternatively, the focus tunable lens may have one or more ports for providing at least one control signal to the focus tunable lens, such as one or more electrical ports. The shapeable material may specifically be selected from the group consisting of a transparent liquid and a transparent organic material, preferably a polymer, more preferably an electroactive polymer. Still, combinations are possible. Thus, as an example, the shapeable material may comprise two different types of liquids, such as a hydrophilic liquid and a lipophilic liquid. Other types of materials are feasible.

The focus-tunable lens may further comprise at least one actuator for shaping at least one interface of the shapeable material. The actuator specifically may be selected from the group consisting of a liquid actuator for controlling an amount of liquid in a lens zone of the focus-tunable lens or an electrical actuator adapted for electrically changing the shape of the interface of the shapeable material.

One embodiment of focus-tunable lenses are electrostatic focus-tunable lenses. Thus, the focus-tunable lens may comprise at least one liquid and at least two electrodes, wherein the shape of at least one interface of the liquid is changeable by applying one or both of a voltage or a current to the electrodes, preferably by electro-wetting. Additionally or alternatively, the focus tunable lens may be based on a use of one or more electroactive polymers, the shape of which may be changed by applying a voltage and/or an electric field.

A single focus-tunable lens or a plurality of focus-tunable lenses may be used. Thus, the focus-tunable lens may be or may comprise a single lens element or a plurality of single lens elements. Additionally or alternatively, a plurality of lens elements may be used which are interconnected, such as in one or more modules, each module having a plurality of focus-tunable lenses. Thus, as an example, the at least one focus-tunable lens may be or may comprise at least one lens array, such as a micro-lens array, such as disclosed in C. U. Murade et al., Optics Express, Vol. 20, No. 16, 18180-18187 (2012). Other embodiments are feasible, such as a single focus-tunable lens.

The at least one focus-tunable lens may be used in various ways. Thus, specifically, by using at least one focus tunable lens in the at least one optional transfer device, ambiguities in the determination of the z coordinate may be resolved. Thus, as explained e.g. in WO 2014/097181 A1, a beam waist or beam diameter of a light beam, specifically of a Gaussian ray, is symmetric before and after the focal point and, thus, an ambiguity exists in case the size of the light spot is determined in only one longitudinal position. Therefore, as proposed in WO 2014/097181 A1, the size of the light spot into different positions may be determined, which is also possible in the context of the present invention, in order to resolve the ambiguity and in order to determine the at least one z-coordinate of the object in a non-ambiguous fashion. For this purpose, as an example, two or more than two optical sensors may be used, which preferably are positioned at different positions along an optical beam path and/or which are positioned in different partial beam paths, as will be explained in further detail below. Additionally or alternatively, however, the at least one optional focus-tunable lens may be used, and an evaluation according to the present invention may take place with at least two different adjustments, i.e. at least two different focal positions of the at least one focus-tunable lens. By shifting the focal position, the above-mentioned ambiguity may be resolved since the sizes of the beam spot measured, in one case, at a constant distance before the focal position and, in a second case, measured at the constant distance behind the focal position will behave differently when the focal position is changed. Thus, in one case, the size of the light spot will increase and in the other case decrease, or vice versa, as the skilled person easily may derive when looking at e.g. FIG. 5A or 5B of WO 2014/097181 A1.

Thus, by using the at least one focus-tunable lens, beam splitters or a splitting of the beam path into two or more partial beam paths may be avoided. Still, one or more intransparent optical sensors may be used. At least one focus-tunable lens can be used to record two or more images in a row, which, as an example, may be used as an input signal for the evaluation device. Thereby, a detector or a camera with only one beam path may be realized, such as by recording two or more images in a row with different lens focus of the at least one focus-tunable lens. The images may be used as an input for the at least one evaluation device.

Secondly, the at least one focus-tunable lens may be used for recording images in different object planes. Thus, by changing the focal length of the at least one focus-tunable lens, a 3-D imaging may take place.

Thus, generally, the at least one optional transfer device may comprise at least one focus-tunable lens. The detector, specifically the evaluation device, may be configured to subsequently record images in different object planes. Additionally or alternatively, the detector, specifically the evaluation device, may be configured to determine longitudinal coordinates of at least two different parts of the object having different longitudinal coordinates z by evaluating at least two different nonlinear sum signals S' acquired at at least two different adjustments of the at least one focus-tunable lens. The detector, specifically the evaluation device, may be configured to resolve ambiguities in the determination of the at least one longitudinal coordinate z by comparing results obtained at at least two different adjustments of the at least one focus-tunable lens.

Further, additionally or alternatively, the at least one transfer device may comprise at least one multi-lens system, such as at least one array of lenses, specifically at least one micro-lens array. As used herein, a "multi-lens" system generally refers to a plurality of lenses, an "array of lenses" refers to a plurality of lenses arranged in a pattern, such as in a rectangular, circular, hexagonal or star-shaped pattern, specifically in a plane perpendicular to an optical axis of the detector. A "micro-lens array" refers to an array of lenses having a diameter or equivalent diameter in the submillimeter range, such as having a diameter or equivalent diameter of less than 1 mm, specifically 500 µm or less, more specifically 300 µm or less.

By using at least one multi-lens system, specifically at least one array of lenses, more specifically at least one micro-lens array, optionally in conjunction with at least one further lens, such as at least one main lens, the detector may be embodied as one or both of a light field camera and/or a plenoptic camera.

Thus, specifically, a light-field or plenoptic detector or camera may be realized, having micro-lenses, which record images in at least two different focal plains, such as simultaneously or subsequently. The recorded information specifically may directly be used as input for the evaluation device.

As used herein, a "light-field detector" generally refers to an optical detector which is configured to record information from at least two different object planes, preferably simultaneously. Further, as used herein, a "light-field camera" generally refers to a camera which is configured to record images from at least two different object planes, preferably simultaneously. As further used herein, a "plenoptic detector" generally refers to a detector having a plurality of lenses and/or a plurality of curved mirrors having differing focal points, such as a plurality of lenses and/or a plurality of curved mirrors being located in a plane perpendicular to an optical axis of the detector. Similarly, as used herein, a "plenoptic camera" generally refers to a camera having a plurality of lenses and/or a plurality of curved mirrors having differing focal points, such as a plurality of lenses and/or a plurality of curved mirrors being located in a plane perpendicular to an optical axis of the camera.

The optics of the light-field detector and/or the light-field camera specifically may comprise at least one main lens or main lens system, and, additionally, at least one multi-lens system, specifically at least one array of lenses, more specifically at least one micro-lens array. The light-field detector and/or the light-field camera further comprises the at least one optical sensor, such as the at least one CCD and/or CMOS sensor. The optical sensor specifically may be an image sensor.

While recording an image, objects in a first object plane may be in focus, so that the image plane may coincide with the lenses of a plane of the multi-lens system, specifically of the at least one array of lenses, more specifically of the at least one micro-lens array. The image focused on this object plane may be obtained by summing up the nonlinear sensor-pixel signals or intensities below each lens, such as below each micro-lens. In other words, the image-pixel intensity may be given by the sum of the nonlinear sensor-pixel intensities below one micro-lens. The image resolution specifically may be identical to the number of micro-lenses. In order to refocus an image to a different object plane, different sensor-pixels are summed up to obtain the nonlinear image-pixel intensity. In other words, a regrouping of the pixels may lead to a change of the focus and, thus, to a change of the object plane. The pixels specifically may be chosen such that the central rays of the micro-lenses coincide in the new image plane. The resolution of each image may equal the number of micro-lenses. The number of different images that can be extracted directly from the recorded image may equal the number of pixels beneath one micro-lens.

A software-FiP-system specifically may use software and/or hardware in order to transform the linear pixel-signal of a CMOS or CCD into a sum of nonlinear pixel signals to obtain a FiP-signal. A light-field camera may use software and/or hardware in order to transform the linear pixel-signals under the micro-lenses into a linear sum of pixel signals to obtain images in different focus planes or in different viewing angles. The summing procedure of the light-field camera may be performed in a nonlinear way in order to obtain FiP-signals in different focal planes.

The light-field camera setup may be optimized on the hardware side for use as a FiP-camera. Thus, for FiP, the image resolution may be higher, while only two focal planes may be sufficient. Therefore, the number of micro-lenses may be increased, while the number of sensor pixels beneath one microlens may be decreased. Further, concerning the software-FiP, the FiP-signals may be calculated at two fixed focal planes. The software may therefore be optimized accordingly. Combining a micro-lens-based light-field camera with the software-FiP further allows to provide a commercially available FiP-system with only one optical path.

For further details on the functionality of light-field cameras, reference may be made to one or more of WO 2014/198625 A1, WO 2014/198629 A1, or WO 2015/024871 A1, the full content of which is herewith included by reference. Further, for the general principles of light-field detectors and/or light-field cameras, specifically for changing the object plane and for refocusing, reference may be made to one or more of the following publications, all of which are available online via http://www.plenoptic.info/pages/refocusing.html:

C. Hahne, A. Aggoun, and V. Velisavljevic, "The refocusing distance of a standard plenoptic photograph," in 3D-TV-Conference: The True Vision—Capture, Transmission and Display of 3D Video (3DTV-CON), 8-10 Jul. 2015.

C. Hahne, A. Aggoun, S. Haxha, V. Velisavljevic, and J. Fernandez, "Light field geometry of a standard plenoptic camera," Opt. Express 22, 26659-26673 (2014).

C. Hahne, A. Aggoun, S. Haxha, V. Velisavljevic, and J. Fernandez, "Baseline of virtual cameras acquired by a standard plenoptic camera setup," in 3D-TV-Conference: The True Vision—Capture, Transmission and Display of 3D Video (3DTV-CON), 2-4 Jul. 2014.

C. Hahne and A. Aggoun, "Embedded FIR filter design for real-time refocusing using a standard plenoptic video camera," Proc. SPIE 9023, in Digital Photography X, 902305 (Mar. 7, 2014).

Summarizing, the at least one optional transfer device may comprise at least one multi-lens system, specifically at least one array of lenses, more specifically at least one micro-lens array. Groups of pixels of the optical sensor may be assigned to lenses of the multi-lens system, preferably one group of pixels to each lens of the multi-lens system, such that the light passing through a lens of the multi-lens system illuminates pixels of a respective group of pixels assigned to the lens. The detector may be embodied as one or both of a light field camera and/or a plenoptic camera.

The detector, specifically the evaluation device, may be configured to determine longitudinal coordinates of at least two portions, also referred to as parts, of the object located at different longitudinal coordinates. Therein, the detector may be configured to determine at least one first longitudinal coordinate of at least one first portion of the object located at at least one first longitudinal coordinate by adding up nonlinear pixel signals of pixels of at least one first group of pixels and thereby generating at least one first nonlinear sum signal, and further by evaluating the first nonlinear sum signal, and the detector may further be configured to determine at least one second longitudinal coordinate of at least one second portion of the object located at at least one second longitudinal coordinate by adding up nonlinear pixel signals of pixels of at least one second group of pixels, i.e. by adding up pixel signals of pixels of the at least one second group of pixels after performing the at least one non-linearization step, and thereby generating at least one second nonlinear sum signal, and further by evaluating the second nonlinear sum signal.

Further, the detector, specifically the at least one summing device, may be configured to group the pixels in a first way, thereby generating a first plurality of groups of pixels, the first plurality of defining a first object plane, wherein the summing device is configured to add up the nonlinear pixel signals $s'_{i,j}$ of the pixels of each group of pixels of the first plurality of groups of pixels, thereby generating a plurality of first nonlinear sum signals $S_k = \Sigma_{i,j} s'_{i,j,k}$, with integer k denoting the respective group within the first group of pixels; and the detector, specifically the at least one summing device, may be configured to group the pixels in at least one second way, thereby generating at least one second plurality of groups of pixels, the second plurality of defining at least one second object plane, wherein the summing device is configured to add up the nonlinear pixel signals $s'_{i,j}$ of the pixels of each group of pixels of the second plurality of groups of pixels, thereby generating at least one plurality of second nonlinear sum signals $S'_l = \Sigma_{i,j} s'_{i,j,l}$, with integer l denoting the respective group within the second group of pixels.

Again, as for the use of the at least one focus-tunable lens, the design of the detector and/or the camera as a light-field or plenoptic detector or camera provides the advantage that intransparent optical sensors may be used, without the necessity of splitting the beam path into two or more partial beam paths, by using one or more beam splitting elements. In both cases, however, the splitting of the beam path is still possible within the present invention.

In a further aspect of the present invention, a detector system for determining a position of at least one object is disclosed. The detector system comprises at least one detector according to the present invention, such as according to one or more of the embodiments disclosed above or according to one or more of the embodiments disclosed in further detail below. The detector system further comprising at least one beacon device adapted to direct at least one light beam towards the detector, wherein the beacon device is at least one of attachable to the object, holdable by the object and integratable into the object. Further details regarding the beacon device will be given below, including potential embodiments thereof. Thus, the at least one beacon device may be or may comprise at least one active beacon device, comprising one or more illumination sources such as one or more light sources like LEDs, lasers, light bulbs or the like.

Additionally or alternatively, the at least one beacon device may be adapted to reflect one or more light beams towards the detector, such as by comprising one or more reflective elements. Further, the at least one beacon device may be or may comprise one or more scattering elements adapted for scattering a light beam. Therein, elastic or inelastic scattering may be used. In case the at least one beacon device is adapted to reflect and/or scatter a primary light beam towards the detector, the beacon device may be adapted to leave the spectral properties of the light beam unaffected or, alternatively, may be adapted to change the spectral properties of the light beam, such as by modifying a wavelength of the light beam.

In a further aspect of the present invention, a human-machine interface for exchanging at least one item of information between a user and a machine is disclosed. The human-machine interface comprises at least one detector system according to the embodiments disclosed above and/or according to one or more of the embodiments disclosed in further detail below. Therein, the at least one beacon device is adapted to be at least one of directly or indirectly attached to the user or held by the user. The human-machine interface is designed to determine at least one position of the user by means of the detector system, wherein the human-machine interface is designed to assign to the position at least one item of information.

In a further aspect of the present invention, an entertainment device for carrying out at least one entertainment function is disclosed. The entertainment device comprises at least one human-machine interface according to the embodiment disclosed above and/or according to one or more of the embodiments disclosed in further detail below. The entertainment device is configured to enable at least one item of information to be input by a player by means of the human-machine interface. The entertainment device is further configured to vary the entertainment function in accordance with the information.

In a further aspect of the present invention, a tracking system for tracking a position of at least one movable object is disclosed. The tracking system comprises at least one detector system according to one or more of the embodiments referring to a detector system as disclosed above and/or as disclosed in further detail below. The tracking system further comprises at least one track controller. The track controller is adapted to track a series of positions of the object at specific points in time.

In a further aspect of the present invention, a camera for imaging at least one object is disclosed. The camera comprises at least one detector according to any one of the embodiments referring to a detector as disclosed above or as disclosed in further detail below.

Further, the present invention discloses a method for determining a position of at least one object by using a detector, such as a detector according to the present invention, such as according to one or more of the embodiments referring to a detector as disclosed above or as disclosed in further detail below. Still, other types of detectors may be used.

The method comprises the following method steps, wherein the method steps may be performed in the given order or may be performed in a different order. Further, one or more additional method steps may be present which are not listed. Further, one, more than one or even all of the method steps may be performed repeatedly.

The method steps are as follows:

at least one detection step, comprising detecting at least one light spot generated by at least one light beam propagating from the object towards the detector by using at least one optical sensor of the detector, the optical sensor having at least one matrix of pixels, wherein each pixel generates at least one pixel signal $s_{i,j}$ in response to an illumination of the pixel by the light beam;

at least one non-linearization step, comprising transforming the pixel signal $s_{i,j}$ of all pixels i, j or of at least one group of pixels into nonlinear pixel signals $s'_{i,j}$, the nonlinear pixel signals $s'_{i,j}$ each being a nonlinear function of the power of the illumination $p_{i,j}$ of the respective pixel, specifically by using at least one non-linearization device of the detector;

at least one summing step, comprising adding up the nonlinear pixel signals $s'_{i,j}$ of all pixels i, j or of the at least one group of pixels and generating at least one nonlinear sum signal $S'=\Sigma_{i,j} s'_{i,j}$, specifically by using at least one summing device of the detector; and at least one evaluation step, comprising determining at least one longitudinal coordinate z of the object by evaluating the nonlinear sum signal S', specifically by using at least one evaluation device of the detector.

For details, options and definitions, reference may be made to the detector as discussed above. Thus, specifically, as outlined above, the method may comprise using the detector according to the present invention, such as according to one or more of the embodiments given above or given in further detail below.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; a security application; a surveillance application; a safety application; a human-machine interface application; a tracking application; a photography application; a use in combination with at least one time-of-flight detector; a use in combination with a structured light source; a use in combination with a stereo camera; a machine vision application; a robotics application; a quality control application; a manufacturing application; a use in combination with a structured illumination source; a use in combination with a stereo camera.

The optical sensor may comprise one or more signal processing devices, such as one or more filters and/or analogue-digital-converters for processing and/or preprocessing the at least one signal. The one or more signal processing devices may fully or partially be integrated into the optical sensor and/or may fully or partially be embodied as independent software and/or hardware components.

For determining the at least one transversal position of the at least one object, as an example and as outlined above, a center of the light spot may be determined, specifically by the evaluation device. Thus, the evaluation device generally may be adapted to determine at least one pixel having the highest illumination out of the pixels by comparing the signals of the pixels. Thus, the detector generally may be adapted to determine one or more pixels and/or an area or region of the matrix having the highest intensity of the illumination by the light beam. As an example, in this way, a center of the light spot generated by the light beam may be determined.

The highest illumination and/or the information about the at least one area or region of highest illumination may be used in other ways, too. Thus, as an example, the highest illumination may also be used for determining whether the elimination still is within a predetermined or determinable measurement range, such as in order to determine whether the pixel signals still are within a linear range. An out of range detection may be implemented, in order to generate a warning in case a measurement range is exceeded and/or in order to apply technical means to bring back the pixel signals into the measurement range, such as by automatically applying one or more optical filters and/or software or hardware filters.

Further, as outlined above, the spot size, specifically the diameter and/or beam waist of the light spot may depend on the highest illumination within the light spot. Thus, typically, the beam waist is defined as the radius of the light spot, extending from the center of illumination to a spot in which the intensity of the illumination has dropped down to a factor of $1/e^2$. Thus, the threshold $1/e^2$ generally determines the borders of a light spot having a beam radius or beam waist w generated by a Gaussian light beam on the optical sensor.

As outlined above, at least one optical sensor may be provided. The at least one optical sensor generally may be transparent or may be intransparent. Thus, as an example, the optical sensor may be transparent and adapted to transmit at least 10%, preferably at least 20% and, more preferably, at least 50% of the power of the light beam. In case a plurality of the optical sensors is provided in a stacked fashion, preferably, at least one of the optical sensors is transparent. Still, one of the major advantages of the present invention resides in the fact that conventional camera chips may be used as optical sensors, which, typically, are intransparent. In this case, a splitting of the beam path is typically preferable in case a plurality of optical sensors is used, in order to avoid the necessity of using transparent optical sensors.

In case a plurality of the optical sensors is provided, which may be arranged in the stacked fashion and/or in another arrangement, the optical sensors may have identical spectral sensitivities or may provide different spectral sensitivities. Thus, as an example, at least two of the optical sensors may have a differing spectral sensitivity. As used herein, the term spectral sensitivity generally refers to the fact that the sensor signal of the optical sensor, for the same power of the light beam, may vary with the wavelength of the light beam. Thus, generally, at least two of the optical sensors may differ with regard to their spectral properties. This embodiment generally may be achieved by using different types of optical filters and/or different types of absorbing materials for the optical sensors, such as different types of dyes or other absorbing materials. Additionally or alternatively, differing spectral properties of the optical sensors may be generated by other means implemented into the optical sensors and/or into the detector, such as by using one or more wavelength-selective elements, such as one or more filters (such as color filters) in front of the optical sensors and/or by using one or more prisms and/or by using one or more dichroitic mirrors. Thus, in case a plurality of optical sensors is provided, at least one of the optical sensors may comprise a wavelength-selective element such as a color filter, having a specific transmission or reflection characteristic, thereby generating differing spectral properties of the optical sensors.

In case a plurality of the optical sensors is used, wherein at least two of the optical sensors differ with regard to their respective spectral sensitivity, the evaluation device generally may be adapted to determine a color of the light beam by comparing sensor signals of the optical sensors having the differing spectral sensitivity. As used herein, the expression "determine a color" generally refers to the step of generating at least one item of spectral information about the light beam. The at least one item of spectral information may be selected from the group consisting of a wavelength, specifically a peak wavelength; color coordinates, such as CIE coordinates.

The determination of the color of the light beam may be performed in various ways which are generally known to the skilled person. Thus, the spectral sensitivities of the optical sensors may span a coordinate system in color space, and the signals provided by the optical sensors may provide a coordinate in this color space, as known to the skilled person for example from the way of determining CIE coordinates.

As an example, the detector may comprise two, three or more optical sensors in a stack. Thereof, at least two, preferably at least three, of the optical sensors may have differing spectral sensitivities. Further, the evaluation device may be adapted to generate at least one item of color information for the light beam by evaluating the signals of the optical sensors having differing spectral sensitivities.

As an example, at least three optical sensors being spectrally sensitive optical sensors may be contained in the stack. Thus, e.g., the spectrally sensitive optical sensors may comprise at least one red sensitive optical sensor, the red sensitive optical sensor having a maximum absorption wavelength $\lambda r$ in a spectral range 600 nm<$\lambda r$<780 nm, wherein the spectrally sensitive optical sensors further comprise at least one green sensitive optical sensor, the green sensitive optical sensor having a maximum absorption wavelength $\lambda g$ in a spectral range 490 nm<$\lambda g$<600 nm, wherein the spectrally sensitive optical sensors further may comprise at least one blue sensitive optical sensor, the blue sensitive optical sensor having a maximum absorption wavelength $\lambda b$ in a spectral range 380 nm<$\lambda b$<490 nm. As an example, the red sensitive optical sensor, the green sensitive optical sensor and the blue sensitive optical sensor, in this order or in a different order, may be the first optical sensors of the optical sensor stack, facing towards the object.

The evaluation device may be adapted to generate at least two color coordinates, preferably at least three color coordinates, wherein each of the color coordinates is determined by dividing a signal of one of the spectrally sensitive optical sensors by a normalization value. As an example, the normalization value may contain a sum of the signals of all spectrally sensitive optical sensors. Additionally or alternatively, the normalization value may contain a detector signal of a white detector.

The at least one item of color information may contain the color coordinates. The at least one item of color information may, as an example, contain CIE coordinates.

In addition to the preferred at least two, more preferably at least three, spectrally sensitive optical sensors, the detector may further comprise at least one white optical sensor, wherein the white detector may be adapted to absorb light in an absorption range of all spectrally sensitive detectors. Thus, as an example, the white optical sensor may have an absorption spectrum absorbing light all over the visible spectral range.

Further, in case a plurality of optical sensors is provided, the plurality of optical sensors may differ with regard to device setup and/or with regard to the materials used in the optical sensors. Specifically, the optical sensors may differ with regard to their organic or inorganic in nature. Thus, the plurality of optical sensors may comprise one or more organic optical sensors, one or more inorganic optical sensors, one or more hybrid organic-inorganic optical sensors or an arbitrary combination of at least two of these optical sensors. Thus, as an example, the detector may consist of organic optical sensors only, may consist of inorganic optical sensors only or may consist of hybrid organic-inorganic optical sensors, only. Additionally or alternatively, the detector may comprise at least one organic optical sensor and at least one inorganic optical sensor or may comprise at least one organic optical sensor and at least one hybrid organic-inorganic optical sensor or may comprise at least one organic optical sensor and at least one hybrid organic-inorganic optical sensor.

As outlined above, the detector may further comprise at least one transfer device. The transfer device preferably may be positioned in a light path, also referred to as a beam path, in between the object and the detector. As used herein, a transfer device generally is an arbitrary optical element adapted to guide the light beam onto the optical sensor. The guiding may take place with unmodified properties of the light beam or may take place with imaging or modifying properties. Thus, generally, the transfer device might have imaging properties and/or beam-shaping properties, i.e. might change a beam waist and/or a widening angle of the light beam and/or a shape of the cross-section of the light beam when the light beam passes the transfer device. The transfer device, as an example, may comprise one or more elements selected from the group consisting of a lens and a mirror. The mirror may be selected from the group consisting of a planar mirror, a convex mirror and a concave mirror. Additionally or alternatively, one or more prisms may be comprised. Additionally or alternatively, one or more wavelength-selective elements may be comprised, such as one or more filters, specifically color filters, and/or one or more dichroitic mirrors. Again, additionally or alternatively, the transfer device may comprise one or more diaphragms, such as one or more pinhole diaphragms and/or iris diaphragms.

The transfer device can for example comprise one or a plurality of mirrors and/or beam splitters and/or beam deflecting elements in order to influence a direction of the electromagnetic radiation. Alternatively or additionally, the transfer device can comprise one or a plurality of imaging elements which can have the effect of a converging lens and/or a diverging lens. By way of example, the optional transfer device can have one or a plurality of lenses and/or one or a plurality of convex and/or concave mirrors. Once again alternatively or additionally, the transfer device can have at least one wavelength-selective element, for example at least one optical filter. Once again alternatively or additionally, the transfer device can be designed to impress a predefined beam profile on the electromagnetic radiation, for example, at the location of the sensor region and in particular the sensor area. The above-mentioned optional embodiments of the optional transfer device can, in principle, be realized individually or in any desired combination. The at least one transfer device, as an example, may be positioned in front of the detector, i.e. on a side of the detector facing towards the object.

In addition to the at least one longitudinal coordinate of the object, at least one transversal coordinate of the object may be determined. By providing one or more transversal coordinates, such as x- and/or y-coordinates, the evaluation device may be adapted to provide at least one three-dimensional position of the object.

As outlined above, in one aspect of the present invention, a detector system for determining a position of at least one object is disclosed. The detector system comprises at least one detector according to the present invention, such as at least one detector as disclosed in one or more of the embodiments described above and/or as disclosed in one or more of the embodiments disclosed in further detail below.

The detector system further comprises at least one beacon device adapted to direct at least one light beam towards the detector. As used herein and as will be disclosed in further detail below, a beacon device generally refers to an arbitrary device adapted to direct at least one light beam towards the detector. The beacon device may fully or partially be embodied as an active beacon device, comprising at least one illumination source for generating the light beam. Additionally or alternatively, the beacon device may fully or partially be embodied as a passive beacon device comprising at least one reflective element adapted to reflect a primary light beam generated independently from the beacon device towards the detector.

The beacon device is at least one of attachable to the object, holdable by the object and integratable into the object. Thus, the beacon device may be attached to the object by an arbitrary attachment means, such as one or more connecting elements. Additionally or alternatively, the object may be adapted to hold the beacon device, such as by one or more appropriate holding means. Additionally or alternatively, again, the beacon device may fully or partially be integrated into the object and, thus, may form part of the object or even may form the object.

Generally, with regard to potential embodiments of the beacon device, reference may be made to one or more of WO 2014/097181 A1 or US 2014/0291480 A1 or PCT/EP2014/078155, the latter filed on Dec. 17, 2014. Still, other embodiments are feasible.

As outlined above, the beacon device may fully or partially be embodied as an active beacon device and may comprise at least one illumination source. Thus, as an example, the beacon device may comprise a generally arbitrary illumination source, such as an illumination source selected from the group consisting of a light-emitting diode (LED), a light bulb, an incandescent lamp and a fluorescent lamp. Other embodiments are feasible.

Additionally or alternatively, as outlined above, the beacon device may fully or partially be embodied as a passive beacon device and may comprise at least one reflective device adapted to reflect a primary light beam generated by an illumination source independent from the object.

Thus, in addition or alternatively to generating the light beam, the beacon device may be adapted to reflect a primary light beam towards the detector.

The detector system may comprise one, two, three or more beacon devices. Thus, generally, in case the object is a rigid object which, at least on a microscope scale, thus not change its shape, preferably, at least two beacon devices may be used. In case the object is fully or partially flexible or is adapted to fully or partially change its shape, preferably, three or more beacon devices may be used. Generally, the number of beacon devices may be adapted to the degree of flexibility of the object. Preferably, the detector system comprises at least three beacon devices.

The object generally may be a living or non-living object. The detector system even may comprise the at least one object, the object thereby forming part of the detector system. Preferably, however, the object may move independently from the detector, in at least one spatial dimension.

The object generally may be an arbitrary object. In one embodiment, the object may be a rigid object. Other embodiments are feasible, such as embodiments in which the object is a non-rigid object or an object which may change its shape.

As will be outlined in further detail below, the present invention may specifically be used for tracking positions and/or motions of a person, such as for the purpose of controlling machines, gaming or simulation of sports. In this or other embodiments, specifically, the object may be selected from the group consisting of: an article of sports equipment, preferably an article selected from the group consisting of a racket, a club, a bat; an article of clothing; a hat; a shoe.

In a further aspect of the present invention, as outlined above, the human-machine interface for exchanging at least one item of information between a user and a machine is disclosed. The human-machine interface comprises at least one detector system according to the present invention, such as to one or more of the embodiments disclosed above and/or according to one or more of the embodiments disclosed in further detail below. The beacon devices are adapted to be at least one of directly or indirectly attached to the user and held by the user. The human-machine interface is designed to determine at least one position of the user by means of the detector system. The human-machine interface further is designed to assign to the position at least one item of information.

In a further aspect of the present invention, an entertainment device for carrying out at least one entertainment function is disclosed. The entertainment device comprises at least one human-machine interface according to the present invention. The entertainment device further is designed to enable at least one item of information to be input by a player by means of the human-machine interface. The entertainment device further is designed to vary the entertainment function in accordance with the information.

As outlined above, in a further aspect of the present invention, the tracking system for tracking a position of at least one movable object is disclosed. The tracking system comprises at least one detector system according to the present invention, such as to one or more of the embodiments disclosed above and/or according to one or more of the embodiments disclosed in further detail below. The tracking system further comprises at least one track controller, wherein the track controller is adapted to track a series of positions of the object at specific points in time.

Thus, generally, the devices according to the present invention, such as the detector, may be applied in various fields of uses. Specifically, the detector may be applied for a purpose of use, selected from the group consisting of: a position measurement in traffic technology; an entertainment application; a security application; a human-machine interface application; a tracking application; a photography application; a mapping application for generating maps of at least one space, such as at least one space selected from the group of a room, a building and a street; a mobile application; a webcam; an audio device; a dolby surround audio system; a computer peripheral device; a gaming application; a camera or video application; a security application; a surveillance application; an automotive application; a transport application; a medical application; a sports' application; a machine vision application; a vehicle application; an airplane application; a ship application; a spacecraft application; a building application; a construction application; a cartography application; a manufacturing application; a use in combination with at least one time-of-flight detector. Additionally or alternatively, applications in local and/or global positioning systems may be named, especially landmark-based positioning and/or navigation, specifically for use in cars or other vehicles (such as trains, motorcycles, bicycles, trucks for cargo transportation), robots or for use by pedestrians. Further, indoor positioning systems may be named as potential applications, such as for household applications and/or for robots used in manufacturing technology.

Thus, firstly, the devices according to the present invention may be used in mobile phones, tablet computers, laptops, smart panels or other stationary or mobile or wearable computer or communication applications. Thus, the devices according to the present invention may be combined with at least one active light source, such as a light source emitting light in the visible range or infrared spectral range, in order to enhance performance. Thus, as an example, the devices according to the present invention may be used as cameras and/or sensors, such as in combination with mobile software for scanning environment, objects and living beings. The devices according to the present invention may even be combined with 2D cameras, such as conventional cameras, in order to increase imaging effects. The devices according to the present invention may further be used for surveillance and/or for recording purposes or as input devices to control mobile devices, especially in combination with voice and/or gesture recognition. Thus, specifically, the devices according to the present invention acting as human-machine interfaces, also referred to as input devices, may be used in mobile applications, such as for controlling other electronic devices or components via the mobile device, such as the mobile phone. As an example, the mobile application including at least one device according to the present invention may be used for controlling a television set, a game console, a music player or music device or other entertainment devices.

Further, the devices according to the present invention may be used in webcams or other peripheral devices for computing applications. Thus, as an example, the devices according to the present invention may be used in combination with software for imaging, recording, surveillance, scanning or motion detection. As outlined in the context of the human-machine interface and/or the entertainment device, the devices according to the present invention are particularly useful for giving commands by facial expressions and/or body expressions. The devices according to the present invention can be combined with other input generating devices like e.g. mouse, keyboard, touchpad, microphone etc. Further, the devices according to the present invention may be used in applications for gaming, such as by using a webcam. Further, the devices according to the present invention may be used in virtual training applications and/or video conferences. Further, devices according to the present invention may be used to recognize or track hands, arms, or objects used in a virtual or augmented reality application, especially when wearing head mounted displays.

Further, the devices according to the present invention may be used in mobile audio devices, television devices and gaming devices, as partially explained above. Specifically, the devices according to the present invention may be used as controls or control devices for electronic devices, entertainment devices or the like. Further, the devices according to the present invention may be used for eye detection or eye tracking, such as in 2D- and 3D-display techniques, especially with transparent displays for augmented reality applications and/or for recognizing whether a display is being looked at and/or from which perspective a display is being looked at. Further, devices according to the present invention may be used to explore a room, boundaries, obstacles, in connection with a virtual or augmented reality application, especially when wearing a head-mounted display.

Further, the devices according to the present invention may be used in or as digital cameras such as DSC cameras and/or in or as reflex cameras such as SLR cameras. For these applications, reference may be made to the use of the devices according to the present invention in mobile applications such as mobile phones, as disclosed above.

Further, the devices according to the present invention may be used for security or surveillance applications. Thus, as an example, at least one device according to the present invention can be combined with one or more digital and/or analogue electronics that will give a signal if an object is within or outside a predetermined area (e.g. for surveillance applications in banks or museums). Specifically, the devices according to the present invention may be used for optical encryption. Detection by using at least one device according to the present invention can be combined with other detection devices to complement wavelengths, such as with IR, x-ray, UV-VIS, radar or ultrasound detectors. The devices according to the present invention may further be combined with an active infrared light source to allow detection in low light surroundings. The devices according to the present invention are generally advantageous as compared to active detector systems, specifically since the devices according to the present invention avoid actively sending signals which may be detected by third parties, as is the case e.g. in radar applications, ultrasound applications, LIDAR or similar active detector devices. Thus, generally, the devices according to the present invention may be used for an unrecognized and undetectable tracking of moving objects. Additionally, the devices according to the present invention generally are less prone to manipulations and irritations as compared to conventional devices.

Further, given the ease and accuracy of 3D detection by using the devices according to the present invention, the devices according to the present invention generally may be used for facial, body and person recognition and identification. Therein, the devices according to the present invention may be combined with other detection means for identification or personalization purposes such as passwords, finger prints, iris detection, voice recognition or other means. Thus, generally, the devices according to the present invention may be used in security devices and other personalized applications.

Further, the devices according to the present invention may be used as 3D barcode readers for product identification.

In addition to the security and surveillance applications mentioned above, the devices according to the present invention generally can be used for surveillance and monitoring of spaces and areas. Thus, the devices according to the present invention may be used for surveying and monitoring spaces and areas and, as an example, for triggering or executing alarms in case prohibited areas are violated. Thus, generally, the devices according to the present invention may be used for surveillance purposes in building surveillance or museums, optionally in combination with other types of sensors, such as in combination with motion or heat sensors, in combination with image intensifiers or image enhancement devices and/or photomultipliers. Further, the devices according to the present invention may be used in public spaces or crowded spaces to detect potentially hazardous activities such as commitment of crimes such as theft in a parking lot or unattended objects such as unattended baggage in an airport.

Further, the devices according to the present invention may advantageously be applied in camera applications such as video and camcorder applications. Thus, the devices according to the present invention may be used for motion capture and 3D-movie recording. Therein, the devices according to the present invention generally provide a large number of advantages over conventional optical devices. Thus, the devices according to the present invention generally require a lower complexity with regard to optical components. Thus, as an example, the number of lenses may be reduced as compared to conventional optical devices, such as by providing the devices according to the present invention having one lens only. Due to the reduced complexity, very compact devices are possible, such as for mobile use. Conventional optical systems having two or more lenses with high quality generally are voluminous, such as due to the general need for voluminous beam-splitters. Further, the devices according to the present invention generally may be used for focus/autofocus devices, such as autofocus cameras. Further, the devices according to the present invention may also be used in optical microscopy, especially in confocal microscopy.

Further, the devices according to the present invention generally are applicable in the technical field of automotive technology and transport technology. Thus, as an example, the devices according to the present invention may be used as distance and surveillance sensors, such as for adaptive cruise control, emergency brake assist, lane departure warning, surround view, blind spot detection, rear cross traffic alert, and other automotive and traffic applications. Further, the devices according to the present invention can also be used for velocity and/or acceleration measurements, such as by analyzing a first and second time-derivative of position information gained by using the detector according to the present invention. This feature generally may be applicable in automotive technology, transportation technology or general traffic technology. Applications in other fields of technology are feasible. A specific application in an indoor positioning system may be the detection of positioning of passengers in transportation, more specifically to electronically control the use of safety systems such as airbags. The use of an airbag may be prevented in case the passenger is located as such, that the use of an airbag will cause a severe injury.

In these or other applications, generally, the devices according to the present invention may be used as stand-alone devices or in combination with other sensor devices, such as in combination with radar and/or ultrasonic devices. Specifically, the devices according to the present invention may be used for autonomous driving and safety issues. Further, in these applications, the devices according to the present invention may be used in combination with infrared sensors, radar sensors, which are sonic sensors, two-dimensional cameras or other types of sensors. In these applications, the generally passive nature of the devices according to the present invention is advantageous. Thus, since the devices according to the present invention generally do not require emitting signals, the risk of interference of active sensor signals with other signal sources may be avoided. The devices according to the present invention specifically may be used in combination with recognition software, such as standard image recognition software. Thus, signals and data as provided by the devices according to the present invention typically are readily processable and, therefore, generally require lower calculation power than established stereovision systems such as LIDAR. Given the low space demand, the devices according to the present invention such as cameras may be placed at virtually any place in a vehicle, such as on a window screen, on a front hood, on bumpers, on lights, on mirrors or other places and the like. Various detectors according to the present invention such as one or more detectors based on the effect disclosed within the present invention can be combined, such as in order to allow autonomously driving vehicles or in order to increase the performance of active safety concepts. Thus, various devices according to the present invention may be combined with one or more other devices according to the present invention and/or conventional sensors, such as in the windows like rear window, side window or front window, on the bumpers or on the lights.

A combination of at least one device according to the present invention such as at least one detector according to the present invention with one or more rain detection sensors is also possible. This is due to the fact that the devices according to the present invention generally are advantageous over conventional sensor techniques such as radar, specifically during heavy rain. A combination of at least one device according to the present invention with at least one conventional sensing technique such as radar may allow for a software to pick the right combination of signals according to the weather conditions.

Further, the devices according to the present invention generally may be used as break assist and/or parking assist and/or for speed measurements. Speed measurements can be integrated in the vehicle or may be used outside the vehicle, such as in order to measure the speed of other cars in traffic control. Further, the devices according to the present invention may be used for detecting free parking spaces in parking lots.

Further, the devices according to the present invention may be used is the fields of medical systems and sports. Thus, in the field of medical technology, surgery robotics, e.g. for use in endoscopes, may be named, since, as outlined above, the devices according to the present invention may require a low volume only and may be integrated into other devices. Specifically, the devices according to the present invention having one lens, at most, may be used for capturing 3D information in medical devices such as in endoscopes. Further, the devices according to the present invention may be combined with an appropriate monitoring software, in order to enable tracking and analysis of movements. This may allow an instant overlay of the position of a medical devices, such as an endoscope or a scalpel, with results from medical imaging, such as obtained from magnetic resonance imaging, x-ray imaging, or ultrasound imaging. These applications are specifically valuable e.g. in medical treatments where precise location information is important such as in brain surgery and long-distance diagnosis and tele-medicine. Further, the devices according to the present invention may be used in 3D-body scanning. Body scanning may be applied in a medical context, such as in dental surgery, plastic surgery, bariatric surgery, or cosmetic plastic surgery, or it may be applied in the context of medical diagnosis such as in the diagnosis of myofascial pain syndrome, cancer, body dysmorphic disorder, or further diseases. Body scanning may further be applied in the field of sports to assess ergonomic use or fit of sports equipment.

Body scanning may further be used in the context of clothing, such as to determine a suitable size and fitting of clothes. This technology may be used in the context of tailor-made clothes or in the context of ordering clothes or shoes from the internet or at a self-service shopping device such as a micro kiosk device or customer concierge device. Body scanning in the context of clothing is especially important for scanning fully dressed customers.

Further, the devices according to the present invention may be used in the context of people counting systems, such as to count the number of people in an elevator, a train, a bus, a car, or a plane, or to count the number of people passing a hallway, a door, an aisle, a retail store, a stadium, an entertainment venue, a museum, a library, a public location, a cinema, a theater, or the like. Further, the 3D-function in the people counting system may be used to obtain or estimate further information about the people that are counted such as height, weight, age, physical fitness, or the like. This information may be used for business intelligence metrics, and/or for further optimizing the locality where people may be counted to make it more attractive or safe. In a retail environment, the devices according to the present invention in the context of people counting may be used to recognize returning customers or cross shoppers, to assess shopping behavior, to assess the percentage of visitors that make purchases, to optimize staff shifts, or to monitor the costs of a shopping mall per visitor. Further, people counting systems may be used for anthropometric surveys. Further, the devices according to the present invention may be used in public transportation systems for automatically charging passengers depending on the length of transport. Further, the devices according to the present invention may be used in playgrounds for children, to recognize injured children or children engaged in dangerous activities, to allow additional interaction with playground toys, to ensure safe use of playground toys or the like.

Further the devices according to the present invention may be used in construction tools, such as a range meter that determines the distance to an object or to a wall, to assess whether a surface is planar, to align or objects or place objects in an ordered manner, or in inspection cameras for use in construction environments or the like.

Further, the devices according to the present invention may be applied in the field of sports and exercising, such as for training, remote instructions or competition purposes. Specifically, the devices according to the present invention may be applied in the fields of dancing, aerobic, football, soccer, basketball, baseball, cricket, hockey, track and field, swimming, polo, handball, volleyball, rugby, sumo, judo, fencing, boxing, golf, car racing, laser tag, battlefield simulation etc. The devices according to the present invention can be used to detect the position of a ball, a bat, a sword, motions, etc., both in sports and in games, such as to monitor the game, support the referee or for judgment, specifically automatic judgment, of specific situations in sports, such as for judging whether a point or a goal actually was made.

Further, the devices according to the present invention may be used in the field of auto racing or car driver trainings or car safety trainings or the like to determine the position of a car or the track of a car, or the deviation from a previous track or an ideal track or the like.

The devices according to the present invention may further be used to support a practice of musical instruments, in particular remote lessons, for example lessons of string instruments, such as fiddles, violins, violas, celli, basses, harps, guitars, banjos, or ukuleles, keyboard instruments, such as pianos, organs, keyboards, harpsichords, harmoniums, or accordions, and/or percussion instruments, such as drums, timpani, marimbas, xylophones, vibraphones, bongos, congas, timbales, djembes or tablas.

The devices according to the present invention further may be used in rehabilitation and physiotherapy, in order to encourage training and/or in order to survey and correct movements. Therein, the devices according to the present invention may also be applied for distance diagnostics.

Further, the devices according to the present invention may be applied in the field of machine vision. Thus, one or more of the devices according to the present invention may be used e.g. as a passive controlling unit for autonomous driving and or working of robots. In combination with moving robots, the devices according to the present invention may allow for autonomous movement and/or autonomous detection of failures in parts. The devices according to the present invention may also be used for manufacturing and safety surveillance, such as in order to avoid accidents including but not limited to collisions between robots, production parts and living beings. In robotics, the safe and direct interaction of humans and robots is often an issue, as robots may severely injure humans when they are not recognized. Devices according to the present invention may help robots to position objects and humans better and faster and allow a safe interaction. Given the passive nature of the devices according to the present invention, the devices according to the present invention may be advantageous over active devices and/or may be used complementary to existing solutions like radar, ultrasound, 2D cameras, IR detection etc. One particular advantage of the devices according to the present invention is the low likelihood of signal interference. Therefore multiple sensors can work at the same time in the same environment, without the risk of signal interference. Thus, the devices according to the present invention generally may be useful in highly automated production environments like e.g. but not limited to automotive, mining, steel, etc. The devices according to the present invention can also be used for quality control in production, e.g. in combination with other sensors like 2-D imaging, radar, ultrasound, IR etc., such as for quality control or other purposes. Further, the devices according to the present invention may be used for assessment of surface quality, such as for surveying the surface evenness of a product or the adherence to specified dimensions, from the range of micrometers to the range of meters. Other quality control applications are feasible. In a manufacturing environment, the devices according to the present invention are especially useful for processing natural products such as food or wood, with a complex 3-dimensional structure to avoid large amounts of waste material. Further, devices according to the present invention may be used to monitor the filling level of tanks, silos etc. Further, devices according to the present invention may be used to inspect complex products for missing parts, incomplete parts, loose parts, low quality parts, or the like, such as in automatic optical inspection, such as of printed circuit boards, inspection of assemblies or sub-assemblies, verification of engineered components, engine part inspections, wood quality inspection, label inspections, inspection of medical devices, inspection of product orientations, packaging inspections, food pack inspections, or the like.

Further, the devices according to the present invention may be used in vehicles, trains, airplanes, ships, spacecraft and other traffic applications. Thus, besides the applications mentioned above in the context of traffic applications, passive tracking systems for aircraft, vehicles and the like may be named. The use of at least one device according to the present invention, such as at least one detector according to the present invention, for monitoring the speed and/or the direction of moving objects is feasible. Specifically, the tracking of fast moving objects on land, sea and in the air including space may be named. The at least one device according to the present invention, such as the at least one detector according to the present invention, specifically may be mounted on a still-standing and/or on a moving device. An output signal of the at least one device according to the present invention can be combined e.g. with a guiding mechanism for autonomous or guided movement of another object. Thus, applications for avoiding collisions or for enabling collisions between the tracked and the steered object are feasible. The devices according to the present invention generally are useful and advantageous due to the low calculation power required, the instant response and due to the passive nature of the detection system which generally is more difficult to detect and to disturb as compared to active systems, like e.g. radar. The devices according to the present invention are particularly useful but not limited to e.g. speed control and air traffic control devices. Further, the devices according to the present invention may be used in automated tolling systems for road charges.

The devices according to the present invention generally may be used in passive applications. Passive applications include guidance for ships in harbors or in dangerous areas, and for aircraft at landing or starting. Wherein, fixed, known active targets may be used for precise guidance. The same can be used for vehicles driving on dangerous but well defined routes, such as mining vehicles. Further, the devices according to the present invention may be used to detect rapidly approaching objects, such as cars, trains, flying objects, animals, or the like. Further, the devices according to the present invention can be used for detecting velocities or accelerations of objects, or to predict the movement of an object by tracking one or more of its position, speed, and/or acceleration depending on time.

Further, as outlined above, the devices according to the present invention may be used in the field of gaming. Thus, the devices according to the present invention can be passive for use with multiple objects of the same or of different size, color, shape, etc., such as for movement detection in combination with software that incorporates the movement into its content. In particular, applications are feasible in implementing movements into graphical output. Further, applications of the devices according to the present invention for giving commands are feasible, such as by using one or more of the devices according to the present invention for gesture or facial recognition. The devices according to the present invention may be combined with an active system in order to work under e.g. low light conditions or in other situations in which enhancement of the surrounding conditions is required. Additionally or alternatively, a combination of one or more devices according to the present invention with one or more IR or VIS light sources is possible. A combination of a detector according to the present invention with special devices is also possible, which can be distinguished easily by the system and its software, e.g. and not limited to, a special color, shape, relative position to other devices, speed of movement, light, frequency used to modulate light sources on the device, surface properties, material used, reflection properties, transparency degree, absorption characteristics, etc. The device can, amongst other possibilities, resemble a stick, a racquet, a club, a gun, a knife, a wheel, a ring, a steering wheel, a bottle, a ball, a glass, a vase, a spoon, a fork, a cube, a dice, a figure, a puppet, a teddy, a beaker, a pedal, a switch, a glove, jewelry, a musical instrument or an auxiliary device for playing a musical instrument, such as a plectrum, a drumstick or the like. Other options are feasible.

Further, the devices according to the present invention may be used to detect and or track objects that emit light by themselves, such as due to high temperature or further light emission processes. The light emitting part may be an exhaust stream or the like. Further, the devices according to the present invention may be used to track reflecting objects and analyze the rotation or orientation of these objects.

Further, the devices according to the present invention generally may be used in the field of building, construction and cartography. Thus, generally, one or more devices according to the present invention may be used in order to measure and/or monitor environmental areas, e.g. countryside or buildings. Therein, one or more devices according to the present invention may be combined with other methods and devices or can be used solely in order to monitor progress and accuracy of building projects, changing objects, houses, etc. The devices according to the present invention can be used for generating three-dimensional models of scanned environments, in order to construct maps of rooms, streets, houses, communities or landscapes, both from ground or from air. Potential fields of application may be construction, cartography, real estate management, land surveying or the like. As an example, the devices according to the present invention may be used in multicopters to monitor buildings, agricultural production environments such as fields, production plants, or landscapes, to support rescue operations, or to find or monitor one or more persons or animals, or the like.

Further, the devices according to the present invention may be used within an interconnecting network of home appliances such as CHAIN (Cedec Home Appliances Interoperating Network) to interconnect, automate, and control basic appliance-related services in a home, e.g. energy or load management, remote diagnostics, pet related appliances, child related appliances, child surveillance, appliances related surveillance, support or service to elderly or ill persons, home security and/or surveillance, remote control of appliance operation, and automatic maintenance support. Further, the devices according to the present invention may be used in heating or cooling systems such as an air-conditioning system, to locate which part of the room should be brought to a certain temperature or humidity, especially depending on the location of one or more persons. Further, the devices according to the present invention may be used in domestic robots, such as service or autonomous robots which may be used for household chores. The devices according to the present invention may be used for a number of different purposes, such as to avoid collisions or to map the environment, but also to identify a user, to personalize the robots performance for a given user, for security purposes, or for gesture or facial recognition. As an example, the devices according to the present invention may be used in robotic vacuum cleaners, floor-washing robots, dry-sweeping robots, ironing robots for ironing clothes, animal litter robots, such as cat litter robots, security robots that detect intruders, robotic lawn mowers, automated pool cleaners, rain gutter cleaning robots, window washing robots, toy robots, telepresence robots, social robots providing company to less mobile people, or robots translating and speech to sign language or sign language to speech. In the context of less mobile people, such as elderly persons, household robots with the devices according to the present invention may be used for picking up objects, transporting objects, and interacting with the objects and the user in a safe way. Further the devices according to the present invention may be used in robots operating with hazardous materials or objects or in dangerous environments. As a non-limiting example, the devices according to the present invention may be used in robots or unmanned remote-controlled vehicles to operate with hazardous materials such as chemicals or radioactive materials especially after disasters, or with other hazardous or potentially hazardous objects such as mines, unexploded arms, or the like, or to operate in or to investigate insecure environments such as near burning objects or post disaster areas.

Further, the devices according to the present invention may be used in household, mobile or entertainment devices, such as a refrigerator, a microwave, a washing machine, a window blind or shutter, a household alarm, an air condition devices, a heating device, a television, an audio device, a smart watch, a mobile phone, a phone, a dishwasher, a stove or the like, to detect the presence of a person, to monitor the contents or function of the device, or to interact with the person and/or share information about the person with further household, mobile or entertainment devices.

The devices according to the present invention may further be used in agriculture, for example to detect and sort out vermin, weeds, and/or infected crop plants, fully or in parts, wherein crop plants may be infected by fungus or insects. Further, for harvesting crops, the devices according to the present invention may be used to detect animals, such as deer, which may otherwise be harmed by harvesting devices. Further, the devices according to the present invention may be used to monitor the growth of plants in a field or greenhouse, in particular to adjust the amount of water or fertilizer or crop protection products for a given region in the field or greenhouse or even for a given plant. Further, in agricultural biotechnology, the devices according to the present invention may be used to monitor the size and shape of plants.

Further, the devices according to the present invention may be combined with sensors to detect chemicals or pollutants, electronic nose chips, microbe sensor chips to detect bacteria or viruses or the like, Geiger counters, tactile sensors, heat sensors, or the like. This may for example be used in constructing smart robots which are configured for handling dangerous or difficult tasks, such as in treating highly infectious patients, handling or removing highly dangerous substances, cleaning highly polluted areas, such as highly radioactive areas or chemical spills, or for pest control in agriculture.

One or more devices according to the present invention can further be used for scanning of objects, such as in combination with CAD or similar software, such as for additive manufacturing and/or 3D printing. Therein, use may be made of the high dimensional accuracy of the devices according to the present invention, e.g. in x-, y- or z-direction or in any arbitrary combination of these directions, such as simultaneously. Further, the devices according to the present invention may be used in inspections and maintenance, such as pipeline inspection gauges. Further, in a production environment, the devices according to the present invention may be used to work with objects of a badly defined shape such as naturally grown objects, such as sorting vegetables or other natural products by shape or size or cutting products such as meat or objects that are manufactured with a precision that is lower than the precision needed for a processing step.

Further the devices according to the present invention may be used in local navigation systems to allow autonomously or partially autonomously moving vehicles or multicopters or the like through an indoor or outdoor space. A non-limiting example may comprise vehicles moving through an automated storage for picking up objects and placing them at a different location. Indoor navigation may further be used in shopping malls, retail stores, museums, airports, or train stations, to track the location of mobile goods, mobile devices, baggage, customers or employees, or to supply users with a location specific information, such as the current position on a map, or information on goods sold, or the like.

Further, the devices according to the present invention may be used to ensure safe driving of motorcycles such as driving assistance for motorcycles by monitoring speed, inclination, upcoming obstacles, unevenness of the road, or curves or the like. Further, the devices according to the present invention may be used in trains or trams to avoid collisions.

Further, the devices according to the present invention may be used in handheld devices, such as for scanning packagings or parcels to optimize a logistics process. Further, the devices according to the present invention may be used in further handheld devices such as personal shopping devices, RFID-readers, handheld devices for use in hospitals or health environments such as for medical use or to obtain, exchange or record patient or patient health related information, smart badges for retail or health environments, or the like.

As outlined above, the devices according to the present invention may further be used in manufacturing, quality control or identification applications, such as in product identification or size identification (such as for finding an optimal place or package, for reducing waste etc.). Further, the devices according to the present invention may be used in logistics applications. Thus, the devices according to the present invention may be used for optimized loading or packing containers or vehicles. Further, the devices according to the present invention may be used for monitoring or controlling of surface damages in the field of manufacturing, for monitoring or controlling rental objects such as rental vehicles, and/or for insurance applications, such as for assessment of damages. Further, the devices according to the present invention may be used for identifying a size of material, object or tools, such as for optimal material handling, especially in combination with robots. Further, the devices according to the present invention may be used for process control in production, e.g. for observing filling level of tanks. Further, the devices according to the present invention may be used for maintenance of production assets like, but not limited to, tanks, pipes, reactors, tools etc. Further, the devices according to the present invention may be used for analyzing 3D-quality marks. Further, the devices according to the present invention may be used in manufacturing tailor-made goods such as tooth inlays, dental braces, prosthesis, clothes or the like. The devices according to the present invention may also be combined with one or more 3D-printers for rapid prototyping, 3D-copying or the like. Further, the devices according to the present invention may be used for detecting the shape of one or more articles, such as for anti-product piracy and for anti-counterfeiting purposes.

Thus, specifically, the present application may be applied in the field of photography. Thus, the detector may be part of a photographic device, specifically of a digital camera. Specifically, the detector may be used for 3D photography, specifically for digital 3D photography. Thus, the detector may form a digital 3D camera or may be part of a digital 3D camera. As used herein, the term photography generally refers to the technology of acquiring image information of at least one object. As further used herein, a camera generally is a device adapted for performing photography. As further used herein, the term digital photography generally refers to the technology of acquiring image information of at least one object by using a plurality of light-sensitive elements adapted to generate electrical signals indicating an intensity and/or color of illumination, preferably digital electrical signals. As further used herein, the term 3D photography generally refers to the technology of acquiring image information of at least one object in three spatial dimensions. Accordingly, a 3D camera is a device adapted for performing 3D photography. The camera generally may be adapted for acquiring a single image, such as a single 3D image, or may be adapted for acquiring a plurality of images, such as a sequence of images. Thus, the camera may also be a video camera adapted for video applications, such as for acquiring digital video sequences.

Thus, generally, the present invention further refers to a camera, specifically a digital camera, more specifically a 3D camera or digital 3D camera, for imaging at least one object. As outlined above, the term imaging, as used herein, generally refers to acquiring image information of at least one object. The camera comprises at least one detector according to the present invention. The camera, as outlined above, may be adapted for acquiring a single image or for acquiring a plurality of images, such as image sequence, preferably for acquiring digital video sequences. Thus, as an example, the camera may be or may comprise a video camera. In the latter case, the camera preferably comprises a data memory for storing the image sequence.

As used within the present invention, the expression "position" generally refers to at least one item of information regarding one or more of an absolute position and an orientation of one or more points of the object. Thus, specifically, the position may be determined in a coordinate system of the detector, such as in a Cartesian coordinate system. Additionally or alternatively, however, other types of coordinate systems may be used, such as polar coordinate systems and/or spherical coordinate systems.

As outlined above and as will be outlined in further detail below, the present invention preferably may be applied in the field of human-machine interfaces, in the field of sports and/or in the field of computer games. Thus, preferably, the object may be selected from the group consisting of:

an article of sports equipment, preferably an article selected from the group consisting of a racket, a club, a bat; an article of clothing; a hat; a shoe. Other embodiments are feasible.

As used herein, the object generally may be an arbitrary object, chosen from a living object and a non-living object. Thus, as an example, the at least one object may comprise one or more articles and/or one or more parts of an article. Additionally or alternatively, the object may be or may comprise one or more living beings and/or one or more parts thereof, such as one or more body parts of a human being, e.g. a user, and/or an animal.

With regard to the coordinate system for determining the position of the object, which may be a coordinate system of the detector, the detector may constitute a coordinate system in which an optical axis of the detector forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The detector may be a device configured for providing at least one item of information on the position of the at least one object and/or a part thereof. Thus, the position may refer to an item of information fully describing the position of the object or a part thereof, preferably in the coordinate system of the detector, or may refer to a partial information, which only partially describes the position. The detector generally may be a device adapted for detecting light beams, such as the light beams propagating from the beacon devices towards the detector.

The evaluation device and the detector may fully or partially be integrated into a single device. Thus, generally, the evaluation device also may form part of the detector. Alternatively, the evaluation device and the detector may fully or partially be embodied as separate devices. The detector may comprise further components.

The detector may be a stationary device or a mobile device. Further, the detector may be a stand-alone device or may form part of another device, such as a computer, a vehicle or any other device. Further, the detector may be a hand-held device. Other embodiments of the detector are feasible.

The detector specifically may be used to record a light-field behind a lens or lens system of the detector, comparable to a plenoptic or light-field camera. Thus, specifically, the detector may be embodied as a light-field camera adapted for acquiring images in multiple focal planes, such as simultaneously. The term light-field, as used herein, generally refers to the spatial light propagation of light inside the detector such as inside camera. The detector according to the present invention, specifically having a stack of optical sensors, may have the capability of directly recording a light-field within the detector or camera, such as behind a lens. The plurality of pixelated sensors may record images at different distances from the lens. Using, e.g., convolution-based algorithms such as "depth from focus" or "depth from defocus", the propagation direction, focus points, and spread of the light behind the lens can be modeled.

From the modeled propagation of light behind the lens, images at various distances to the lens can be extracted, the depth of field can be optimized, pictures that are in focus at various distances can be extracted, or distances of objects can be calculated. Further information may be extracted.

Once the light propagation inside the detector, such as behind a lens of the detector, is modeled and/or recorded, this knowledge of light propagation provides a large number of advantages. Thus, the light-field may be recorded in terms of beam parameters for one or more light beams of a scene captured by the detector. As an example, for each light beam recorded, two or more beam parameters may be recorded, such as one or more Gaussian beam parameters, e.g. a beam waist, a minimum beam waist as a focal point, a Rayleigh length, or other beam parameters. Several representations of light beams may be used and beam parameters may be chosen accordingly.

This knowledge of light propagation, as an example, allows for slightly modifying the observer position after recording an image stack using image processing techniques. In a single image, an object may be hidden behind another object and is not visible. However, if the light scattered by the hidden object reaches the lens and through the lens one or more of the sensors, the object may be made visible, by changing the distance to the lens and/or the image plane relative to the optical axis, or even using non-planar image planes. The change of the observer position may be compared to looking at a hologram, in which changing the observer position slightly changes the image.

The knowledge of light propagation inside the detector, such as by modeling the light propagation behind the lens, may further allow for storing the image information in a more compact way as compared to conventional technology of storing each image recorded by each individual optical sensor. The memory demand for storing all images of each optical sensor typically scales with the number of sensors times the number of pixels. The memory demand of the light propagation scales with the number of modeled light beams times the number of parameters per light beam. Typical model functions for light beams may be Gaussians, Lorentzians, Bessel functions, especially spherical Bessel functions, other functions typically used for describing diffraction effects in physics, or typical spread functions used in depth from defocus techniques such as point spread functions, line spread functions or edge spread functions.

The use of several pixelated optical sensors further allows for correcting lens errors in an image processing step after recording the images. Optical instruments often become expensive and challenging in construction, when lens errors need to be corrected. These are especially problematic in microscopes and telescopes. In microscopes, a typical lens error is that rays of varying distance to the optical axis are distorted differently (spherical aberration). In telescopes, varying the focus may occur from differing temperatures in the atmosphere. Static errors such as spherical aberration or further errors from production may be corrected by determining the errors in a calibration step and then using a fixed image processing such as fixed set of pixels and sensor, or more involved processing techniques using light propagation information. In cases in which lens errors are strongly time-dependent, i.e. dependent on weather conditions in telescopes, the lens errors may be corrected by using the light propagation behind the lens, calculating extended depth of field images, using depth from focus techniques, and others.

As outlined above, the detector according to the present invention may further allow for color detection. For color detection in stacks of several pixelated sensors, the single stacks may have pixels that have different absorption properties, equal or similar to the so-called Bayer pattern, and color information may be obtained by interpolation techniques. A further method is to use sensors of alternating color, wherein different sensors in the stack may record different colors. In a Bayer pattern, color may be interpolated between same-color pixels. In a stack of sensors, the image information such as color and brightness, etc., can also be obtained by interpolation techniques.

The evaluation device may be or may comprise one or more integrated circuits, such as one or more application-specific integrated circuits (ASICs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Thus, as an example, the evaluation device may comprise one or more measurement devices for measuring electrical currents through and/or electrical voltages of the pixels. Further, the evaluation device may comprise one or more data storage devices. Further, the evaluation device may comprise one or more interfaces, such as one or more wireless interfaces and/or one or more wire-bound interfaces.

The at least one evaluation device may be adapted to perform at least one computer program, such as at least one computer program adapted for performing or supporting one or more or even all of the method steps of the method according to the present invention. As an example, one or more algorithms may be implemented which, by using the sensor signals as input variables, may determine the position of the object.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, bluetooth, Wi-Fi, infrared or internet interfaces, ports or connections. It may further be connected or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as Camera-Link. The evaluation device and/or the data processing device may further be connected by one or more of inter-processor interfaces or ports, FPGA-FPGA-interfaces, or serial or parallel interfaces ports. The evaluation device and the data processing device may further be connected to one or more of an optical disc drive, a CD-RW drive, a DVD+ RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

Possible embodiments of a single device incorporating one or more of the detectors according to the present invention, the evaluation device or the data processing device, such as incorporating one or more of the optical sensor, optical systems, evaluation device, communication device, data processing device, interfaces, system on a chip, display devices, or further electronic devices, are: mobile phones, personal computers, tablet PCs, televisions, game consoles or further entertainment devices. In a further embodiment, the 3D-camera functionality which will be outlined in further detail below may be integrated in devices that are available with conventional 2D-digital cameras, without a noticeable difference in the housing or appearance of the device, where the noticeable difference for the user may only be the functionality of obtaining and or processing 3D information.

Specifically, an embodiment incorporating the detector and/or a part thereof such as the evaluation device and/or the data processing device may be: a mobile phone incorporating a display device, a data processing device, the optical sensor, optionally the sensor optics, and the evaluation device, for the functionality of a 3D camera. The detector according to the present invention specifically may be suitable for integration in entertainment devices and/or communication devices such as a mobile phone.

A further embodiment of the present invention may be an incorporation of the detector or a part thereof such as the evaluation device and/or the data processing device in a device for use in automotive, for use in autonomous driving or for use in car safety systems such as Daimler's Intelligent Drive system, wherein, as an example, a device incorporating one or more of the optical sensors, optionally one or more optical systems, the evaluation device, optionally a communication device, optionally a data processing device, optionally one or more interfaces, optionally a system on a chip, optionally one or more display devices, or optionally further electronic devices may be part of a vehicle, a car, a truck, a train, a bicycle, an airplane, a ship, a motorcycle. In automotive applications, the integration of the device into the automotive design may necessitate the integration of the optical sensor, optionally optics, or device at minimal visibility from the exterior or interior. The detector or a part thereof such as the evaluation device and/or the data processing device may be especially suitable for such integration into automotive design.

As used herein, the term light generally refers to electromagnetic radiation in one or more of the visible spectral range, the ultraviolet spectral range and the infrared spectral range. Therein, the term visible spectral range generally refers to a spectral range of 380 nm to 780 nm. The term infrared spectral range generally refers to electromagnetic radiation in the range of 780 nm to 1 mm, preferably in the range of 780 nm to 3.0 micrometers. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range.

The term light beam generally refers to an amount of light emitted and/or reflected into a specific direction. Thus, the light beam may be a bundle of the light rays having a predetermined extension in a direction perpendicular to a direction of propagation of the light beam. Preferably, the light beams may be or may comprise one or more Gaussian light beams which may be characterized by one or more Gaussian beam parameters, such as one or more of a beam waist, a Rayleigh-length or any other beam parameter or combination of beam parameters suited to characterize a development of a beam diameter and/or a beam propagation in space.

As outlined above, the detector preferably has a plurality of optical sensors. More preferably, the plurality of optical sensors is stacked, such as along the optical axis of the detector. Thus, the optical sensors may form an optical sensor stack. The optical sensor stack preferably may be oriented such that the sensor regions of the optical sensors are oriented perpendicular to the optical axis. Thus, as an example, sensor areas or sensor surfaces of the single optical sensors may be oriented in parallel, wherein slight angular tolerances might be tolerable, such as angular tolerances of no more than 10°, preferably of no more than 5°.

As outlined above, the present invention further relates to a human-machine interface for exchanging at least one item of information between a user and a machine. The human-machine interface as proposed may make use of the fact that the above-mentioned detector in one or more of the embodiments mentioned above or as mentioned in further detail below may be used by one or more users for providing information and/or commands to a machine. Thus, preferably, the human-machine interface may be used for inputting control commands.

Generally, as used herein, the at least one position of the user may imply one or more items of information on a position of the user as a whole and/or one of or more body parts of the user. Thus, preferably, the position of the user may imply one or more items of information on a position of the user as provided by the evaluation device of the detector. The user, a body part of the user or a plurality of body parts of the user may be regarded as one or more objects the position of which may be detected by the at least one detector device. Therein, precisely one detector may be provided, or a combination of a plurality of detectors may be provided. As an example, a plurality of detectors may be provided for determining positions of a plurality of body parts of the user and/or for determining a position of at least one body part of the user.

The detector according to the present invention may further be combined with one or more other types of sensors or detectors. Thus, the detector may further comprise at least one additional detector. The at least one additional detector may be adapted for detecting at least one parameter, such as at least one of: a parameter of a surrounding environment, such as a temperature and/or a brightness of a surrounding environment; a parameter regarding a position and/or orientation of the detector; a parameter specifying a state of the object to be detected, such as a position of the object, e.g. an absolute position of the object and/or an orientation of the object in space. Thus, generally, the principles of the present invention may be combined with other measurement principles in order to gain additional information and/or in order to verify measurement results or reduce measurement errors or noise.

Specifically, the detector according to the present invention may further comprise at least one time-of-flight (ToF) detector adapted for detecting at least one distance between the at least one object and the detector by performing at least one time-of-flight measurement. As used herein, a time-of-flight measurement generally refers to a measurement based on a time a signal needs for propagating between two objects or from one object to a second object and back. In the present case, the signal specifically may be one or more of an acoustic signal or an electromagnetic signal such as a light signal. A time-of-flight detector consequently refers to a detector adapted for performing a time-of-flight measurement. Time-of-flight measurements are well-known in various fields of technology such as in commercially available distance measurement devices or in commercially available flow meters, such as ultrasonic flow meters. Time-of-flight detectors even may be embodied as time-of-flight cameras. These types of cameras are commercially available as range-imaging camera systems, capable of resolving distances between objects based on the known speed of light.

Presently available ToF detectors generally are based on the use of a pulsed signal, optionally in combination with one or more light sensors such as CMOS-sensors. A sensor signal produced by the light sensor may be integrated. The integration may start at two different points in time. The distance may be calculated from the relative signal intensity between the two integration results.

Further, as outlined above, ToF cameras are known and may generally be used, also in the context of the present invention. These ToF cameras may contain pixelated light sensors. However, since each pixel generally has to allow for performing two integrations, the pixel construction generally is more complex and the resolutions of commercially available ToF cameras is rather low (typically 200×200 pixels). Distances below ~40 cm and above several meters typically are difficult or impossible to detect. Furthermore, the periodicity of the pulses leads to ambiguous distances, as only the relative shift of the pulses within one period is measured.

ToF detectors, as standalone devices, typically suffer from a variety of shortcomings and technical challenges. Thus, in general, ToF detectors and, more specifically, ToF cameras suffer from rain and other transparent objects in the light path, since the pulses might be reflected too early, objects behind the raindrop are hidden, or in partial reflections the integration will lead to erroneous results. Further, in order to avoid errors in the measurements and in order to allow for a clear distinction of the pulses, low light conditions are preferred for ToF-measurements. Bright light such as bright sunlight can make a ToF-measurement impossible. Further, the energy consumption of typical ToF cameras is rather high, since pulses must be bright enough to be back-reflected and still be detectable by the camera. The brightness of the pulses, however, may be harmful for eyes or other sensors or may cause measurement errors when two or more ToF measurements interfere with each other. In summary, current ToF detectors and, specifically, current ToF-cameras suffer from several disadvantages such as low resolution, ambiguities in the distance measurement, limited range of use, limited light conditions, sensitivity towards transparent objects in the light path, sensitivity towards weather conditions and high energy consumption. These technical challenges generally lower the aptitude of present ToF cameras for daily applications such as for safety applications in cars, cameras for daily use or human-machine-interfaces, specifically for use in gaming applications.

In combination with the detector according to the present invention, the advantages and capabilities of both systems may be combined in a fruitful way. Thus, the detector may provide advantages at bright light conditions, while the ToF detector generally provides better results at low-light conditions. A combined device, i.e. a detector according to the present invention further including at least one ToF detector, therefore provides increased tolerance with regard to light conditions as compared to both single systems. This is especially important for safety applications, such as in cars or other vehicles.

Specifically, the detector may be designed to use at least one ToF measurement for correcting at least one measurement performed by using the detector according to the present invention and vice versa. Further, the ambiguity of a ToF measurement may be resolved by using the detector. A measurement using the pixelated detector specifically may be performed whenever an analysis of ToF measurements results in a likelihood of ambiguity. Additionally or alternatively, measurements using the pixelated detector may be performed continuously in order to extend the working range of the ToF detector into regions which are usually excluded due to the ambiguity of ToF measurements. Additionally or alternatively, the pixelated detector may cover a broader or an additional range to allow for a broader distance measurement region. The pixelated detector, specifically the pixelated camera, may further be used for determining one or more important regions for measurements to reduce energy consumption or to protect eyes. Thus the pixelated detector may be adapted for detecting one or more regions of interest. Additionally or alternatively, the pixelated detector may be used for determining a rough depth map of one or more objects within a scene captured by the detector, wherein the rough depth map may be refined in important regions by one or more ToF measurements. Further, the pixelated detector may be used to adjust the ToF detector, such as the ToF camera, to the required distance region. Thereby, a pulse length and/or a frequency of the ToF measurements may be pre-set, such as for removing or reducing the likelihood of ambiguities in the ToF measurements. Thus, generally, the pixelated detector may be used for providing an autofocus for the ToF detector, such as for the ToF camera.

As outlined above, a rough depth map may be recorded by the pixelated detector, such as the pixelated camera. Further, the rough depth map, containing depth information or z-information regarding one or more objects within a scene captured by the detector, may be refined by using one or more ToF measurements. The ToF measurements specifically may be performed only in important regions. Additionally or alternatively, the rough depth map may be used to adjust the ToF detector, specifically the ToF camera.

Further, the use of the pixelated detector in combination with the at least one ToF detector may solve the above-mentioned problem of the sensitivity of ToF detectors towards the nature of the object to be detected or towards obstacles or media within the light path between the detector and the object to be detected, such as the sensitivity towards rain or weather conditions. A combined pixelated/ToF measurement may be used to extract the important information from ToF signals, or measure complex objects with several transparent or semi-transparent layers. Thus, objects made of glass, crystals, liquid structures, phase transitions, liquid motions, etc. may be observed. Further, the combination of a pixelated detector and at least one ToF detector will still work in rainy weather, and the overall detector will generally be less dependent on weather conditions. As an example, measurement results provided by the pixelated detector may be used to remove the errors provoked by rain from ToF measurement results, which specifically renders this combination useful for safety applications such as in cars or other vehicles.

The implementation of at least one ToF detector into the detector according to the present invention may be realized in various ways. Thus, the at least one pixelated detector and the at least one ToF detector may be arranged in a sequence, within the same light path. Additionally or alternatively, separate light paths or split light paths for the pixelated detector and the ToF detector may be used. Therein, as an example, light paths may be separated by one or more beam-splitting elements, such as one or more of the beam splitting elements listed above or listed in further detail below. As an example, a separation of beam paths by wavelength-selective elements may be performed. Thus, e.g., the ToF detector may make use of infrared light, whereas the pixelated detector may make use of light of a different wavelength. In this example, the infrared light for the ToF detector may be separated off by using a wavelength-selective beam splitting element such as a hot mirror. Additionally or alternatively, light beams used for the measurement using the pixelated detector and light beams used for the ToF measurement may be separated by one or more beam-splitting elements, such as one or more semitransparent mirrors, beam-splitter cubes, polarization beam splitters or combinations thereof. Further, the at least one pixelated detector and the at least one ToF detector may be placed next to each other in the same device, using distinct optical pathways. Various other setups are feasible.

The at least one optional ToF detector may be combined with basically any of the embodiments of the detector according to the present invention. Specifically, the at least one ToF detector which may be a single ToF detector or a ToF camera, may be combined with a single optical sensor or with a plurality of optical sensors such as a sensor stack. Further, the detector may also comprise one or more imaging devices such as one or more inorganic imaging devices like CCD chips and/or CMOS chips, preferably one or more full-color CCD chips or full-color CMOS chips. Additionally or alternatively, the detector may further comprise one or more thermographic cameras.

As outlined above, the human-machine interface may comprise a plurality of beacon devices which are adapted to be at least one of directly or indirectly attached to the user and held by the user. Thus, the beacon devices each may independently be attached to the user by any suitable means, such as by an appropriate fixing device. Additionally or alternatively, the user may hold and/or carry the at least one beacon device or one or more of the beacon devices in his or her hands and/or by wearing the at least one beacon device and/or a garment containing the beacon device on a body part.

The beacon device generally may be an arbitrary device which may be detected by the at least one detector and/or which facilitates detection by the at least one detector. Thus, as outlined above or as will be outlined in further detail below, the beacon device may be an active beacon device adapted for generating the at least one light beam to be detected by the detector, such as by having one or more illumination sources for generating the at least one light beam. Additionally or alternatively, the beacon device may fully or partially be designed as a passive beacon device, such as by providing one or more reflective elements adapted to reflect a light beam generated by a separate illumination source. The at least one beacon device may permanently or temporarily be attached to the user in a direct or indirect way and/or may be carried or held by the user. The attachment may take place by using one or more attachment means and/or by the user himself or herself, such as by the user holding the at least one beacon device by hand and/or by the user wearing the beacon device.

Additionally or alternatively, the beacon devices may be at least one of attached to an object and integrated into an object held by the user, which, in the sense of the present invention, shall be included into the meaning of the option of the user holding the beacon devices. Thus, as will be outlined in further detail below, the beacon devices may be attached to or integrated into a control element which may be part of the human-machine interface and which may be held or carried by the user, and of which the orientation may be recognized by the detector device. Thus, generally, the present invention also refers to a detector system comprising at least one detector device according to the present invention and which, further, may comprise at least one object, wherein the beacon devices are one of attached to the object, held by the object and integrated into the object. As an example, the object preferably may form a control element, the orientation of which may be recognized by a user. Thus, the detector system may be part of the human-machine interface as outlined above or as outlined in further detail below. As an example, the user may handle the control element in a specific way in order to transmit one or more items of information to a machine, such as in order to transmit one or more commands to the machine.

As an example, the detector according to the present invention may be used in combination with or as part of a stereo camera. Thus, the distance information from the stereo camera may be augmented, improved, verified, or the like with distance information obtained by the detector according to the present invention. Further, the distance information from the detector according to the present invention may be augmented, improved, verified, or the like with distance information obtained by the stereo camera. The detectors used in the stereo camera and the detector according to the present invention may be identical or partially identical.

As an example, the detector according to the present invention may be used in combination with or as part of a time of flight camera. Thus, the distance information from the time of flight camera may be augmented, improved, verified, or the like with distance information obtained by the detector according to the present invention. Further, the distance information from the detector according to the present invention may be augmented, improved, verified, or the like with distance information obtained by the time of flight camera. The detectors used in the time of flight camera and the detector according to the present invention may be identical or partially identical.

Alternatively, the detector system may be used in other ways. Thus, as an example, the object of the detector system may be different from a user or a body part of the user and, as an example, may be an object which moves independently from the user. As an example, the detector system may be used for controlling apparatuses and/or industrial processes, such as manufacturing processes and/or robotics processes. Thus, as an example, the object may be a machine and/or a machine part, such as a robot arm, the orientation of which may be detected by using the detector system.

The human-machine interface may be adapted in such a way that the detector device generates at least one item of information on the position of the user or of at least one body part of the user. Specifically in case a manner of attachment of the at least one beacon device to the user is known, by evaluating the position of the at least one beacon device, at least one item of information on a position and/or an orientation of the user or of a body part of the user may be gained.

The beacon device preferably is one of a beacon device attachable to a body or a body part of the user and a beacon device which may be held by the user. As outlined above, the beacon device may fully or partially be designed as an active beacon device. Thus, the beacon device may comprise at least one illumination source adapted to generate at least one light beam to be transmitted to the detector, preferably at least one light beam having known beam properties. Additionally or alternatively, the beacon device may comprise at least one reflector adapted to reflect light generated by an illumination source, thereby generating a reflected light beam to be transmitted to the detector.

The object, which may form part of the detector system, may generally have an arbitrary shape. Preferably, the object being part of the detector system, as outlined above, may be a control element which may be handled by a user, such as manually. As an example, the control element may be or may comprise at least one element selected from the group consisting of: a glove, a jacket, a hat, shoes, trousers and a suit; a stick that may be held by hand; a bat; a club; a racket; a cane; a toy, such as a toy gun. Thus, as an example, the detector system may be part of the human-machine interface and/or of the entertainment device.

As used herein, an entertainment device is a device which may serve the purpose of leisure and/or entertainment of one or more users, in the following also referred to as one or more players. As an example, the entertainment device may serve the purpose of gaming, preferably computer gaming. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device.

The at least one item of information preferably may comprise at least one command adapted for influencing the course of a game. Thus, as an example, the at least one item of information may include at least one item of information on at least one orientation of the player and/or of one or more body parts of the player, thereby allowing for the player to simulate a specific position and/or orientation and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target.

The entertainment device as a part or as a whole, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

As further used herein, a tracking system is a device which is adapted to gather information on a series of past positions of the at least one object and/or at least one part of the object. Additionally, the tracking system may be adapted to provide information on at least one predicted future position and/or orientation of the at least one object or the at least one part of the object. The tracking system may have at least one track controller, which may fully or partially be embodied as an electronic device, preferably as at least one data processing device, more preferably as at least one computer or microcontroller. Again, the at least one track controller may fully or partially comprise the at least one evaluation device and/or may be part of the at least one evaluation device and/or may fully or partially be identical to the at least one evaluation device.

The tracking system comprises at least one detector according to the present invention, such as at least one detector as disclosed in one or more of the embodiments listed above and/or as disclosed in one or more of the embodiments below. The tracking system further comprises at least one track controller. The track controller is adapted to track a series of positions of the object at specific points in time, such as by recording groups of data or data pairs, each group of data or data pair comprising at least one position information and at least one time information.

The tracking system may further comprise the at least one detector system according to the present invention. Thus, besides the at least one detector and the at least one evaluation device and the optional at least one beacon device, the tracking system may further comprise the object itself or a part of the object, such as at least one control element comprising the beacon devices or at least one beacon device, wherein the control element is directly or indirectly attachable to or integratable into the object to be tracked.

The tracking system may be adapted to initiate one or more actions of the tracking system itself and/or of one or more separate devices. For the latter purpose, the tracking system, preferably the track controller, may have one or more wireless and/or wire-bound interfaces and/or other types of control connections for initiating at least one action. Preferably, the at least one track controller may be adapted to initiate at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving. Further applications might be found in communication systems, such as in order to continuously transmit information to a moving object by pointing a transmitter towards the moving object.

The detector, the detector system, the human machine interface, the entertainment device or the tracking system may further comprise at least one illumination source or may be used in conjunction with at least one illumination source. Specifically, the at least one illumination source may be or may comprise at least one structured or patterned illumination source. The use of a structured illumination source may increase a resolution of the position detection of the object and/or may increase a contrast.

In a further aspect of the present invention, a scanning system for determining at least one position of at least one object is provided. As used herein, the scanning system is a device which is adapted to emit at least one light beam being configured for an illumination of at least one dot located at at least one surface of the at least one object and for generating at least one item of information about the distance between the at least one dot and the scanning system. For the purpose of generating the at least one item of information about the distance between the at least one dot and the scanning system, the scanning system comprises at least one of the detectors according to the present invention, such as at least one of the detectors as disclosed in one or more of the embodiments listed above and/or as disclosed in one or more of the embodiments below.

Thus, the scanning system comprises at least one illumination source which is adapted to emit the at least one light beam being configured for the illumination of the at least one dot located at the at least one surface of the at least one object. As used herein, the term "dot" refers to an area, specifically a small area, on a part of the surface of the object which may be selected, for example by a user of the scanning system, to be illuminated by the illumination source. Preferably, the dot may exhibit a size which may, on one hand, be as small as possible in order to allow the scanning system to determine a value for the distance between the illumination source comprised by the scanning system and the part of the surface of the object on which the dot may be located as exactly as possible and which, on the other hand, may be as large as possible in order to allow the user of the scanning system or the scanning system itself, in particular by an automatic procedure, to detect a presence of the dot on the related part of the surface of the object.

For this purpose, the illumination source may comprise an artificial illumination source, in particular at least one laser source and/or at least one incandescent lamp and/or at least one semiconductor light source, for example, at least one light-emitting diode, in particular an organic and/or inorganic light-emitting diode. On account of their generally defined beam profiles and other properties of handleability, the use of at least one laser source as the illumination source is particularly preferred. Herein, the use of a single laser source may be preferred, in particular in a case in which it may be important to provide a compact scanning system that might be easily storable and transportable by the user. The illumination source may thus, preferably be a constituent part of the detector and may, therefore, in particular be integrated into the detector, such as into the housing of the detector. In a preferred embodiment, particularly the housing of the scanning system may comprise at least one display configured for providing distance-related information to the user, such as in an easy-to-read manner. In a further preferred embodiment, particularly the housing of the scanning system may, in addition, comprise at least one button which may be configured for operating at least one function related to the scanning system, such as for setting one or more operation modes. In a further preferred embodiment, particularly the housing of the scanning system may, in addition, comprise at least one fastening unit which may be configured for fastening the scanning system to a further surface, such as a rubber foot, a base plate or a wall holder, such as a base plate or holder comprising a magnetic material, in particular for increasing the accuracy of the distance measurement and/or the handleability of the scanning system by the user.

In a particularly preferred embodiment, the illumination source of the scanning system may, thus, emit a single laser beam which may be configured for the illumination of a single dot located at the surface of the object. By using at least one of the detectors according to the present invention at least one item of information about the distance between the at least one dot and the scanning system may, thus, be generated. Hereby, preferably, the distance between the illumination system as comprised by the scanning system and the single dot as generated by the illumination source may be determined, such as by employing the evaluation device as comprised by the at least one detector. However, the scanning system may, further, comprise an additional evaluation system which may, particularly, be adapted for this purpose. Alternatively or in addition, a size of the scanning system, in particular of the housing of the scanning system, may be taken into account and, thus, the distance between a specific point on the housing of the scanning system, such as a front edge or a back edge of the housing, and the single dot may, alternatively, be determined.

Alternatively, the illumination source of the scanning system may emit two individual laser beams which may be configured for providing a respective angle, such as a right angle, between the directions of an emission of the beams, whereby two respective dots located at the surface of the same object or at two different surfaces at two separate objects may be illuminated. However, other values for the respective angle between the two individual laser beams may also be feasible. This feature may, in particular, be employed for indirect measuring functions, such as for deriving an indirect distance which may not be directly accessible, such as due to a presence of one or more obstacles between the scanning system and the dot or which may otherwise be hard to reach. By way of example, it may, thus, be feasible to determine a value for a height of an object by measuring two individual distances and deriving the height by using the Pythagoras formula. In particular for being able to keep a predefined level with respect to the object, the scanning system may, further, comprise at least one leveling unit, in particular an integrated bubble vial, which may be used for keeping the predefined level by the user.

As a further alternative, the illumination source of the scanning system may emit a plurality of individual laser beams, such as an array of laser beams which may exhibit a respective pitch, in particular a regular pitch, with respect to each other and which may be arranged in a manner in order to generate an array of dots located on the at least one surface of the at least one object. For this purpose, specially adapted optical elements, such as beam-splitting devices and mirrors, may be provided which may allow a generation of the described array of the laser beams. In particular, the illumination source may be directed to scan an area or a volume by using one or more movable mirrors to redirect the light beam in a periodic or non-periodic fashion. The illumination source may further be redirected using an array of micro-mirrors in order to provide in this manner a structured light source. The structured light source may be used to project optical features, such as points or fringes.

Thus, the scanning system may provide a static arrangement of the one or more dots placed on the one or more surfaces of the one or more objects. Alternatively, the illumination source of the scanning system, in particular the one or more laser beams, such as the above described array of the laser beams, may be configured for providing one or more light beams which may exhibit a varying intensity over time and/or which may be subject to an alternating direction of emission in a passage of time, in particular by moving one or more mirrors, such as the micro-mirrors comprised within the mentioned array of micro-mirrors. As a result, the illumination source may be configured for scanning a part of the at least one surface of the at least one object as an image by using one or more light beams with alternating features as generated by the at least one illumination source of the scanning device. In particular, the scanning system may, thus, use at least one row scan and/or line scan, such as to scan the one or more surfaces of the one or more objects sequentially or simultaneously. As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step.

The optional transfer device can, as explained above, be designed to feed light propagating from the object to the detector to the optical sensor, preferably successively. As explained above, this feeding can optionally be effected by means of imaging or else by means of non-imaging properties of the transfer device. In particular the transfer device can also be designed to collect the electromagnetic radiation before the latter is fed to the optical sensor. The optional transfer device can also, as explained in even greater detail below, be wholly or partly a constituent part of at least one optional illumination source, for example by the illumination source being designed to provide a light beam having defined optical properties, for example having a defined or precisely known beam profile, for example at least one Gaussian beam, in particular at least one laser beam having a known beam profile.

For potential embodiments of the optional illumination source, reference may be made to WO 2012/110924 A1. Still, other embodiments are feasible. Light emerging from the object can originate in the object itself, but can also optionally have a different origin and propagate from this origin to the object and subsequently toward the transversal and/or longitudinal optical sensor. The latter case can be effected for example by at least one illumination source being used. This illumination source can for example be or comprise an ambient illumination source and/or may be or may comprise an artificial illumination source. By way of example, the detector itself can comprise at least one illumination source, for example at least one laser and/or at least one incandescent lamp and/or at least one semiconductor illumination source, for example, at least one light-emitting diode, in particular an organic and/or inorganic light-emitting diode. On account of their generally defined beam profiles and other properties of handleability, the use of one or a plurality of lasers as illumination source or as part thereof, is particularly preferred. The illumination source itself can be a constituent part of the detector or else be formed independently of the detector. The illumination source can be integrated in particular into the detector, for example a housing of the detector. Alternatively or additionally, at least one illumination source can also be integrated into the at least one beacon device or into one or more of the beacon devices and/or into the object or connected or spatially coupled to the object.

The light emerging from the beacon devices can accordingly, alternatively or additionally from the option that said light originates in the respective beacon device itself, emerge from the illumination source and/or be excited by the illumination source. By way of example, the electromagnetic light emerging from the beacon device can be emitted by the beacon device itself and/or be reflected by the beacon device and/or be scattered by the beacon device before it is fed to the detector. In this case, emission and/or scattering of the electromagnetic radiation can be effected without spectral influencing of the electromagnetic radiation or with such influencing. Thus, by way of example, a wavelength shift can also occur during scattering, for example according to Stokes or Raman. Furthermore, emission of light can be excited, for example, by a primary illumination source, for example by the object or a partial region of the object being excited to generate luminescence, in particular phosphorescence and/or fluorescence. Other emission processes are also possible, in principle. If a reflection occurs, then the object can have for example at least one reflective region, in particular at least one reflective surface. Said reflective surface can be a part of the object itself, but can also be for example a reflector which is connected or spatially coupled to the object, for example a reflector plaque connected to the object. If at least one reflector is used, then it can in turn also be regarded as part of the detector which is connected to the object, for example, independently of other constituent parts of the detector.

The beacon devices and/or the at least one optional illumination source generally may emit light in at least one of: the ultraviolet spectral range, preferably in the range of 200 nm to 380 nm; the visible spectral range (380 nm to 780 nm); the infrared spectral range, preferably in the range of 780 nm to 3.0 micrometers. For thermal imaging applications the target may emit light in the far infrared spectral range, preferably in the range of 3.0 micrometers to 20 micrometers. Most preferably, the at least one illumination source is adapted to emit light in the visible spectral range, preferably in the range of 500 nm to 780 nm, most preferably at 650 nm to 750 nm or at 690 nm to 700 nm.

The feeding of the light beam to the optical sensor can be effected in particular in such a way that a light spot, for example having a round, oval or differently configured cross section, is produced on the optional sensor area of the optical sensor. By way of example, the detector can have a visual range, in particular a solid angle range and/or spatial range, within which objects can be detected. Preferably, the optional transfer device is designed in such a way that the light spot, for example in the case of an object arranged within a visual range of the detector, is arranged completely on a sensor region and/or on a sensor area of the optical sensor. By way of example, a sensor area can be chosen to have a corresponding size in order to ensure this condition.

By using the detector according to the present invention, a simple, cost-efficient and fast system may be realized, requiring very low resources. Thus, the following procedure may be implemented, which is highly efficient: At least one camera chip can be used as an optical sensor, in order to obtain pixel signals. Further, a non-linearization step may be applied, such as by using a Gamma correction or a similar nonlinear function (e.g. sqrt(x), exp(x)) to the obtained image, i.e. to the pixel signals or to at least one group of the pixel signals. In a further step, which may be called a summing step or an integration step, all the pixel signals all pixel values of the matrix or array or of at least one group of the pixels may be summed up and/or integrated. Preferably, the gamma correction may be done with a function already implemented into the camera chip (such as by using an appropriate camera chip like e.g. Omnivision OV10635). The applied function can also be implemented using a dedicated non-linearization circuit in each pixel, e.g. as a part of an active pixel concept. The addition/integration of the pixel signals or pixel values can either be done for specific regions of interest or for the whole array. The pixels or the detector may incorporate switches so that regions of interest can be selected and integrated fully or partially on a hardware basis.

The detector and the other devices and methods according to the present invention provide a plurality of significant advantages. Thus, the nonlinearity can be tailored to the specific needs of the application and changed individually from frame to frame. Further, no special chip development is generally required if one or more of the non-linearization, the summing or the evaluation are done fully or partially on a software-basis. Further, the noise is generally limited to the noise of the optical sensor, such as the imager chip, and potentially numerical noise. This gives a very good signal-to-noise ratio. The processing time specifically may be limited to the time needed for the summing step, such as the time needed for automatically calibrated integration. If an auto-exposure is not available, the processing still may be limited to the addition of all the pixel signals or of the group of pixels signals of the frame or the region of interest.

Overall, in the context of the present invention, the following embodiments are regarded as preferred:

Embodiment 1

A detector for determining a position of at least one object, the detector comprising:
  at least one optical sensor, the optical sensor being configured to detect at least one light spot generated by at least one light beam propagating from the object towards the detector, the optical sensor having at least one matrix of pixels, each pixel being adapted to generate at least one pixel signal $s_{i,j}$ in response to an illumination of the pixel by the light beam;
  at least one non-linearization device configured to transform the pixel signals $s_{i,j}$ of all pixels i, j or of at least one group of pixels into nonlinear pixel signals $s'_{i,j}$, the nonlinear pixel signals $s'_{i,j}$ each being a nonlinear function of the power of the illumination $p_{i,j}$ of the respective pixel;
  at least one summing device configured to add up the nonlinear pixel signals $s'_{i,j}$ of all pixels i, j or of the at least one group of pixels and to generate at least one nonlinear sum signal $S'=\Sigma_{i,j} s'_{i,j}$; and
  at least one evaluation device, the evaluation device being configured to determine at least one longitudinal coordinate z of the object by evaluating the nonlinear sum signal S'.

Embodiment 2

The detector according to the preceding embodiment, wherein the evaluation device is configured to determine the at least one longitudinal coordinate z of the object by using at least one predetermined relationship between the sum signal S' and the longitudinal coordinate z.

Embodiment 3

The detector according to the preceding embodiment, wherein the predetermined relationship is selected from the group consisting of an empiric relationship determined by recording sum signals for objects positioned at a plurality of longitudinal coordinates or an analytical relationship.

Embodiment 4

The detector according to the preceding embodiment, wherein the predetermined relationship is based on the assumption of the light beam being a Gaussian light beam.

Embodiment 5

The detector according to any one of the preceding embodiments, wherein the non-linearization device is configured to apply at least one nonlinear function $g(s_{i,j})$ to the nonlinear pixel signal, wherein $s'_{i,j}=g(s_{i,j})$, for i, j denoting all pixels or the at least one group of pixels.

Embodiment 6

The detector according to the preceding embodiment, wherein the nonlinear function is selected from the group consisting of: a convex function; a concave function; a polynomial function; an exponential function; a logarithmic function; a root function; a Gamma correction function.

Embodiment 7

The detector according to any one of the preceding embodiments, wherein the detector is configured such that the nonlinear sum signal S' is a function S'(P, d) of the overall power of illumination of the optical sensor or the at least one group of pixels by the light beam $P=\Sigma_{i,j} p_{i,j}$ and the size d of a light spot generated by the light beam on the optical sensor.

Embodiment 8

The detector according to the preceding embodiment, wherein the size d is selected from the group consisting of: a diameter of the light spot; an equivalent diameter of the light spot, a beam waist of the light spot; a double beam waist of the light spot; a full width at half maximum of the intensity of the light spot.

Embodiment 9

The detector according to any one of the preceding embodiments, wherein the detector, specifically one or more of the optical sensor, the non-linearization device, the summing device or the evaluation device, is configured to select at least one region of interest within the matrix of the pixels, wherein the pixels within the region of interest form the at least one group of pixels.

Embodiment 10

The detector according to the preceding embodiment, wherein the detector comprises a plurality of switches, wherein the detector is configured to perform the selection by using the switches.

Embodiment 11

The detector according to any one of the preceding embodiments, wherein the optical sensor is configured such that, at least within a predetermined range of measurement, specifically within a predetermined range of intensity of the illumination of the optical sensor and/or of each pixel, the pixel $s_{i,j}$ signals of the pixels are a linear function of the power of the illumination $p_{i,j}$ of the respective pixel.

Embodiment 12

The detector according to the preceding embodiment, wherein the detector is configured such that a sum signal of the pixel signals $s_{i,j}$ of all pixels i, j or of the at least one group of pixels $S=\Sigma_{i,j} s_{i,j}$ is a function S(P) of the overall power P of illumination and is independent from the size d of the light spot generated by the light beam on the optical sensor.

Embodiment 13

The detector according to the preceding embodiment, wherein the detector is configured to additionally record the sum signal S.

Embodiment 14

The detector according to the preceding embodiment, wherein the evaluation device is further configured to determine the at least one longitudinal coordinate z of the object by using the sum signal S.

Embodiment 15

The detector according to the preceding embodiment, wherein the evaluation device is configured to use the sum signal S for normalizing the nonlinear sum signal for the overall power P of the illumination.

Embodiment 16

The detector according to any one of the preceding embodiments, wherein the non-linearization device comprises at least one hardware component, preferably at least one of a processor, a field programmable gate array or an application-specific integrated circuit.

Embodiment 17

The detector according to any one of the preceding embodiments, wherein the non-linearization device at least partially is embodied as a software program running on a processor, specifically a processor of the evaluation device.

Embodiment 18

The detector according to any one of the preceding embodiments, wherein the summing device comprises at least one hardware component, selected from the group consisting of: an adder; a summer; a summing amplifier; an adder for analogue quantities; an adder for digital quantities.

Embodiment 19

The detector according to any one of the preceding embodiments, wherein the summing device at least partially is embodied as a software program running on a processor, specifically a processor of the evaluation device.

Embodiment 20

The detector according to any one of the preceding embodiments, wherein the detector comprises a plurality of the optical sensors.

Embodiment 21

The detector according to the preceding embodiment, wherein the evaluation device is configured to determine the at least one longitudinal coordinate z of the object by evaluating the nonlinear sum signals S' of at least two of the optical sensors.

Embodiment 22

The detector according to any one of the two preceding embodiments, wherein at least two of the optical sensors are positioned at different positions along at least one beam path of the light beam, such that an optical path length between the object and the at least two optical sensors is non-identical.

Embodiment 23

The detector according to any one of the three preceding embodiments, wherein the at least two optical sensors are positioned in different partial beam paths of the detector.

Embodiment 24

The detector according to any one of the four preceding embodiments, wherein the evaluation device is configured to use the nonlinear sum signals S' of at least two of the optical sensors for resolving ambiguities in a relationship between the sum signal S' and the longitudinal coordinate z.

Embodiment 25

The detector according to any one of the five preceding embodiments, wherein at least two of the optical sensors have differing spectral sensitivities, wherein the evaluation device is adapted to determine a color of the light beam by comparing sensor signals of the optical sensors having the differing spectral sensitivities.

Embodiment 26

The detector according to any one of the preceding embodiments, wherein the optical sensor comprises at least one camera chip.

Embodiment 27

The detector according to any one of the preceding embodiments, wherein the optical sensor comprises at least one of a CCD device, a CMOS device, a photodetector array, a focal plane array or a bolometer array.

Embodiment 28

The detector according to any one of the preceding embodiments, wherein the matrix of pixels is a rectangular matrix having at least one row and a plurality of columns of pixels or having a plurality of rows and at least one column of pixels.

Embodiment 29

The detector according to the preceding embodiment, wherein the matrix comprises at least 10 columns, preferably at least 100 columns, and wherein the matrix comprises at least 10 rows, preferably at least 100 rows.

Embodiment 30

The detector according to any one of the preceding embodiments, wherein the evaluation device is further adapted to determine at least one transversal coordinate x, y of the object by determining a position of the light beam on the matrix of pixels.

Embodiment 31

The detector according to any one of the preceding embodiments, wherein the detector further comprises at least one transfer device, the transfer device being adapted to guide the light beam onto the optical sensor.

Embodiment 32

The detector according to the preceding embodiment, wherein the transfer device comprises at least one focus-tunable lens.

Embodiment 33

The detector according to the preceding embodiment, wherein the detector, specifically the evaluation device, is configured to record images in different object planes.

Embodiment 34

The detector according to any one of the two preceding embodiments, wherein the detector, specifically the evaluation device, is configured to determine longitudinal coordinates of at least two different parts of the object having different longitudinal coordinates z by evaluating at least two different nonlinear sum signals S' acquired at at least two different adjustments of the at least one focus-tunable lens.

Embodiment 35

The detector according to any one of the three preceding embodiments, wherein the detector, specifically the evaluation device, is configured to resolve ambiguities in the determination of the at least one longitudinal coordinate z by comparing results obtained at at least two different adjustments of the at least one focus-tunable lens.

Embodiment 36

The detector according to any one of the five preceding embodiments, wherein the at least one transfer device comprises at least one multi-lens system, specifically at least one array of lenses, more specifically at least one micro-lens array.

Embodiment 37

The detector according to the preceding embodiment, wherein groups of pixels of the optical sensor are assigned to lenses of the multi-lens system, preferably one group of pixels to each lens of the multi-lens system, such that the light passing through a lens of the multi-lens system illuminates pixels of a respective group of pixels assigned to the lens.

Embodiment 38

The detector according to any one of the two preceding embodiments, wherein the detector is embodied as one or both of a light-field camera and/or a plenoptic camera.

Embodiment 39

The detector according to any one of the preceding embodiments, wherein the detector, specifically the evaluation device, is configured to determine longitudinal coordinates of at least two portions of the object located at different longitudinal coordinates.

Embodiment 40

The detector according to the preceding embodiment,
wherein the detector is configured to determine at least one first longitudinal coordinate of at least one first portion of the object located at at least one first longitudinal coordinate by adding up nonlinear pixel signals of pixels of at least one first group of pixels and thereby generating at least one first nonlinear sum signal, and further by evaluating the first nonlinear sum signal, and
wherein the detector is further configured to determine at least one second longitudinal coordinate of at least one second portion of the object located at at least one second longitudinal coordinate by adding up nonlinear pixel signals of pixels of at least one second group of pixels and thereby generating at least one second nonlinear sum signal, and further by evaluating the second nonlinear sum signal.

Embodiment 41

The detector according to any one of the two preceding embodiments,
wherein the detector, specifically the at least one summing device, is configured to group the pixels in a first way, thereby generating a first plurality of groups of pixels, the first plurality defining a first object plane, wherein the summing device is configured to add up the nonlinear pixel signals $s'_{i,j}$ of the pixels of each group of pixels of the first plurality of groups of pixels, thereby generating a plurality of first nonlinear sum signals $S_k' = \Sigma_{i,j} s'_{i,j,k}$, with integer k denoting the respective group within the first group of pixels; and
wherein the detector, specifically the at least one summing device, is configured to group the pixels in at least one second way, thereby generating at least one second plurality of groups of pixels, the second plurality defining at least one second object plane, wherein the summing device is configured to add up the nonlinear pixel signals $s'_{i,j}$ of the pixels of each group of pixels of the second plurality of groups of pixels, thereby generating at least one plurality of second nonlinear sum signals $S_l' = \Sigma_{i,j} s'_{i,j,l}$, with integer l denoting the respective group within the second group of pixels.

Embodiment 42

A detector system for determining a position of at least one object, the detector system comprising at least one detector according to any one of the preceding embodiments, the detector system further comprising at least one beacon device adapted to direct at least one light beam towards the detector, wherein the beacon device is at least one of attachable to the object, holdable by the object and integratable into the object.

Embodiment 43

A human-machine interface for exchanging at least one item of information between a user and a machine, wherein the human-machine interface comprises at least one detector system according to the preceding embodiment, wherein the at least one beacon device is adapted to be at least one of directly or indirectly attached to the user and held by the user, wherein the human-machine interface is designed to determine at least one position of the user by means of the detector system, wherein the human-machine interface is designed to assign to the position at least one item of information.

Embodiment 44

An entertainment device for carrying out at least one entertainment function, wherein the entertainment device comprises at least one human-machine interface according to the preceding embodiment, wherein the entertainment device is designed to enable at least one item of information to be input by a player by means of the human-machine interface, wherein the entertainment device is designed to vary the entertainment function in accordance with the information.

Embodiment 45

A tracking system for tracking a position of at least one movable object, the tracking system comprising at least one detector system according to any one of the preceding embodiments referring to a detector system, the tracking system further comprising at least one track controller, wherein the track controller is adapted to track a series of positions of the object at specific points in time.

Embodiment 46

A scanning system for determining at least one position of at least one object, the scanning system comprising at least one detector according to any of the preceding embodiments relating to a detector, the scanning system further comprising at least one illumination source adapted to emit at least one light beam configured for an illumination of at least one dot located at at least one surface of the at least one object, wherein the scanning system is designed to generate at least one item of information about the distance between the at least one dot and the scanning system by using the at least one detector.

Embodiment 47

A camera for imaging at least one object, the camera comprising at least one detector according to any one of the preceding embodiments referring to a detector.

Embodiment 48

A method for determining a position of at least one object by using a detector, the method comprising the following steps:

at least one detection step, comprising detecting at least one light spot generated by at least one light beam propagating from the object towards the detector by using at least one optical sensor of the detector, the optical sensor having at least one matrix of pixels, wherein each pixel generates at least one pixel signal $s_{i,j}$ in response to an illumination of the pixel by the light beam;

at least one non-linearization step, comprising transforming the pixel signal $s_{i,j}$ of all pixels i, j or of at least one group of pixels into nonlinear pixel signals $s'_{i,j}$, the nonlinear pixel signals $s'_{i,j}$ each being a nonlinear function of the power of the illumination $p_{i,j}$ of the respective pixel, specifically by using at least one non-linearization device of the detector;

at least one summing step, comprising adding up the nonlinear pixel signals $s'_{i,j}$ of all pixels i, j or of the at least one group of pixels and generating at least one nonlinear sum signal $S' = \Sigma_{i,j} s'_{i,j}$ specifically by using at least one summing device of the detector; and at least one evaluation step, comprising determining at least one longitudinal coordinate z of the object by evaluating the nonlinear sum signal S', specifically by using at least one evaluation device of the detector.

Embodiment 49

The method according to the preceding embodiment, wherein the detector according to any one of the preceding embodiments referring to a detector is used.

Embodiment 50

A use of the detector according to any one of the preceding embodiments relating to a detector, for a purpose of use, selected from the group consisting of: a position measurement in traffic technology; an entertainment application; a security application; a surveillance application; a safety application; a human-machine interface application; a tracking application; a photography application; a use in combination with at least one time-of-flight detector; a use in combination with a structured light source; a use in combination with a stereo camera; a machine vision application; a robotics application; a quality control application; a manufacturing application; a use in combination with a structured illumination source; a use in combination with a stereo camera.

BRIEF DESCRIPTION OF THE FIGURES

Further optional details and features of the invention are evident from the description of preferred exemplary embodiments which follows in conjunction with the dependent claims. In this context, the particular features may be implemented alone or with several in combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

EXEMPLARY EMBODIMENTS

Figure 1:
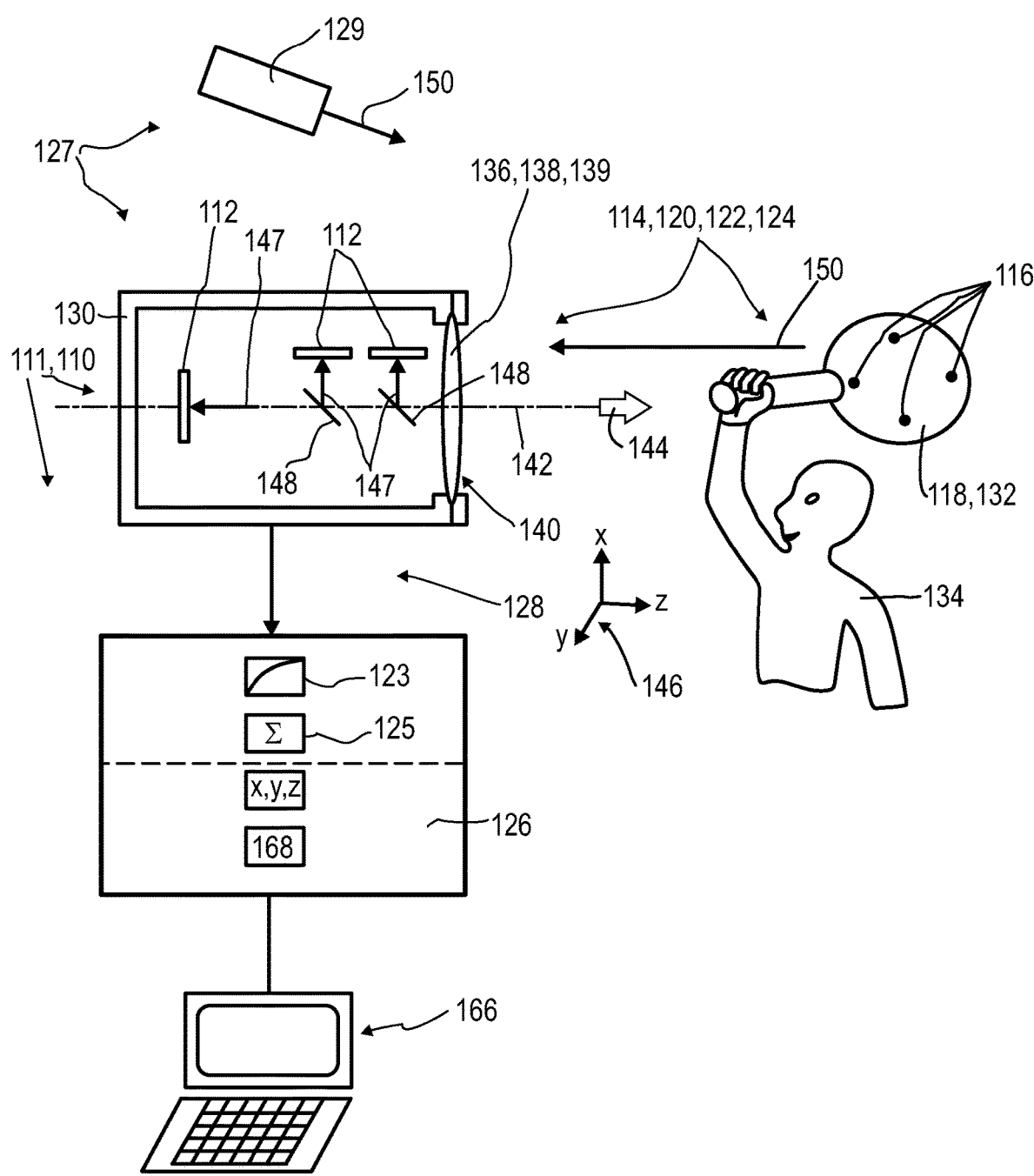
FIG. 1 shows an exemplary embodiment of a detector, a detector system, a human-machine interface, an entertainment device and a tracking system according to the present invention.

FIG. 1 shows, in a highly schematic illustration, an exemplary embodiment of a detector 110, having a plurality of optical sensors 112. The detector 110 specifically may be embodied as a camera 111 or may be part of a camera 111. The camera 111 may be made for imaging, specifically for 3D imaging, and may be made for acquiring standstill images and/or image sequences such as digital video clips. Other embodiments are feasible. FIG. 1 further shows an embodiment of a detector system 114, which, besides the at least one detector 110, comprises one or more beacon devices 116, which, in this exemplary embodiment, are attached and/or integrated into an object 118, the position of which shall be detected by using the detector 110. FIG. 1 further shows an exemplary embodiment of a human-machine interface 120, which comprises the at least one detector system 114, and, further, an entertainment device 122, which comprises the human-machine interface 120. The figure further shows an embodiment of a tracking system 124 for tracking a position of the object 118, which comprises the detector system 114. The components of the devices and systems shall be explained in further detail in the following.

The figure further shows an exemplary embodiment of a scanning system 127 for determining at least one position of the at least one object 118. The scanning system 127 comprises the at least one detector 110 and, further, at least one illumination source 129 adapted to emit at least one light beam 150 configured for an illumination of at least one dot (e.g. a dot located on one or more of the positions of the beacon devices 116) located at at least one surface of the at least one object 118. The scanning system 127 is designed to generate at least one item of information about the distance between the at least one dot and the scanning system 127, specifically the detector 110, by using the at least one detector 110.

Figure 2:
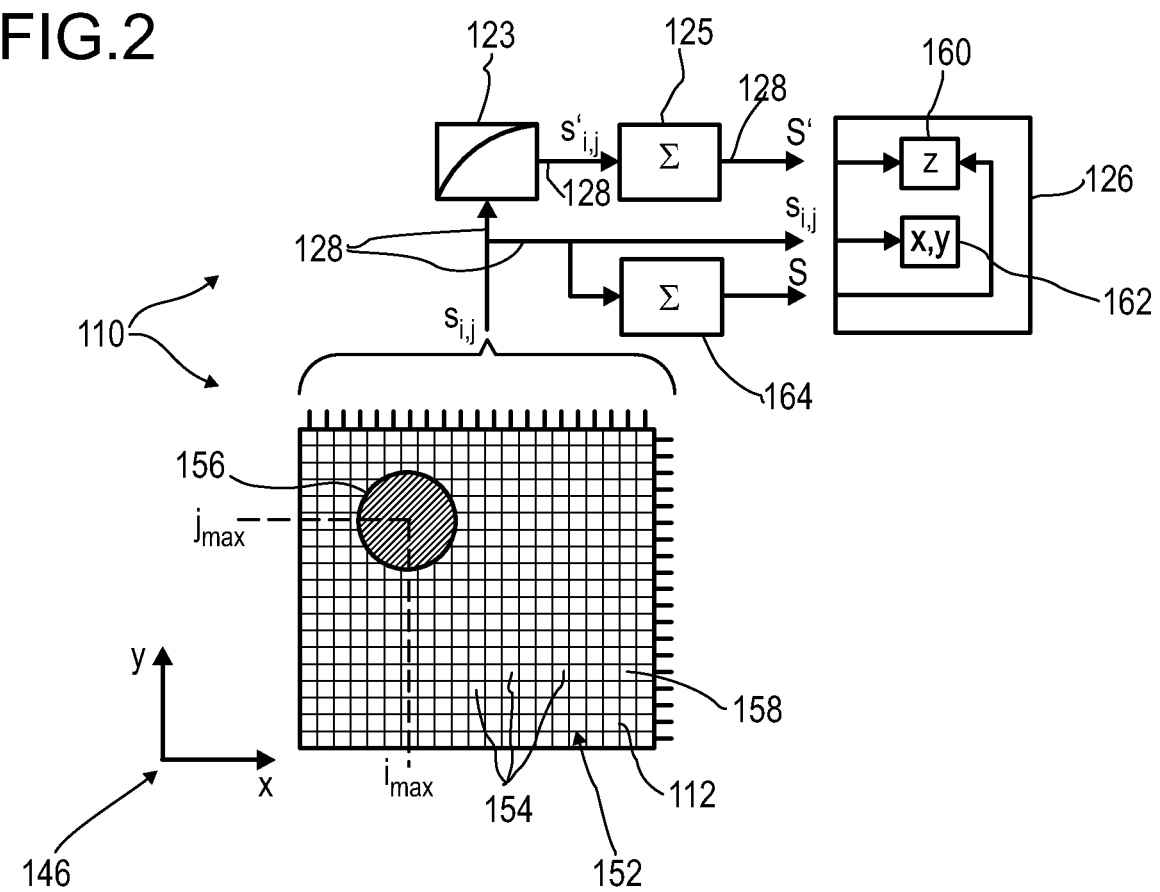
FIG. 2 shows an exemplary embodiment of a detector according to the present invention.

An exemplary embodiment of a detector 110 which may be used in the setup of FIG. 1 is shown in FIG. 2. In the following, both figures will be explained in conjunction.

The detector 110, besides the one or more optical sensors 112, comprises at least one non-linearization device 123, at least one summing device 125 and at least one evaluation device 126, the function of all of which will be explained in further detail below. The non-linearization device 123 and/or the summing device 125 may fully or partially be integrated into one, more than one or all of or even each of the optical sensors 112. Additionally or alternatively, as indicated by the dashed line in FIG. 1, the non-linearization device 123 and/or the summing device 125 may fully or partially be integrated into the at least one evaluation device 126. Further, additionally or alternatively, devices 123 and/or 125 may fully or partially be embodied as independent components.

Besides the above-mentioned possibility of fully or partially combining two or more components, one or more of one or more optical sensors 112, the non-linearization devices 123, the one or more summing devices and the one or more evaluation devices may be interconnected by one or more connectors 128 and/or one or more interfaces, as symbolically depicted in FIGS. 1 and 2. Further, the optional at least one connector 128 may comprise one or more drivers and/or one or more devices for modifying or preprocessing sensor signals. Further, instead of using the at least one optional connector 128, the evaluation device 126 may fully or partially be integrated into the optical sensors 112 and/or into a housing 130 of the detector 110. Additionally or alternatively, the evaluation device 126 may fully or partially be designed as a separate device.

In this exemplary embodiment, the object 118, the position of which may be detected, may be designed as an article of sports equipment and/or may form a control element 132, the position of which may be manipulated by a user 134. As an example, the object 118 may be or may comprise a bat, a racket, a club or any other article of sports equipment and/or fake sports equipment. Other types of objects 118 are possible. Further, the user 134 himself or herself may be considered as the object 118, the position of which shall be detected.

As outlined above, the detector 110 comprises the plurality of optical sensors 112. The optical sensors 112 may be located inside the housing 130 of the detector 110. Further, at least one transfer device 136 may be comprised, such as one or more optical systems, preferably comprising one or more lenses 138. As outlined above, the at least one lens 138 specifically may be or may optionally comprise at least one focus-tunable lens 139.

An opening 140 inside the housing 130, which, preferably, is located concentrically with regard to an optical axis 142 of the detector 110, preferably defines a direction of view 144 of the detector 110. A coordinate system 146 may be defined, in which a direction parallel or antiparallel to the optical axis 142 is defined as a longitudinal direction, whereas directions perpendicular to the optical axis 142 may be defined as transversal directions. In the coordinate system 146, symbolically depicted in FIG. 1, a longitudinal direction is denoted by z, and transversal directions are denoted by x and y, respectively. Other types of coordinate systems 146 are feasible.

The detector 110 may comprise one or more of the optical sensors 112. Preferably, as depicted in FIG. 1, a plurality of optical sensors 112 is comprised, which, as an example, may be located in different partial beam paths 147, as depicted in FIG. 1, which may be split by one or more beam splitting devices 148. It shall be noted, however, that other options are feasible, such as stacked configurations of two or more optical sensors 112. Further, embodiments having a different number of optical sensors 112 are feasible. Further, additionally or alternatively, as discussed in detail above, by using at least one focus-tunable lens 139, a splitting of the beam path may be avoided, still enabling a resolving of ambiguities.

One or more light beams 150 are propagating from the object 118 and/or from and/or one or more of the beacon devices 116 towards the detector 110. The detector 110 is adapted for determining a position of the at least one object 118. For this purpose, as will be explained with respect to FIG. 2 and the exemplary embodiment of one of the optical sensors 112 depicted therein, each of the optical sensors 112 comprises a matrix 152 of pixels 154. In this exemplary embodiment, the matrix 152 is a rectangular matrix, in which the pixels 154 are arranged in rows in an x-dimension and columns in a y-dimension, as symbolically depicted by the coordinate system 146 depicted in FIG. 2. The plane of the matrix 152 may be perpendicular to the optical axis 142 of the detector 110 and, thus, may be perpendicular to the longitudinal coordinate z. However, other embodiments are feasible, such as embodiments having non-planar optical sensors 112 and/or embodiments having non-rectangular matrices of pixels 154.

The detector 110 is adapted to determine a position of the object 118, and the optical sensor 112 is adapted to detect the light beam 150 propagating from the object 118 towards the detector 110, specifically from one or more of the beacon devices 116. The light beam 150, directly and/or after being modified by the transfer device 136, such as being focused by the lens 138, creates a light spot 156 on a sensor surface of the optical sensor 112 or of each of the optical sensors 112. Each of the pixels 154 is adapted to generate an individual pixel signal $s_{i,j}$ in response to an illumination of the pixel by the light beam, which represents an intensity or power of illumination of the respective pixel 154. Therein, pixel signals for all of the pixels 154 or just for one or more groups of pixels 154 may be generated. The pixel signals may be generated simultaneously or subsequently, such as in a multiplexing fashion.

Figure 3A:
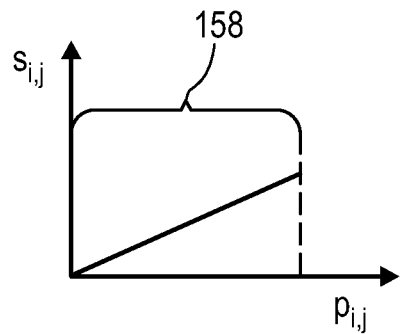
FIGS. 3A and 3B show examples of linear sensor signals (FIG. 3A) and nonlinear sensor signals (FIG. 3B)

As symbolically depicted in FIG. 3A, the pixel signals $s_{i,j}$ specifically may be linear pixel signals, i.e. pixel signals which, at least to a certain extent or within a tolerance and/or within a certain range of measurement (symbolically depicted by reference number 158 in FIG. 3A), are linear pixel signals, i.e. pixel signals following equation (1) above. As an example, deviations from linear behavior according to equation (1) of no more than 20%, preferably of no more than 10%, more preferably of no more than 5% or even of no more than 2% within the range of measurement may still be tolerable.

Figure 3B:
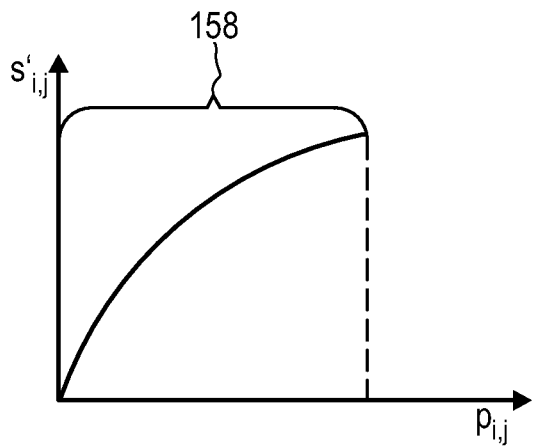

As depicted in FIG. 2, the pixel signals $s_{i,j}$ partially or fully, i.e. all of the pixel signals or at least one group of the pixel signals, is fed into at least one non-linearization device 123. Therein, at least one individual non-linearization device 123 may be provided for each of the pixels 154, or two or more or even all of the pixels may share a common non-linearization device 123. As depicted in FIG. 3B, the non-linearization device 123 transforms the linear pixel signals $s_{i,j}$ into nonlinear pixel signals $s'_{i,j}$, at least within the range of measurement 158. Thus, exponential functions, polynomial functions, logarithmic functions or other nonlinear functions may be used, as known e.g. in Gamma correction in the optical sensors and displays, as explained above in the context of equation (1').

As further depicted in FIG. 2, the nonlinear pixel signals $s'_{i,j}$ generated by the one or more non-linearization devices 123 are, subsequently, fed into at least one summing device 125. As explained above, the summing may take place for all of the pixels 154 or for one or more groups of pixels 154, such as for one or more regions of interest. As further outlined above in the context of equation (2'), a nonlinear sum signal S' is generated by the at least one summing device 125, which is a nonlinear function f(P, d) of the total power P of the illumination and of the size d of the light spot 156. The nonlinear function f(P, d) may be derived empirically, analytically or semi-analytically. Thus, as an example for empirical determinations of f, nonlinear sum signals S' may be recorded for a plurality of beam widths d, and a lookup table may be generated. Thus, by deriving S', d may be determined. By using known beam propagation properties, such as the Gaussian relationship (4), thereby, the longitudinal coordinate z may be derived. Alternatively, a lookup table or a similar relationship may be determined directly for the nonlinear sum signals S' and the longitudinal coordinate z, such as by recording nonlinear sum signals S' in a plurality of experiments with different distances z between the object 118 and the detector 110. Again, alternatively, analytical relationships may be determined, such as by evaluating Gaussian beam propagation equations.

The determination of the longitudinal coordinate z may be performed by a longitudinal evaluation device 160, as symbolically depicted in FIG. 2. Additionally, optionally, and evaluation of the linear sensor signals $s_{i,j}$ may be performed, in order to determine at least one transversal coordinate. Thus, a center of the light spot 156 may be determined, such as by determining the coordinates $i_{max}$ and/or $j_{max}$ as depicted in FIG. 2. This determination simply may be performed by comparing the sensor signals and to determining maxima. By using at least one transversal evaluation device 162, and by further using a known relationship between a position of the light spot 156 on the matrix 152 and the transversal position of the object 118, a transversal position of the object 118 may be derived. The latter relationship, again, may be predetermined or determinable, such as by using a lens equations of the transfer device 136 and/or by using an empirical or semi-empirical correlations between the position of the light spot 156 and the transversal position of the object.

The longitudinal evaluation device 160 and the at least one optional transversal evaluation device 162 may be part of the evaluation device 126. The detector 110 may be adapted, as depicted in FIG. 2, to directly provide the linear sensor signals $s_{i,j}$ to the evaluation device 126, e.g. in addition to the nonlinear sum signal S'.

As a further option, also depicted in FIG. 2, the detector 110 may be set up to create the above-mentioned at least one linear sum signal S. For this purpose, the detector 110 may comprise at least one additional summing device 164, which may be adapted to generate the linear sum signal S according to equation (2) above, out of all of the sensor signals $s_{i,j}$ or out of at least one group of these sensor signals. As depicted in FIG. 2, the linear sum signal S may e.g. be provided to the longitudinal evaluation device 160, such as in order to normalize the total power P of the illumination and to render the evaluation independent from the power of the light source, such as from the power of one or more light sources integrated into the one or more beacon devices 116. Additionally and optionally, the transversal evaluation device 162 may make use of this additional information provided by the linear sum signal S.

As outlined above, the determination of a position of the object 118 and/or a part thereof by using the detector 110 may be used for providing a human-machine interface 120, in order to provide at least one item of information to a machine 166. In the embodiment schematically depicted in FIG. 1, the machine 166 may be a computer and/or may comprise a computer. Other embodiments are feasible. The evaluation device 126 even may fully or partially be integrated into the machine 166, such as into the computer.

As outlined above, FIG. 1 also depicts an example of a tracking system 124, configured for tracking the position of the at least one object 118. The tracking system 124 comprises the detector 110 and at least one track controller 168. The track controller may be adapted to track a series of positions of the object 118 at specific points in time. The track controller 172 may be an independent device and/or may fully or partially form part of the computer of the machine 166.

Similarly, as outlined above, the human-machine interface 120 may form part of an entertainment device 122. The machine 166, specifically the computer, may also form part of the entertainment device 122. Thus, by means of the user 134 functioning as the object 118 and/or by means of the user 134 handling a control device 132 functioning as the object 118, the user 134 may input at least one item of information, such as at least one control command, into the computer, thereby varying the entertainment function, such as controlling the course of a computer game.

Figure 4A:
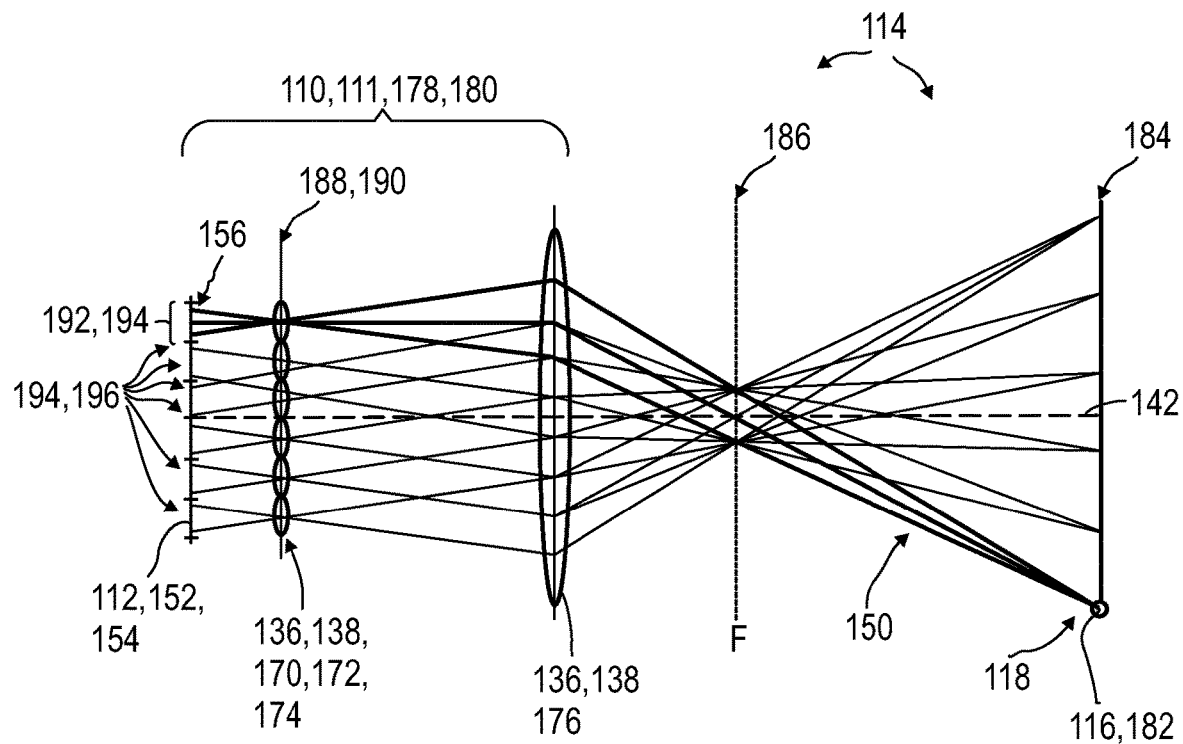
FIGS. 4A and 4B show different focal situations of a light-field camera and a plenoptic camera.
Figure 4B:
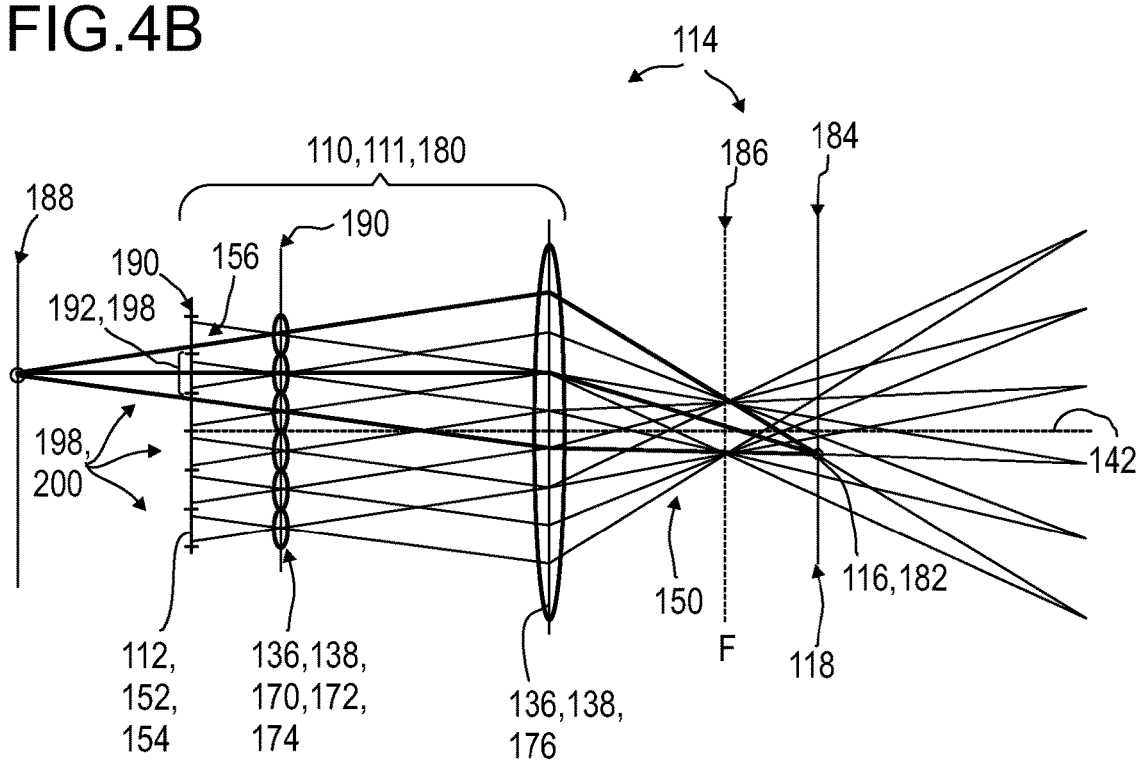

As outlined above, the detector 110 may comprise at least one transfer device 136, which may comprise one or more lenses 138. In a further exemplary embodiment shown in FIGS. 4A and 4B, the transfer device 136 may comprise a multi-lens system 170, specifically an array 172 of lenses and, more specifically, a micro-lens array 174. As shown in FIGS. 4A and 4B, the micro-lens array 174 may be located above, beneath or next to an optical sensor 112, which, for example, may be or may comprise at least one CCD and/or at least one CMOS sensor and/or at least one other kind of imaging sensor. In addition, the detector 110 may comprise at least one additional lens 138, such as at least one main lens 176.

By using this setup or a similar setup, a light-field camera 178 and/or a plenoptic camera 180 may be realized. In FIGS. 4A and 4B, only the transfer device 136 and the optical sensor 112 are depicted, for the purpose of clarification and for the following description of the basic principles. The light-field camera 178 and/or the plenoptic camera 180 additionally may comprise the remaining components as depicted in FIGS. 1 and/or 2, such as the non-linearization device 123, the summing device 125, the evaluation device 126 and, optionally, further components. The light-field camera 178 and/or the plenoptic camera 180 may also be implemented into one or more of a detector system 114, a human-machine interface 120, an entertainment device 122, a tracking system 124, a scanning system 127 or other applications.

For the basic principles of the light-field camera 178 and/or the plenoptic camera 180, reference may be made to the above-mentioned applications by C. Hahne et al. and to http://www.plenoptic.info/pages/refocusing.html. FIGS. 4A and 4B were adapted from the latter. In addition, however, the evaluation according to the present invention shall take place, which above was referred to as use of the "software FiP effect". Thus, specifically, as outlined above, the sensor signals of the optical sensor 112 may be subject to at least one non-linearization step, by using at least one non-linearization device 123, and at least one summing step, by using at least one summing device 125, and at least one evaluation step, by using at least one evaluation device 126, wherein devices 123, 125 and 126 are not depicted in FIGS. 4A and 4B, for simplification purposes.

In FIG. 4A, a situation is depicted in which a part 182 of the object 118, also referred to as a portion of the object 118, is positioned such that this part 182 is imaged by the main lens 176 right onto the micro-lens array 174. As an example, this part 182 may be a beacon device 116. In FIG. 4A, an object plane is denoted by reference number 184. A focal plane of the main lens 176 is denoted by reference number 186. Further, an image plane, into which the object plane 184 is imaged by the main lens 176, is denoted by reference number 188.

In this focal situation depicted in FIG. 4A, the image plane 188 coincides with a micro-lens plane 190 in which the multi-lens system 170 is positioned. In this simplified setup, as a preferred example, planes 184, 186, 188 and 190 as well as the main lens 176 are oriented essentially perpendicular to the optical axis 142. It shall be noted, however, that other embodiments are feasible.

As can be seen in FIG. 4A, the rays of the light beam 150 are focused onto one of the lenses 138 of the multi-lens system 170. In this simplified example, the uppermost lens 138 is illuminated. This uppermost lens 138 focuses the light beam 150 onto an illuminated region 192 of the image sensor 112. The pixels 154 of this illuminated region 192 form a first group 194 of pixels. The non-linearization and the summing are performed over the pixel signal of the first group 194 of pixels 154. Similarly, the other lenses 138 of the multi-lens system 170 define other first groups 194, such that the multi-lens system 170 defines a first plurality 196 of groups of pixels 154. For each of the first groups 194, an evaluation according to the present invention may take place, thereby generating longitudinal coordinates z of the object 118 and/or of the parts 182 of the object 118, such as of the beacon devices 116.

The light-field camera 178 and/or the plenoptic camera 180, however, also may be configured to refocus and, thus, to record images and/or to determine longitudinal coordinates of the object 118 and/or one or more parts 182 of the object 118 in other object planes 184. This process of refocusing may take place simultaneously or subsequently to an imaging process in a different plane. This is due to the fact that, as will be outlined in further detail below and as explained in the above-mentioned literature, the refocusing mainly may be defined as a software or evaluation process rather than a process involving moving mechanical parts or changing lenses.

Thus, in FIG. 4B, a situation is depicted in which the object plane 184 moves closer to the focal plane 186. Consequently, the imaging plane 188 moves away from the micro-lens plane 190. Therefore, the light spot 156 generated by a light beam 150 on the optical sensor 112 widens and, thus, the illuminated region 192 widens. The pixels 154 of the illuminated region 192 define at least one second group 198 of pixels 154, which is larger than the first group 194 in FIG. 4A. By subdividing the matrix 152 of pixels 154 into the second group 198, a second plurality 200 of groups of pixels is defined. Again, the above-mentioned non-linearization and summing takes place within each second group 198, thereby determining the longitudinal coordinate for the second group 198.

Consequently, by redefining the groups of pixels 154, a refocusing of the detector 110 may take place. For further details, specifically regarding an algorithm of refocusing, reference may be made to one or more of the above-mentioned publications by C. Hahne et al. and to http://www.plenoptic.info/pages/refocusing.html.

The light-field camera 178 or plenoptic camera 180, with micro-lenses, may record images in different focal planes simultaneously. The recorded information can directly be used as input for the evaluation according to the present invention, also referred to as the software FiP evaluation. The optics of a light-field camera 178 or plenoptic camera 180, specifically the transfer device 136, may comprise one or more of the above-mentioned main lenses 176. While recording an image, one or more objects 118 in the object plane 184 may be in focus, so that the image plane 188 coincides with the micro-lens plane 190, as depicted in FIG. 4A and as explained above. The image may be obtained by summing up the nonlinear sensor-pixel signals of pixels below each micro-lens, i.e. the pixels signals after the non-linearization step. In other words, the image-pixel intensity may be given by the sum of the nonlinear sensor-pixel intensities below one micro-lens. The image resolution may be identical to the number of micro-lenses. In order to refocus an image to a different object plane 184, a regrouping may take place, as outlined above. Thus, different sensor pixels may be grouped and nonlinear sensor signals may be summed up in order to obtain the image pixel intensities.

The groups 194, 198 specifically may be chosen such that the central rays passing through the respective lenses 138 of the multi-lens system 170 coincide in the new image plane 188, as depicted in FIG. 4B.

The resolution of each image may equal the number of lenses 138 in the multi-lens system 170, specifically the number of micro-lenses in the micro-lens array 174. The number of different images that can be extracted directly from the recorded image may equal the number of pixels 154 beneath one micro-lens.

A "software-FiP-system" may use software and/or hardware to transform the linear pixel-signal of a CMOS or CCD into a sum of nonlinear pixel signals to obtain a FiP-signal. A light-field camera 178 may use software and/or hardware to transform the pixel signals under the micro-lenses into a linear sum of pixel signals to obtain images in different focus planes or viewing angles. Additionally or alternatively, as proposed by the present invention, the summing procedure of the light-field camera 178 may take place in a nonlinear way, by non-linearizing the pixel signals and summing these nonlinear pixel signals, in order to obtain FiP-signals in different focal planes.

The setup of the light-field camera 178 may be optimized on the hardware side for use as FiP-camera, as compared to the conventional plenoptic cameras disclosed by C. Hahne et al. Thus, for the purposes of the present invention, the image resolution may be increased, while only two focal planes may be sufficient. Thus, the number of lenses 138, such as the number of micro-lenses, of the multi-lens system 170 may be increased, while the number of sensor pixels 154 beneath one lens may be decreased. Further, concerning the Software FiP evaluation, the FiP-signals may be calculated at two fixed focal planes. The software may be optimized accordingly.

The software-FiP effect, specifically the summing step of forming the nonlinear sum signal, specifically in the case of the light-field camera, may, additionally or alternatively to a full or partial software realization, be implemented easily fully or partially by hardware, since the groups of pixels, in the two or more planes, may be fixedly implemented and predetermined.

Combining a micro-lens-based light-field camera 178 with the method and devices as proposed in the present invention generally may lead to a simplification of the optical setup. Thus, as compared to e.g. the setup of FIG. 1, only one optical path is generally necessary. It should be noted, however, that other setups are feasible, specifically setups having a plurality of beam paths and/or one or more split beam paths.

LIST OF REFERENCE NUMBERS

110 Detector
111 Camera
112 optical sensor
114 detector system
116 beacon device
118 Object
120 human-machine interface
122 entertainment device
123 non-linearization device
124 tracking system
125 summing device
126 evaluation device
127 scanning system
128 connector
129 illumination source
130 housing
132 control device
134 user
136 transfer device
138 lens
139 focus-tunable lens
140 opening
142 optical axis
144 direction of view
146 coordinate system
147 partial beam path
148 beam-splitting device
150 light beam
152 matrix
154 pixel
156 light spot
158 range of measurement
160 longitudinal evaluation device
162 transversal evaluation device
164 additional summing device
166 machine
168 track controller
170 multi-lens system
172 array of lenses
174 micro-lens array
176 main lens
178 light-field camera
180 plenoptic camera
182 part of object
184 object plane
186 focal plane
188 image plane
190 micro-lens plane
192 illuminated region
194 first group
196 first plurality of groups of pixels
198 second group
200 second plurality of groups of pixels

The invention claimed is:

1. A detector for determining a position of at least one object, the detector comprising:

at least one optical sensor configured to detect at least one light spot generated by at least one light beam propagating from the object towards the detector, the optical sensor having at least one matrix of pixels, each pixel being adapted to generate at least one pixel signal $s_{i,j}$ in response to an illumination of the pixel by the light beam;

at least one non-linearization device configured to transform the pixel signals $s_{i,j}$ of all pixels i, j or of at least one group of pixels into nonlinear pixel signals $s'_{i,j}$, the nonlinear pixel signals $s'_{i,j}$ each being a nonlinear function of the power of the illumination $p_{i,j}$ of the respective pixel;

at least one summing device configured to add up the nonlinear pixel signals $s'_{i,j}$ of all pixels i, j or of the at least one group of pixels and to generate at least one nonlinear sum signal $S' = \Sigma_{i,j} s'_{i,j}$; and at least one evaluation device configured to determine at least one longitudinal coordinate z of the object by evaluating the nonlinear sum signal S', wherein the evaluation device determines the at least one longitudinal coordinate z of the object with at least one predetermined relationship between the sum signal S' and the longitudinal coordinate z;

wherein the detector is configured such that the nonlinear sum signal S' is a function S'(P, d) of the overall power of illumination of the optical sensor or the at least one group of pixels by the light beam $P=\Sigma_{i,j}p_{i,j}$ and size d of the light spot generated by the light beam on the optical sensor, wherein the non-linearization device comprises at least one hardware component selected from the group consisting of a processor, a field programmable gate array, and an application-specific integrated circuit.

2. The detector according to claim 1, wherein the non-linearization device is configured to apply at least one nonlinear function $g(s_{i,j})$ to the nonlinear pixel signal, wherein $s'_{i,j}=g(s_{i,j})$, for i, j denoting all pixels or the at least one group of pixels.

3. The detector according to claim 2, wherein the nonlinear function is selected from the group consisting of: a convex function; a concave function; a polynomial function; an exponential function; a logarithmic function; a root function; and a Gamma correction function.

4. The detector according to claim 1, wherein the detector is configured such that the nonlinear sum signal S' is a function S'(P, d) of the overall power of illumination of the optical sensor by the light beam $P=\Sigma_{i,j}p_{i,j}$ and size d of the light spot generated by the light beam on the optical sensor.

5. The detector according to claim 1, wherein the detector is configured to select at least one region of interest within the matrix of the pixels, wherein the pixels within the region of interest form the at least one group of pixels.

6. The detector according to claim 5, wherein the detector comprises a plurality of switches, wherein the detector is configured to perform the selection by using the switches.

7. The detector according to claim 1, wherein the optical sensor is configured such that, at least within a predetermined range of measurement, the pixel $s_{i,j}$ signals of the pixels are a linear function of the power of the illumination $p_{i,j}$ of the respective pixel.

8. The detector according to claim 7, wherein the detector is configured such that a sum signal of the pixel signals $s_{i,j}$ of all pixels i, j or of the at least one group of pixels $S=\Sigma_{i,j}s_{i,j}$ is a function S(P) of the overall power P of illumination and is independent from size d of the light spot generated by the light beam on the optical sensor, wherein the detector is configured to additionally record the sum signal S, wherein the evaluation device is further configured to determine the at least one longitudinal coordinate z of the object by using the sum signal S.

9. The detector according to claim 1, wherein the detector comprises a plurality of the optical sensors, wherein the evaluation device is configured to determine the at least one longitudinal coordinate z of the object by evaluating the nonlinear sum signals S' of at least two of the optical sensors.

10. The detector according to claim 1, wherein the optical sensor comprises at least one of a camera chip, a CCD device, a CMOS device, a photodetector array, a focal plane array, and a bolometer array.

11. The detector according to claim 1, wherein the evaluation device is further adapted to determine at least one transversal coordinate x, y of the object by determining a position of the light beam on the matrix of pixels.

12. The detector according to claim 1, wherein the detector further comprises at least one transfer device adapted to guide the light beam onto the optical sensor.

13. The detector according to claim 1, wherein the transfer device comprises at least one of a focus-tunable lens and a multi-lens system.

14. The detector according to claim 13, wherein the detector is embodied as one or both of a light field camera and a plenoptic camera.

15. A detector system for determining a position of at least one object, the detector system comprising:
at least one detector according to claim 1,
and at least one beacon device adapted to direct at least one light beam towards the detector,
wherein the beacon device is at least one of attachable to the object holdable by the object and integratable into the object.

16. A human-machine interface for exchanging at least one item of information between a user and a machine, the human-machine interface comprising:
at least one detector system according to claim 15,
wherein the at least one beacon device is adapted to be at least one of directly or indirectly attached to the user and held by the user, wherein the human-machine interface is designed to determine at least one position of the user via the detector system, and wherein the human-machine interface is designed to assign to the position at least one item of information.

17. An entertainment device for carrying out at least one entertainment function, the entertainment device comprising:
at least one human-machine interface according to claim 16,
wherein the entertainment device is designed to enable at least one item of information to be input by a player via the human-machine interface, and wherein the entertainment device is designed to vary the entertainment function in accordance with the information.

18. A tracking system for tracking a position of at least one movable object, the tracking system comprising:
at least one detector system according to claim 15, and
at least one track controller, wherein the track controller is adapted to track a series of positions of the object at specific points in time.

19. A scanning system for determining at least one position of at least one object, the scanning system comprising:
at least one detector according to claim 1,
at least one illumination source adapted to emit at least one light beam configured for an illumination of at least one dot located at at least one surface of the at least one object,
wherein the scanning system is designed to generate at least one item of information about the distance between the at least one dot and the scanning system by using the at least one detector.

20. A camera for imaging at least one object, the camera comprising:
at least one detector according to claim 1.

21. A method for determining a position of at least one object by using a detector, the method comprising:
detecting at least one light spot generated by at least one light beam traveling from the object towards the detector by using at least one optical sensor of the detector, the optical sensor having at least one matrix of pixels, wherein each pixel generates at least one pixel signal $s_{i,j}$ in response to an illumination of the pixel by the light beam,
transforming with a non-linearization device the pixel signals $s_{i,j}$ of all pixels i, j or of at least one group of pixels into nonlinear pixel signals $s'_{i,j}$ the nonlinear pixel signals $s'_{i,j}$ each being a nonlinear function of the power of the illumination $p_{i,j}$ of the respective pixel, wherein the non-linearization device comprises at least one hardware component selected from the group consisting of a processor, a field programmable gate array, and an application-specific integrated circuit;

adding up the nonlinear pixel signals $s'_{i,j}$ of all pixels i, j or of the at least one group of pixels and generating at least one nonlinear sum signal $S'=\Sigma_{i,j} s'_{i,j}$; and determining at least one longitudinal coordinate z of the object by evaluating the at least one longitudinal coordinate z of the object with at least one predetermined relationship between the sum signal S' and the longitudinal coordinate z.

22. The detector according to claim 1, wherein the nonlinearization device is configured to apply at least one nonlinear function $g(s_{i,j})$ to the nonlinear pixel signal, wherein $s'_{i,j}=g(s_{i,j})$, for i, j denoting all pixels or the at least one group of pixels and wherein the nonlinear function is selected from the group consisting of: a convex function; a concave function; a polynomial function; an exponential function; a logarithmic function; a root function; and a Gamma correction function.

* * * * *